(12) United States Patent
Eguchi et al.

(10) Patent No.: US 9,164,941 B2
(45) Date of Patent: Oct. 20, 2015

(54) STORAGE SYSTEM GROUP

(75) Inventors: Yoshiaki Eguchi, Yokohama (JP); Akira Yamamoto, Sagamihara (JP); Yasutomo Yamamoto, Sagamihara (JP); Manabu Kitamura, Kawasaki (JP); Ai Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1310 days.

(21) Appl. No.: 12/190,916

(22) Filed: Aug. 13, 2008

(65) Prior Publication Data
US 2009/0113152 A1  Apr. 30, 2009

(30) Foreign Application Priority Data

Oct. 24, 2007 (JP) ................................. 2007-276254
Nov. 22, 2007 (JP) ................................. 2007-303743
Jun. 10, 2008 (JP) ................................. 2008-151302

(51) Int. Cl.
G06F 11/00 (2006.01)
G06F 13/38 (2006.01)
G06F 11/20 (2006.01)
G06F 11/14 (2006.01)

(52) U.S. Cl.
CPC .......... *G06F 13/387* (2013.01); *G06F 11/1451* (2013.01); *G06F 11/1456* (2013.01); *G06F 11/1469* (2013.01); *G06F 11/1471* (2013.01); *G06F 11/2066* (2013.01); *G06F 11/2071* (2013.01); *G06F 11/1435* (2013.01); *G06F 11/1464* (2013.01); *G06F 11/2074* (2013.01); *G06F 2201/84* (2013.01); *G06F 2201/855* (2013.01)

(58) Field of Classification Search
None
See application file for complete search history.

(56) References Cited

U.S. PATENT DOCUMENTS

| | | | | |
|---|---|---|---|---|
| 5,737,565 | A | * 4/1998 | Mayfield | ........................ 711/213 |
| 2006/0259722 | A1 | * 11/2006 | Watanabe | ...................... 711/162 |
| 2007/0033437 | A1 | * 2/2007 | Kawamura et al. | ............. 714/20 |
| 2007/0067586 | A1 | 3/2007 | Mikami | |
| 2007/0174669 | A1 | * 7/2007 | Ebata et al. | ........................ 714/6 |
| 2007/0180000 | A1 | 8/2007 | Mine et al. | |
| 2007/0220221 | A1 | 9/2007 | Yamagami | |
| 2007/0220326 | A1 | 9/2007 | Ninose et al. | |
| 2007/0233944 | A1 | 10/2007 | Mori et al. | |

FOREIGN PATENT DOCUMENTS

| | | |
|---|---|---|
| JP | 2002099454 | 4/2002 |
| JP | 2005-18738 | 1/2005 |
| JP | 2005216067 | 8/2005 |
| JP | 2007-80131 | 3/2007 |

(Continued)

*Primary Examiner* — Cheng-Yuan Tseng
*Assistant Examiner* — Craig Goldschmidt
(74) *Attorney, Agent, or Firm* — Volpe and Koenig, P.C.

(57) ABSTRACT

A first storage system comprises a first logical volume, and a first controller that has a first memory. A second storage system comprises a second physical storage device that constitutes the basis of a second logical volume and a journal area, and a second controller that has a second memory. At least the first memory stores a write unit size, which is the size of a write data element. The journal area is a storage area in which is stored a journal data element, which is a data element that is stored in any block of a plurality of blocks configuring the first and/or second logical volume, or a data element that is written to this block. The size of the journal data element, and the size of the respective blocks that are managed as the respective components of the first and second logical volumes are the write unit size.

4 Claims, 50 Drawing Sheets

(56) References Cited

FOREIGN PATENT DOCUMENTS

| JP | 2007-133471 | 5/2007 |
| JP | 2007200182 | 8/2007 |
| JP | 2007219657 | 8/2007 |
| JP | 2007264917 | 10/2007 |

* cited by examiner

STORAGE SYSTEM GROUP

CROSS-REFERENCE TO PRIOR APPLICATION

This application relates to and claims the benefit of priority from Japanese Patent Application number 2007-276254, filed on Oct. 24, 2007, Japanese Patent Application number 2007-303743, filed on Nov. 22, 2007, Japanese Patent Application number 2008-151288, filed on Jun. 10, 2008, and Japanese Patent Application number 2008-151302, filed on Jun. 10, 2008 the entire disclosure of which are incorporated herein by reference.

BACKGROUND

The present invention generally relates to a storage system group configured by one or more storage systems, and more particularly to data backup.

For example, the snapshot function and journal function are known as functions of a storage system.

The snapshot function holds an image of a certain logical volume at a certain point in time (for example, the point in time at which a snapshot acquisition request was received from the host). Executing the snapshot function regularly makes it possible to intermittently acquire replications (backups) of data inside a logical volume. Further, when the snapshot function is used, it is possible to restore the logical volume of the point in time at which the snapshot was acquired.

When write data is written to a logical volume specified by a write command from the host computer, the journal function creates data (a journal) comprising this write data and control information related to the writing thereof, and stores the created journal.

Japanese Patent Application Laid-open No. 2005-18738 discloses a recovery process, which is executed at a point in time other than the point at which a snapshot was created by writing the write data inside a journal to a snapshot acquired via the snapshot function.

Japanese Patent Application Laid-open No. 2007-80131 has a disclosure for switching a snapshot and a journal.

Japanese Patent Application Laid-open No. 2007-133471 has a disclosure for manipulating a snapshot restore volume.

SUMMARY

Now then, generally speaking, the size of a data element (one unit of data) acquired as backup is the size of the unit storage area managed by the storage system.

However, the size of the write data element (one unit of write data) from the host is smaller than the size of the unit storage area managed by the storage system (or, even when the write data element is larger than the unit storage area, the size of the write data element does not constitute a multiple of the unit storage area size.). In this case, when a write data element is stored in the unit storage area, a surplus space is generated in the unit storage area. Thus, a data element acquired as backup comprises a write data element and other information from the host, and as such constitutes a size that is larger than this write-date element. Therefore, there is the risk of information other than the write data element from the host also being stored as the backup data element.

Further, when a duplicate data element could exist, it is preferable to eliminate this duplicate data element.

Accordingly, an object of the present invention is to reduce the size of data acquired as backup.

As a first aspect, a first storage system comprises a first physical storage device that constitutes the basis of a first logical volume, and a first controller that has a first memory, receives from a higher-level device a write command and a write data element, which is one unit of write data, and writes the write data element to the first logical volume specified from the write command. A second storage system, which is connected to the first storage system, comprises a second physical storage device that constitutes the basis of a second logical volume and a journal area, and a second controller that has a second memory and controls access to the second physical storage device. At least the first memory of the first and second memories stores a write-unit size, which is the size of the write data element. The journal area is a storage area in which is stored a journal data element, which is a data element that is stored in a block (=block T) of a plurality of blocks configuring the first and/or second logical volume, or a data element that is written to the block T. The size of the journal data element and the sizes of the respective blocks, which are managed as respective components of the first and second logical volumes, are the write-unit size.

As a second aspect, a storage system group, which is configured by one or more storage systems, comprises a physical storage device that is the bases of a logical volume and a journal area that are configured by a plurality of blocks, and a controller that has a memory and acquires a journal data element for a certain block inside the logical volume when an update occurs in the certain block, and writes the acquired journal data element to the journal area. The controller determines whether or not a journal data element that duplicates the acquired journal data element has been stored in the journal area. If the result of the determination is positive, the controller writes element management information for managing the acquired journal data element to the journal area, and does not write the acquired journal data element to the journal area. The element management information is smaller than the size of the journal data element, and comprises a pointer indicating the address of the segment in which the duplicate journal data element is stored.

DESCRIPTION OF THE PREFERRED EMBODIMENTS

A number of embodiments of the present invention will be explained hereinbelow by referring to the figures.

Embodiment 1

Figure 1:
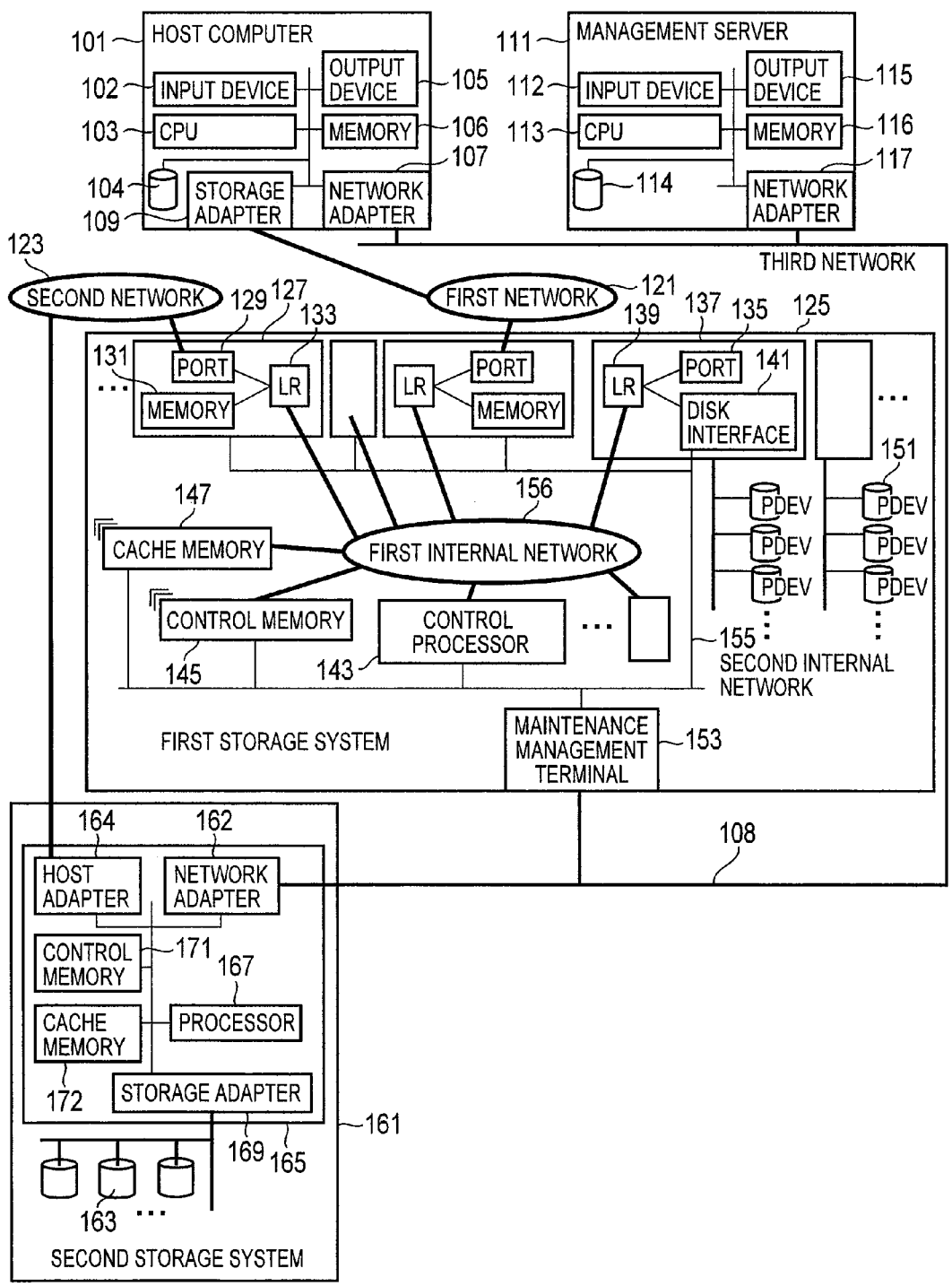
FIG. 1 shows the configuration of a computer system related to a first embodiment of the present invention.

FIG. 1 shows the configuration of a computer system related to a first embodiment of the present invention.

One or more host computers 101 and a first storage system 125 are connected to a first network 121. The first storage system 125 and a second storage system 161 are connected to a second network 123. The one or more host computers 101, a management server 111, and the first and second storage systems 125 and 161 are connected to a third network 108. The networks 121, 123 and 108 can each employ an arbitrary type of network. For example, the first and second networks 121 and 123 are SAN (Storage Area Network), and the third network 108 is a LAN (Local Area Network). Further, for example, the storage systems 125 and 161 can be connected via a leased line instead of the second network 123. Further, the second storage system 161 can be an external connection-destination storage system, or a remote copy-destination storage system.

The host computer 101 accesses a logical volume provided from the first storage system 125. The host computer 101 comprises a CPU (Central Processing Unit) 103, memory 106, auxiliary storage device 104, input devices (for example, a keyboard and a pointing device) 102, output device (for example, a display device) 105, storage adapter (for example, a host bus adapter) 109 connected to the first network 121, and a network adapter 107 connected to the third network 108. The CPU 103 sends an I/O command (either a write command or a read command) specifying an address via the storage adapter 109.

The management server 111 is a computer that manages the apparatuses 101, 111, 125 and 161 connected to the third network 108. The management server 111 comprises a CPU (Central Processing Unit) 113, memory 116, auxiliary storage device 114, input devices (for example, a keyboard and pointing device) 112, output device (for example, a display device) 115, and a network adapter 117 that is connected to the third network 108. The CPU 113 sends commands to the apparatuses 101, 111, 125 and 161 connected to the third network 108 via the network adapter 117.

The first storage system 125 has a controller and a storage device group. The controller, for example, comprises a plurality of front-end interfaces 127, a plurality of backend interfaces 137, a first internal network 156, one or more cache memories 147, one or more control memories 145, and one or more processors 143. The storage device group is configured from a plurality of physical storage devices (hereinafter, referred to as "PDEV") 151.

The front-end interface 127 is an interface circuit for communicating with either apparatus 101 or 161, which are external to the first storage system 125. Therefore, the front-end interface 127 can include an interface connected to the first network 121 and an interface connected to the second network 123. The front-end interface 127, for example, has a port 129 that is connected to either network 121 or 123, a memory 131, and a local router (hereinafter, abbreviated as "LR") 133. The port 129 and memory 131 are connected to the LR 133. The LR 133 carries out the distribution of data received by way of the port 129 for processing by an arbitrary processors 143. More specifically, for example, the configuration from a processors 143 to the LR 133 is such that an I/O command specifying a certain address is carried out by this processors 143, and the LR 133 distributes the I/O command and data in accordance with this configuration.

The backend interface 137 is an interface circuit for communicating with the PDEV 151. The backend interface 137, for example, has a disk interface 141 that is connected to the PDEV 151, a memory 135, and a LR 139. The disk interface 141 and memory 135 are connected to the LR 139.

The first internal network 156, for example, is configured from a switch (as one example, a crossbar switch) or a bus. The plurality of front-end interfaces 127, plurality of backend interfaces 137, one or more cache memories 147, one or more control memories 145, and one or more processors 143 are connected to the first internal network 156. Communications among these elements is carried out by way of the first internal network 156.

The cache memory 147 is a memory for temporarily storing either read-out or written data in accordance with an I/O command from the host computer 101.

Figure 4:
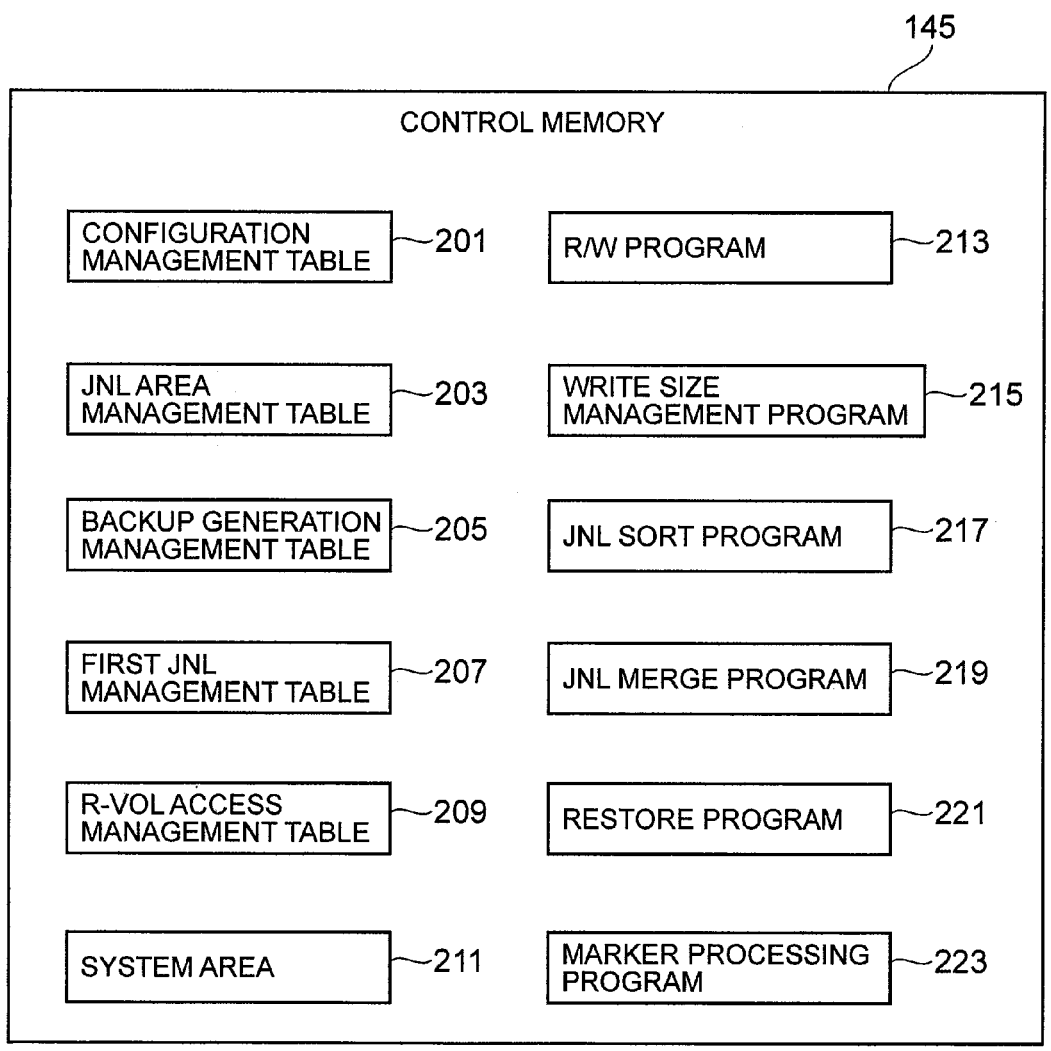
FIG. 4 shows the computer programs and information stored in the control memory inside the first storage system.

The control memory 145 is for storing various computer programs and/or information (for example, the computer programs and information shown in FIG. 4). For example, the control memory 145 stores information indicating which P-VOL (primary logical volume) is the VOL to be accessed from what host computer, information indicating which P-VOL configures a pair with which S-VOL (secondary logical volume), and information indicating which P-VOL is associated to which R-VOL (restored logical volume). From this information, it is possible to specify which S-VOL and R-VOL are logical volumes related to which host computer. As will be described hereinbelow, when the first storage system 125 receives the host write size for a certain host computer, the control processor 143 can specify the P-VOL, S-VOL and R-VOL related to this certain host computer by referencing information that is stored in the control memory 145, and can configure the host write size for the specified P-VOL, S-VOL and R-VOL.

The processors 143 carries out the processing described hereinbelow by executing the various computer programs stored in the control memory 145.

The PDEV 151 is a nonvolatile storage device, for example, a hard disk drive or a flash memory device. A RAID (Redundant Array of Independent Disks) group, which is a PDEV group that accords with RAID rules, is configured using two or more PDEV 151.

A second internal network (for example, a LAN) 155 is connected to the respective components 127, 137, 147, 145 and 143 of the controller, and a maintenance management terminal 153 is connected to this second internal network 155. The maintenance management terminal 153 is also connected to the third network 108, and is a computer for either maintaining or managing the first storage system 125. The maintenance personnel for the first storage system 125, for example, can operate the maintenance management terminal 153 (or the management server 111, which is capable of communicating with this terminal 153) to define various information to be stored in the control memory 145.

The second storage system 161 has a controller 165, and a group of PDEV 163. The controller 165, for example, has a host adapter 164, network adapter 162, control memory 171, cache memory 172, processors 167, and storage adapter 169. The functions of the host adapter 164, network adapter 162, control memory 171, cache memory 172, processors 167 and storage adapter 169 are respectively substantially the same as the functions of the front-end interface 127, network adapter 162, control memory 145, cache memory 147, processors 167, and backend interface 137.

Figure 2:
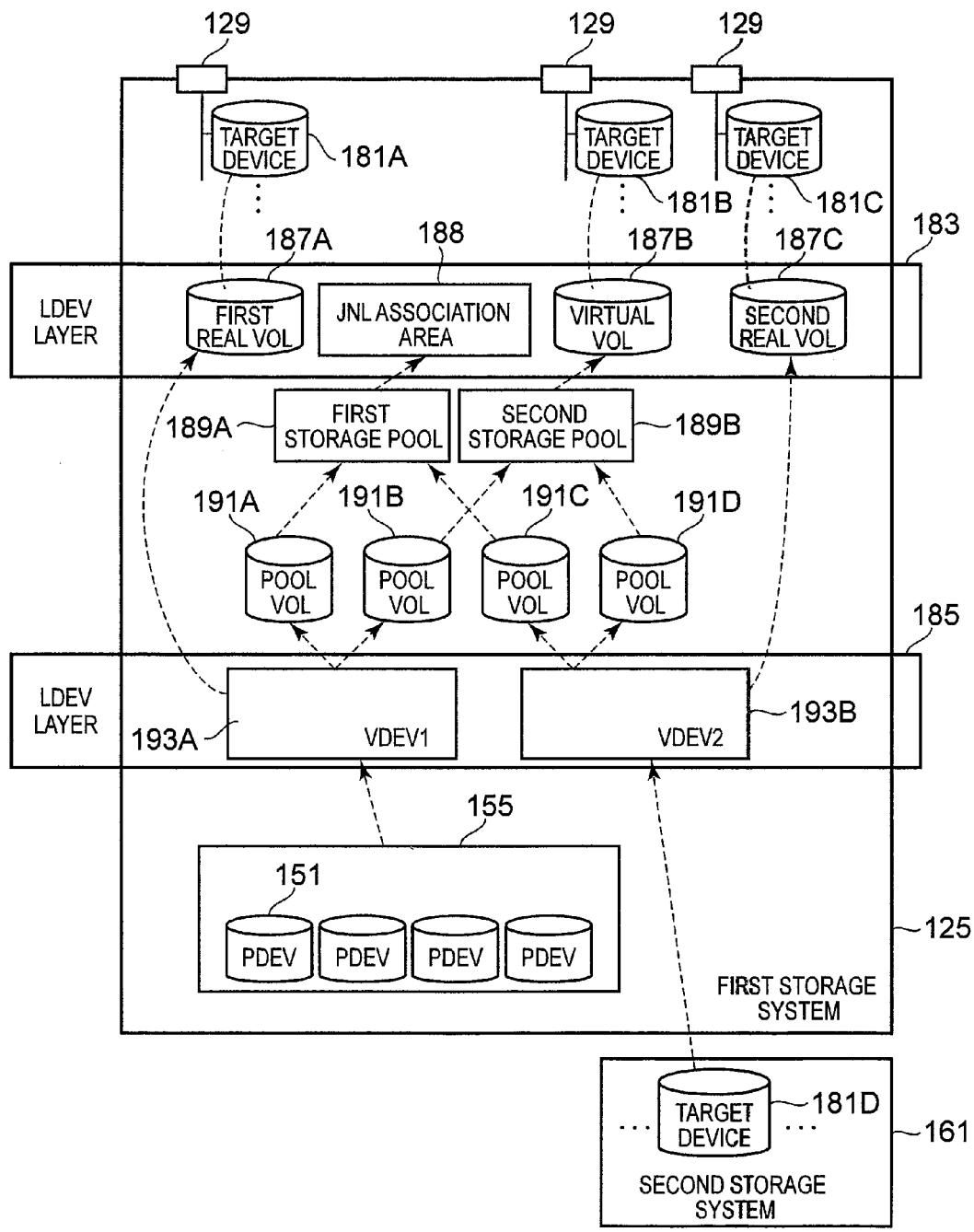
FIG. 2 shows an overview of the configuration of the storage area in a first storage system.

FIG. 2 shows an overview of the configuration of the storage area in the first storage system 125.

The logical storage hierarchy includes, in order from the lower-level to the higher-level, a VDEV layer 185, storage pools 189A and 189B, and an LDEV layer 183.

One or more virtual devices (VDEV) are in the VDEV layer 185. The VDEV is a storage area in which a prescribed address range is configured. Each of the plurality of storage area parts that configure this storage area is a logical volume.

In the example of FIG. 2, a first VDEV 193A is a substantive storage area provided by one RAID group 195. The first VDEV 193A, for example, constitutes the basis of a first real VOL 187A and pool VOL 191A and 191B. Therefore, data written to these logical volumes 187A, 191A and 191B is actually being written to the RAID group 195 that forms the basis of the first VDEV 193A.

Meanwhile, a second VDEV 193B is a virtual storage area. The second VDEV 193B constitutes the basis of a second real VOL 187C, and pool VOL 191C and 191D. Therefore, data written to these logical volumes 187C, 191C and 191D is actually written to storage resources (for example, a RAID group) inside the second storage system 161, which constitutes the basis of the second VDEV 193B. More specifically, for example, the storage area part corresponding to the second real VOL 187C is allocated to a target device 181D inside the second storage system 161, and, in this case, data written to the virtual VOL 187C is actually transferred to the second storage system 161, and written to the logical volume allocated to the target device 181D.

A storage pool is a cluster of one or more pool VOL. In the example of FIG. 2, a first storage pool 189A is a cluster of pool VOL 191A and 191C, and second storage pool 189B is a cluster of pool VOL 191B and 191D. Pool VOL 191A through 191D are logical volumes that are not associated to the target devices 181A through 181C (that is, logical volumes not provided to the host computer 101). Furthermore, all of the pool VOL inside the first storage system 125 can be created on the basis of the VDEV based on the RAID group inside the first storage system 125, and, by contrast, can also be created on the basis of the VDEV based on the storage resources inside the second storage system 161.

There is a plurality of logical volumes 187A through 187C and a JNL association area 188 in the LDEV layer 183 ("JNL" is the abbreviation for journal). Unlike the pool VOL, all of the logical volumes 187A through 187C are capable of being recognized by the host computer 101. According to the example of FIG. 2, logical volume 187A is a substantive storage area (hereinafter referred to as the "first real VOL") inside the first storage system 125. Logical volume 187B is a virtual logical volume (hereinafter referred to as a "virtual VOL") associated to storage pool 189B. For example, virtual VOL 187B is configured from a plurality of virtual areas, and storage pool 189B is configured from a plurality of pool areas. As a result of data being written to a virtual area inside virtual VOL 187B, a pool area is allocated from storage pool 189B to this virtual area, and the write-targeted data is written to this pool area. If this pool area belongs to pool VOL 191B, the data is stored inside the first storage system 125, and if this pool area belongs to pool VOL 191D, this data is stored inside the second storage system 161.

The JNL association area 188 is a storage area that is not provided to the host computer 101. This area 188, for example, exists inside the first storage pool 189. This area 188 is configured by a JNCB area, which will be described further below, and a JNL area. "JNCB" is a character string that signifies a second JNL management table to be described below.

The target devices 181A through 181C are seen as logical devices by the host computer 101, and more specifically, for example, are LUN (Logical Unit Number) in an open system, and "devices" in a mainframe system. Target devices 181A through 181C are associated to a port 129 and to logical volumes 187A through 187C in the LDEV layer 183. According to the example of FIG. 2, an I/O (either a write or a read) occurs in the first real VOL 187A associated to target device 181A when this device 181A is specified in an I/O command, an I/O occurs in virtual VOL 187B associated to target device 181B when this device 181B is specified, and an I/O occurs in a second real VOL 187C associate to target device 181C when this device 181C is specified.

Figure 3:
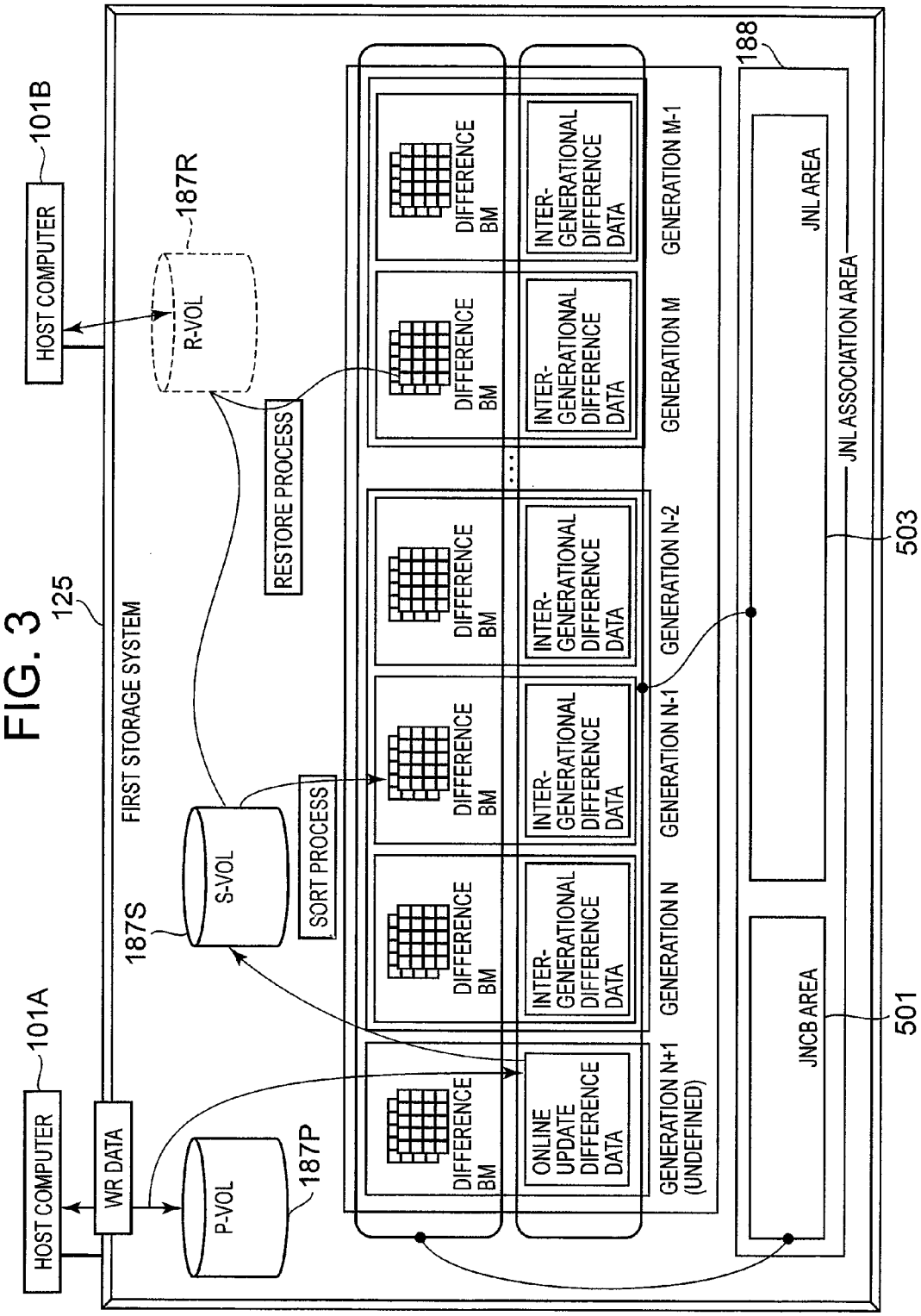
FIG. 3 shows an overview of the storage of a JNL data element.

FIG. 3 shows an overview of the storage of a JNL data element. Furthermore, in FIG. 3, the word "write" is abbreviated as "WR", and write may also be abbreviated in this way in other figures as well.

A P-VOL 187P and an S-VOL 187S are in the first storage system 125. Further, P-VOL 187P and S-VOL 187S, which can construct R-VOL 187R, for example, are either the above-described first or second real VOL 187A or 187C, and R-VOL 187R is the above-described virtual VOL 187B.

P-VOL 187P is a primary logical volume (online logical volume). P-VOL 187P is updated by write data being written in from the host computer 101.

S-VOL 187S is a secondary logical volume that is paired up with the P-VOL 187P, and has the same storage capacity as the P-VOL 187P.

The R-VOL 187R is a logical volume that has the contents of a specified generation of the P-VOL 187P. The R-VOL 187R is a virtual volume like that described hereinabove, and, as will be explained further below, is created in response to a request from the user or administrator.

The JNL association area 188, as described above, is configured from a JNCB area 501 and a JNL area 503. As shown in FIG. 3, a difference BM (BM is the abbreviation for "bitmap") corresponding to an undefined generation and a difference BM corresponding to each defined generation are stored in the JNCB area 501. Online update difference data corresponding to an undefined generation and online update difference data corresponding to each defined generation are stored in the JNL area 503.

Here, a "generation" is a certain point in time of the P-VOL 187P. For example, generation (N) is subsequent to generation (N−1), and is a time when a prescribed generation definition event occurred in the P-VOL 187P (in this embodiment, the time when a marker, which will be explained below, was received from the host computer 101). Furthermore, in the example of FIG. 3, since the latest generation that has been defined is generation (N), the undefined generation is generation (N+1). Because an image of the P-VOL 187P at the time the marker was received is acquired by the first storage system 125, the marker can also be called a snapshot acquisition request.

"Online update difference data" is an aggregate of online update difference data elements. The "online update difference data element" is a JNL data element of the P-VOL 187P. The "JNL data element" is an amount of JNL data the size of a P-VOL 187P unit storage area (the host write size explained hereinbelow). The JNL data element can be either an after JNL data element or a before JNL data element. The "after JNL data element" is a write data element in the P-VOL 187P. The "before JNL data element" is a data element (data element stored in the write-destination storage area of a write data element) that has been saved from the P-VOL 187P via a COW (Copy On Write) as a result of a write data element being written to the P-VOL 187P. In the following explanation, the unit storage area (the unit storage area managed in host write size units, which will be described hereinbelow) in which a data element inside a logical volume is stored may for the sake of convenience be called a "block", and the storage area in which a data element inside the JNL area 503 is stored may for the sake of convenience be called a "segment". Further, in the following explanation, it is supposed that an online update difference data element is an after JNL data element.

Furthermore, the maximum size of online update difference data is the same size as the P-VOL corresponding to this data. This is because the online update difference data element that corresponds to the same block of the corresponding P-VOL is overwritten inside the JNL area 503. Therefore, the maximum size of the inter-generational difference data described hereinbelow is also the same as the size of the P-VOL corresponding to this data. In other words, the size of the JNL sub-area of the write destination of the online update difference data element is the maximum size, and can be made the same size as the P-VOL (This point is also the same for the inter-generational difference data and the merge difference data to be described hereinbelow.).

The "inter-generational difference data" is an aggregate of inter-generational difference data elements. The "inter-generational difference data element" is a data element that is saved from the S-VOL 187S in accordance with a COW resulting from an online update difference data element being written to the S-VOL 187S. More specifically, for example, in a case when the undefined generation is generation (N), when the first storage system 125 receives a marker (specified electronic data) from the host computer 101, generation (N) is defined, and the undefined generation becomes (N+1). In this case, online update difference data accumulated in the JNL area 503 (that is, data equivalent to the difference between the generation (N) P-VOL 187P and the generation (N−1) P-VOL 187P) is written to the S-VOL 187S. Each time an online update difference data element is written, a data element from the S-VOL 187S is saved to the JNL area 503 via the COW as an inter-generational difference data element. Accordingly, the S-VOL 187S becomes a replicate of the generation (N) P-VOL 187P, and inter-generational difference data corresponding to generation (N−1) (that is, data equivalent to the difference between the generation (N−1) S-VOL 187S and the generation (N−2) S-VOL 187S) is stored in the JNL area 503. Thus, the S-VOL 187S generation is the generation immediately preceding the P-VOL 187P generation.

The "difference BM" is a bitmap indicating the difference between the generations of a logical volume. More specifically, for example, in the example of FIG. 3, the difference BM corresponding to generation (N) is the bitmap indicating the difference between the generation (N) P-VOL 187P and the generation (N−1) P-VOL 187P. When the write data element is first written to a certain block inside the P-VOL 187P at a certain point in time later than generation (N−1), the bit corresponding to this certain block (the bit inside the difference BM corresponding to generation (N)) is turned ON (that is, the value indicating the occurrence of a write (for example, "1") is updated), and the online update difference data element corresponding to this write data element is stored in the JNL area 503. Furthermore, the respective bits that configure the difference BM correspond to the respective blocks of the P-VOL 187P. The size of the respective blocks constitutes the host write size in accordance with formatting that will be explained by referring to FIG. 7. The "host write size" is the unit size of data written from the host computer 101 (the size of the write data element).

Furthermore, as will be explained further below by referring to FIGS. 11 and 12, it is possible to merge a plurality of generations' worth of inter-generational difference data and difference BM. Consequently, it is possible to reduce the storage capacity that is consumed. Hereinbelow, post-merge inter-generational difference data will be referred to as "merged difference data".

Further, in FIG. 3, a sort process and a restore process are shown. Overviews of the respective processes are as follows.

<Sort Process> Online update difference data elements are lined up (spread out) chronologically in the JNL area 503 (that is, in the order in which they were written to the JNL area 503). When the online update difference data is read out from the JNL area 503 and written to the S-VOL 187S, the online update difference data elements are read out in the order of the addresses of the P-VOL 187P (either ascending or descending address order) instead of chronologically. Thus, the online update difference data elements are written to the S-VOL 187S in address order, and as such, the inter-generational difference data elements written to the JNL area 503 from the S-VOL 187S via a COW become lined up (become spread out) in the address order of the P-VOL 187P. The process by which inter-generational difference data is lined up in address order in the JNL area 503 by reflecting the chronologically arranged online update difference data elements in the S-VOL 187S in address order is the "sort process". Furthermore, as in the third embodiment explained hereinbelow, a sort process in a case when there is no online update difference data is carried out so as to line up inter-generational difference data in address order in the JNL area 503.

<Restore Process> The "restore process" creates the R-VOL 187R in response to a request from either the user or the administrator. It is possible to read from the R-VOL 187R. Further, it is also possible to write to the R-VOL 187R. Read and write processes for the R-VOL 187R will be explained further below by referring to FIGS. 14 and 15.

FIG. 4 shows computer programs and information stored in the control memory 145. In the following explanation, a process described as being performed by a program is actually carried out by the processors 143 that executes this program.

The control memory 145 stores a configuration management table 201, JNL area management table 203, backup generation management table 205, first JNL management table 207, R-VOL access management table 209, R/W program 213, write size management program 215, JNL sort program 217, JNL merge program 219, restore program 221, and marker processing program 223. The control memory 145 also has a system area 211. The R/W program 213 controls I/O in accordance with an I/O command from the host computer 101. The write size management program 215 configures the host write size. The JNL sort program 217 executes a sort process. The JNL merge program 219 merges a plurality of generations of inter-generational difference data. The restore program 221 creates the R-VOL 187R. The marker processing program 223 processes a marker from the host computer 101. The various programs and information stored in the control memory 145 will be explained in detail below. Further, in the following explanation, logical volume may be abbreviated as "VOL".

Figure 5:
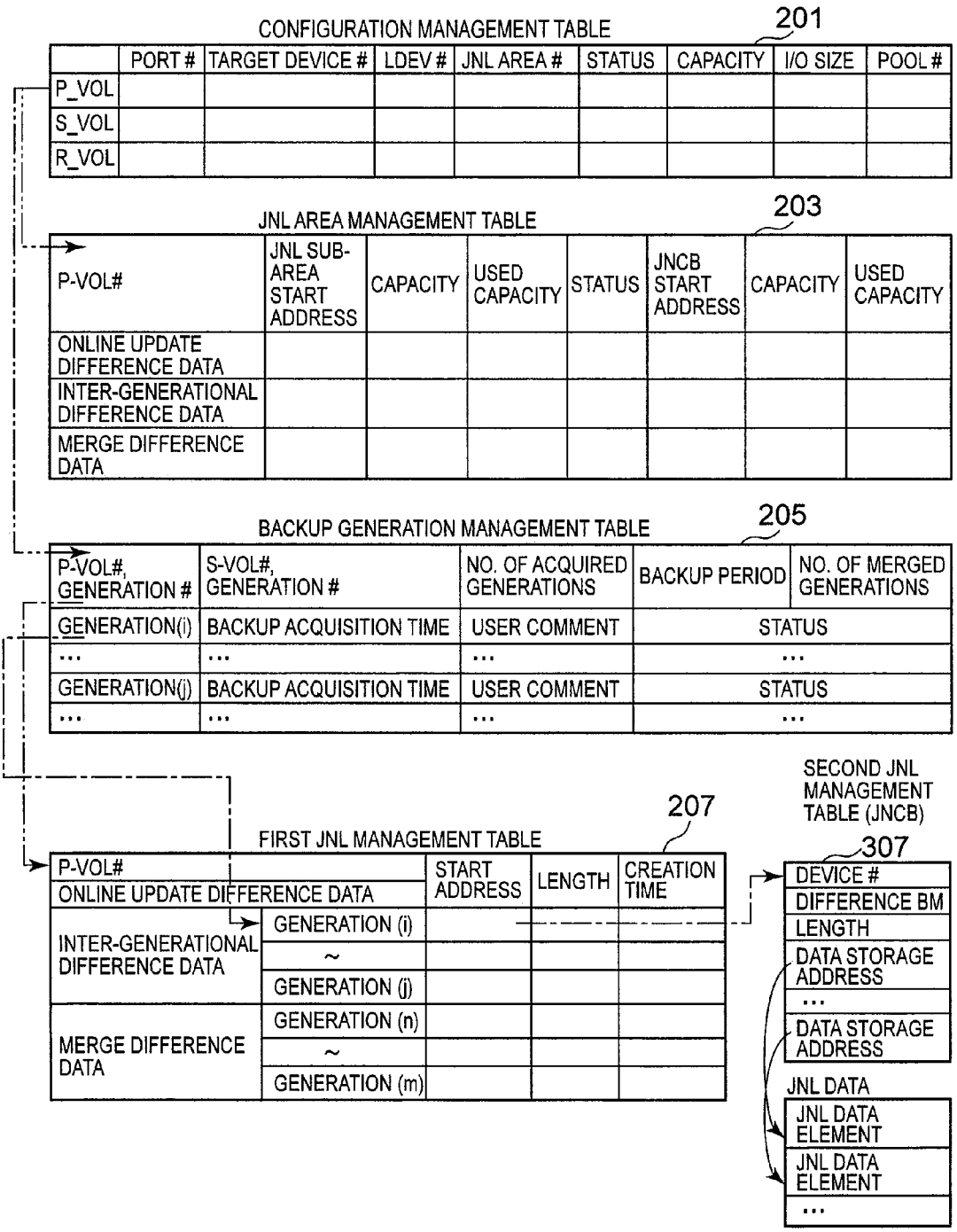
FIG. 5 shows examples of the configuration management table, JNL area management table, backup generation management table and first JNL management table shown in FIG. 4.

FIG. 5 shows examples of the configuration management table 201, JNL area management table 203, backup generation management table 205, and first JNL management table 207 shown in FIG. 4. Furthermore, FIG. 5 also shows a second JNL management table (JNCB) 307 and JNL data managed by a JNCB 307 that are not shown in FIG. 4, but the JNCB 307 and JNL data are stored in the PDEV group (the storage pool in the example described hereinabove) without being stored in the control memory 145.

The configuration management table 201 is provided in each P-VOL, and is for managing the P-VOL and S-VOL and the R-VOL related thereto. In the configuration management table 201, for example, are recorded a "port #" (number of the port allocated to the target device corresponding to the VOL), "target device #" (number of the target device corresponding to the VOL), "LDEV #" (number for identifying the VOL), "JNL area #" (number of the JNL area corresponding to the VOL from among a plurality of JNL areas), "status" (the status of the VOL, for example, the access restriction status, such as R/W prohibited or R only), "capacity" (the capacity of the VOL), "I/O size" (the above-mentioned host write size), and "pool #" (number of the storage pool allocated to the VOL) for each VOL of the P-VOL, and the S-VOL and R-VOL related thereto.

The JNL area management table 203 is provided in each P-VOL, and is for managing the location of online update difference data, inter-generational difference data and merge difference data corresponding to the P-VOL. More specifically, there is a "JNL sub-area start address" (address indicating the start of the JNL sub-area), "capacity" (capacity of the JNL sub-area corresponding to the data), "used capacity" (capacity occupied by data), "status" (for example, 'normal' if it is a state in which the JNL sub-area can be used normally, 'blockage' if the JNL sub-area cannot be used for one reason or another, 'insufficient capacity' if the free capacity of the JNL (the difference between the capacity and the used capacity) is less than a prescribed threshold), "JNCB start address" (address indicating the start of the JNCB), "capacity" (capacity of the JNCB), and "used capacity" (the capacity occupied by a JNCB group) for each of the online update difference data, inter-generational difference data, and merge difference data. Furthermore, the "JNL sub-area" is one part of the JNL area 503. Further, for the inter-generational difference data and merge difference data, a "JNL sub-area start address", "capacity", "used capacity", "status", "JNCB start address", "capacity" and "used capacity" are registered for each generation.

The backup generation management table 205 is provided for each P-VOL, and is for managing backup data related to the P-VOL. In the backup generation management table 205, for example, there is recorded a "P-VOL #" (number of the P-VOL), "generation #" (number indicating the latest generation), "S-VOL #" (number of the S-VOL that configures a pair with the P-VOL), "generation #" (number indicating the latest generation of the S-VOL), "number of acquired generations" (number of generations of backups for the P-VOL), "backup period" and "number of merged generations" (whether a merge process was executed when a certain number of generations' worth of inter-generational difference data had accumulated). The backup generation management table 205 also has for each generation of the P-VOL a "generation #" (number indicating the generation), "backup acquisition time" (when a backup was acquired (in other words, the date and time at which the marker, which constituted the reason for defining this generation), was received), "user comment" (arbitrary user information for the user to manage a backup), backup "status" (for example, whether a backup was a success or a failure).

The first JNL management table 207 is provided for each P-VOL, and is for managing the online update difference data, inter-generational difference data, and merge difference data corresponding to the P-VOL. For online update difference data, for example, there is recorded a "start address" (start address of the JNCB), "length" (size of the online update difference data, for example, the number of online update difference data elements), "creation time" (time at which the online update difference data element was stored (for example, the time at which the marker, which constituted the reason for defining the latest generation), was received) Further, for the inter-generational difference data, "start address", "length" and "creation time" are recorded for each generation. Furthermore, the "creation time" here is the time at which corresponding inter-generational difference data was stored in the JNL sub-area. Similarly, for the merge difference data, a "start address", "length" and "creation time" are also recorded for each generation. Furthermore, "generation" here is a certain generation of a plurality of generations corresponding to the merge difference data (for example, either the latest or the oldest generation), and "creation time" is the time at which corresponding merge difference data was stored in the JNL sub-area. Referencing the "start address" corresponding to online update difference data and other such JNL data makes it possible to reference the JNCB corresponding to this JNL data.

The JNCB 307 exists for each generation for both the inter-generational difference data and the merge difference data. The JNCB 307 is a table for managing the locations of a difference BM and data element corresponding to a generation. More specifically, for example, the JNCB table 307 records a "device #" (number of the corresponding P-VOL), "length" (length of the corresponding JNL data (online update difference data, inter-generational difference data or merge difference data)), "difference BM" (difference BM corresponding to a generation), and data storage address corresponding to the respective JNL data elements that configure the corresponding JNL data.

Figure 6:
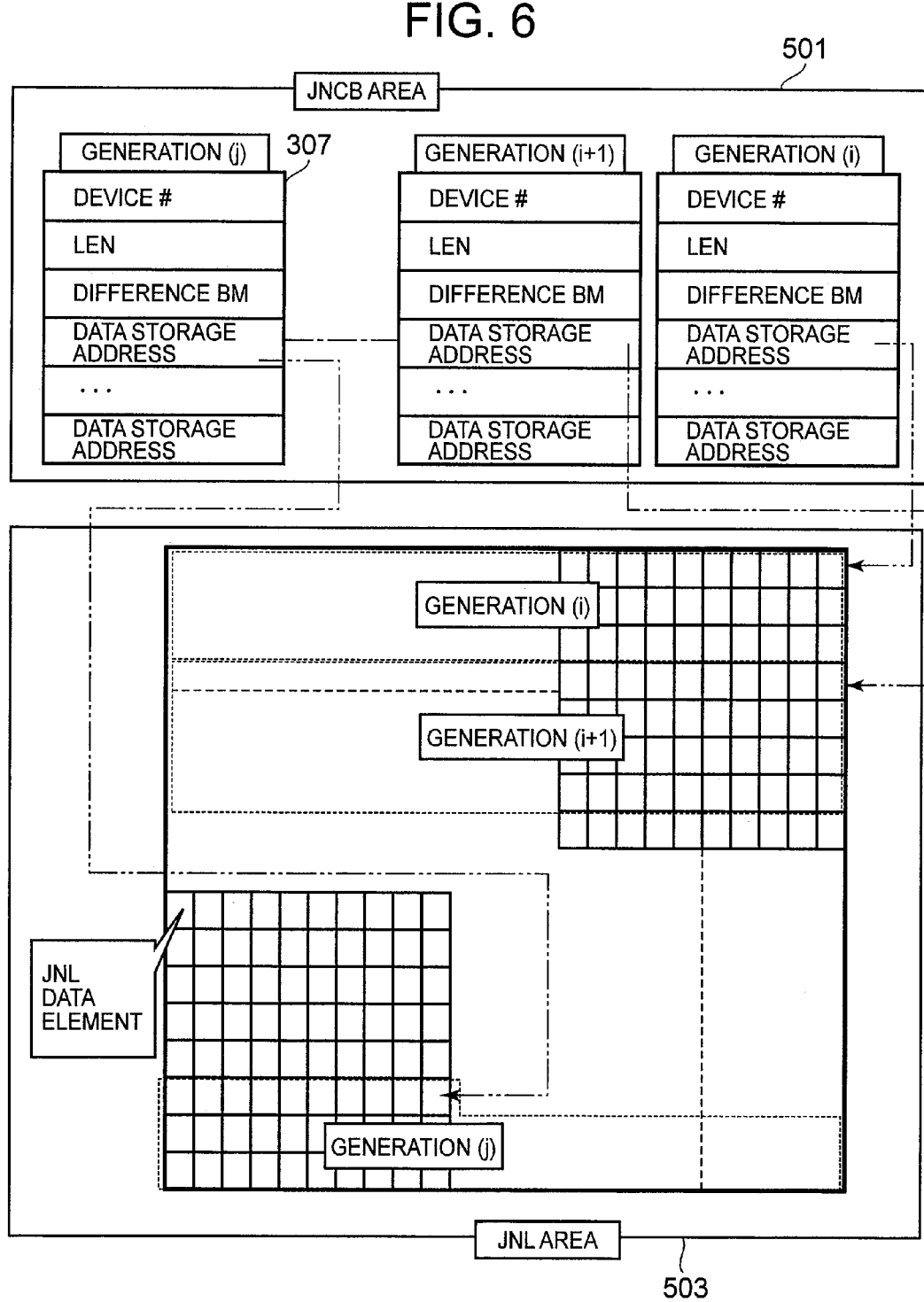
FIG. 6 shows a data management scheme that takes inter-generational difference data as an example from among online update difference data, inter-generational difference data and merge difference data.

FIG. 6 shows a data management system that takes inter-generational difference data as an example from among online update difference data, inter-generational difference data and merge difference data.

As shown in FIG. 6, a plurality of JNCB corresponding to a plurality of generations is stored in the JNCB area 501, and a plurality of JNL sub-areas corresponding to this plurality of generations exists in the JNL area 503.

From the difference BM inside the JNCB 307 corresponding to a specified generation (for example, generation (i)), it is possible to learn where in the P-VOL of that generation there was an update. Further, referencing the respective data storage addresses recorded in the JNCB 307 corresponding to this generation makes it possible to learn where inside the JNL area 503 the respective data elements, which configure the inter-generational difference data corresponding to this generation, exist.

Figure 7:
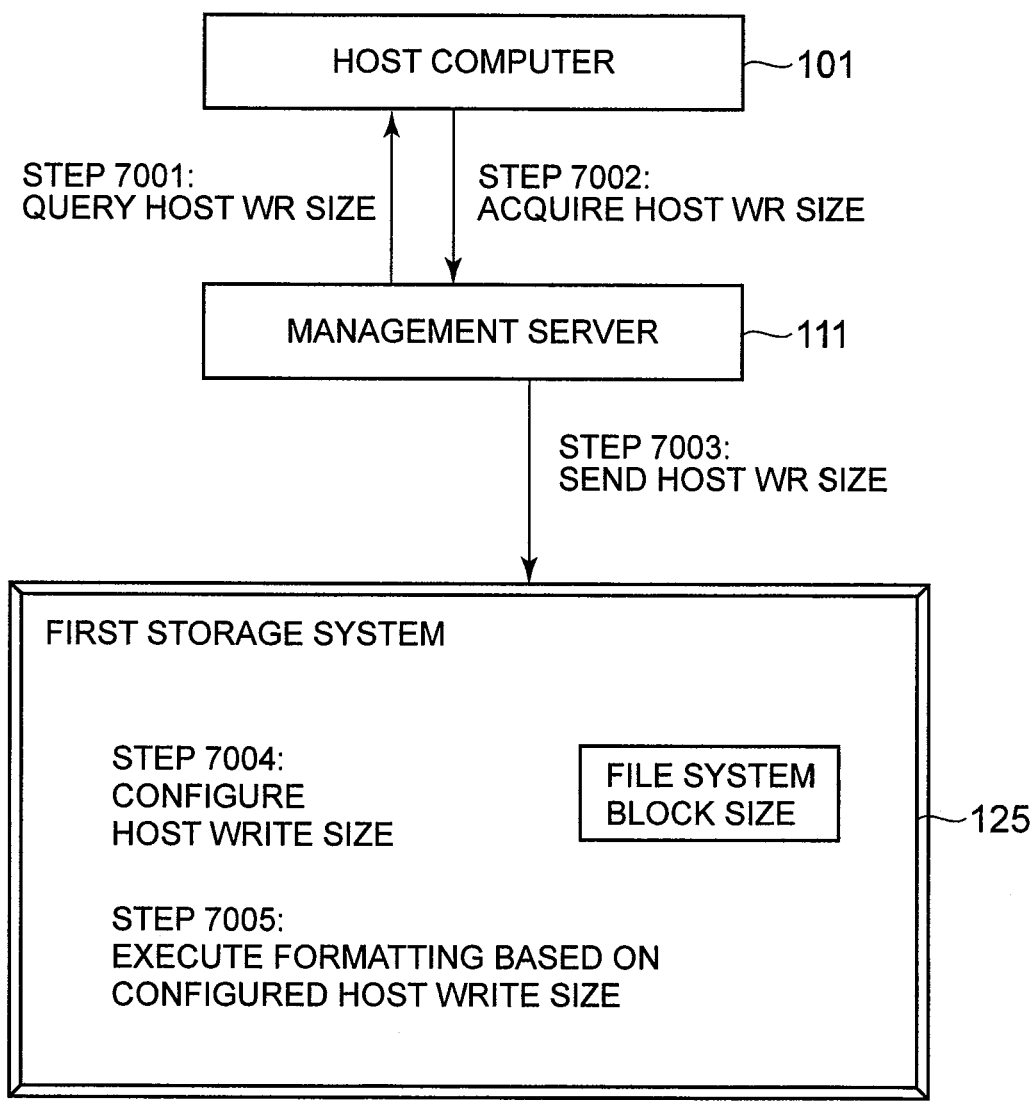
FIG. 7 shows the flow of a host write size configuration process.

FIG. 7 shows the flow of the process for configuring the host write size.

The management server 111 issues a host write size query to the host computer 101 (Step 7001). The host write size from the host computer 101 is sent as a reply by a prescribed computer program inside the host computer 101 (a computer program that has a function for replying with a host write size in response to the above-mentioned query) being executed by the CPU 103 (Step 7002). This prescribed computer program, for example, can include a file system or a database management system (DBMS).

The management server 111 sends the replied host write size and the host identifier (or P-VOL number) corresponding to this host write size to the first storage system 125 (and the second storage system 161).

The write size management program 215 (refer to FIG. 4) specifies the respective P-VOL corresponding to the host identifier (or P-VOL number) from the management server 111, and configures the host write size from the management server 111 in the configuration management tables 201 corresponding to these respective P-VOL as the I/O size (Step 7004).

Then, the write size management program 215 executes a formatting process based on this host write size (Step 7005). In the formatting process, for example, the JNL area management table 203, backup generation management table 205, first JNL management table 207 and JNCB 307 corresponding to the above-described specified respective P-VOL are created. More specifically, for example, the size of the block that configures the P-VOL, and the size of the segment that configures the JNL area 503 are managed as being the same size as the host write size. Therefore, the number of bits configuring the difference BM inside the JNCB 307 constitutes the number of blocks obtained by the P-VOL being delimited by the host write size. Consequently, for example, the size of the online update difference data element, the size of the data element saved from the S-VOL, or the size of the data element copied from the P-VOL to the S-VOL becomes the host write size.

Furthermore, when the host write size is not configured as the I/O size, the size of the created JNL data element is the initial value of the I/O size (for example, the unit management size of the cache memory 147, or the unit management block size of the file system). Further, the write size management program 215 can also receive the host write size from the host computer 101. Further, the block size, the block size of the S-VOL that configures a pair with the P-VOL, and the segment size of the JNL sub-area related to the P-VOL may differ for each P-VOL. This is because the host write size can also differ if the host computer 101 (or operating system) that uses the P-VOL differs. More specifically, for example, the block size of the P-VOL accessed from a first type host computer is a first host write size corresponding to this first type host computer, and the block size of the P-VOL accessed from a second type host computer can constitute a second host write size, which corresponds to this second host type host computer, and which differs from the first host write size.

Figure 8:
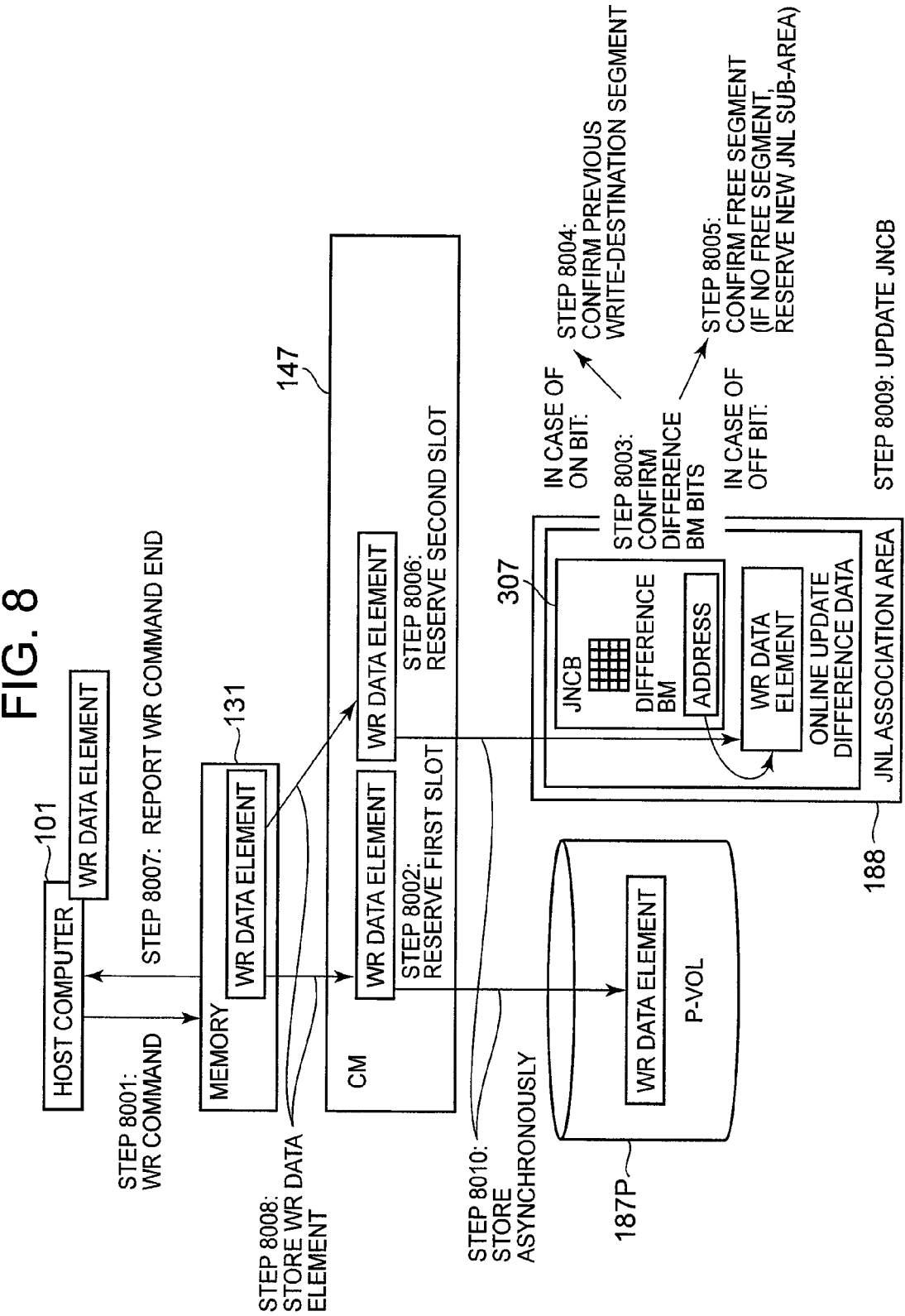
FIG. 8 shows the flow of a write process that writes a write data element to a P-VOL.

FIG. 8 shows the flow of a write process that writes a write data element to the P-VOL. Hereinafter, each P-VOL that is specified by the write command will be referred to as the "target P-VOL" in the explanation of FIG. 8. Further, in the following explanation, to prevent the explanation from becoming redundant, a target corresponding to generation K will be expressed by appending (K) after the name of this target. More specifically, for example, a JNCB corresponding to generation (j) will be expressed as "JNCB (j)", and an S-VOL corresponding to generation (j−1) will be expressed as "S-VOL (j−1)".

The front-end interface 127 receives a write command and write data element from the host computer 101, and stores the write data element in memory 137 (Step 8001). The write command is transferred to the processors 143.

The R/W program 213 (Refer to FIG. 4) reserves a first slot from the cache memory 147 in response to write command reception (Step 8002). Furthermore, the "slot" is the unit management area of the cache memory 147. The slot size, for example, is larger than the host write size. When the host write size has not been configured, for example, a JNL data element is created in the slot size as the initial value.

The R/W program 213 references the bit corresponding to the write-destination block specified by the write command in the difference BM (latest difference BM) that corresponds to an indefinite point in time of the target P-VOL 187P (Step 8003).

If this bit is indicated as having been updated, the R/W program 213 references the data storage address corresponding to this bit, and specifies the segment indicated by this address (Step 8004).

Conversely, if the bit referenced in Step 8003 is indicated as not having been updated, the R/W program 213 specifies a free segment inside the JNL sub-area corresponding to the online update difference data for the target P-VOL 187P by referencing the JNL area management table 203 corresponding to the target P-VOL 187P (Step 8005). Furthermore, if there is no free segment, a new JNL sub-area can be reserved.

The R/W program 213 reserves a second slot from the cache memory 147 (Step 8006).

The R/W program 213 reports the end of the write command to the host computer 101 that was the source of the write command (Step 8007). In response to this, the write data element is sent from the host computer 101 and stored in the memory 131 of the front-end interface 127.

The R/W program 213 respectively writes the write data elements stored in the memory 131 of the front-end interface 127 to the first and second slots (Step 8008).

The R/W program 213 updates the JNCB 307 corresponding to the online update difference data of the target P-VOL 187P (Step 8009). More specifically, for example, the data storage address, which corresponds to the destination segment (referred to in the explanation of FIG. 8 as the "JNL-destination segment") in which the write data element is written as the online update difference data element, is added. Further, for example, if the write-destination block has not been updated, the bit (bit inside the difference BM) corresponding to the write-destination block is updated to ON (the value indicating updated).

The R/W program 213 writes the write data element inside the first slot to the write-destination block inside the target P-VOL 187P, and writes the write data element inside the second slot to the above-mentioned JNL-destination segment (the segment specified in either Step 8004 or 8005) (Step 8010). The write data elements inside the first and second slots can be written at the same time, or can be written at different times.

Figure 9:
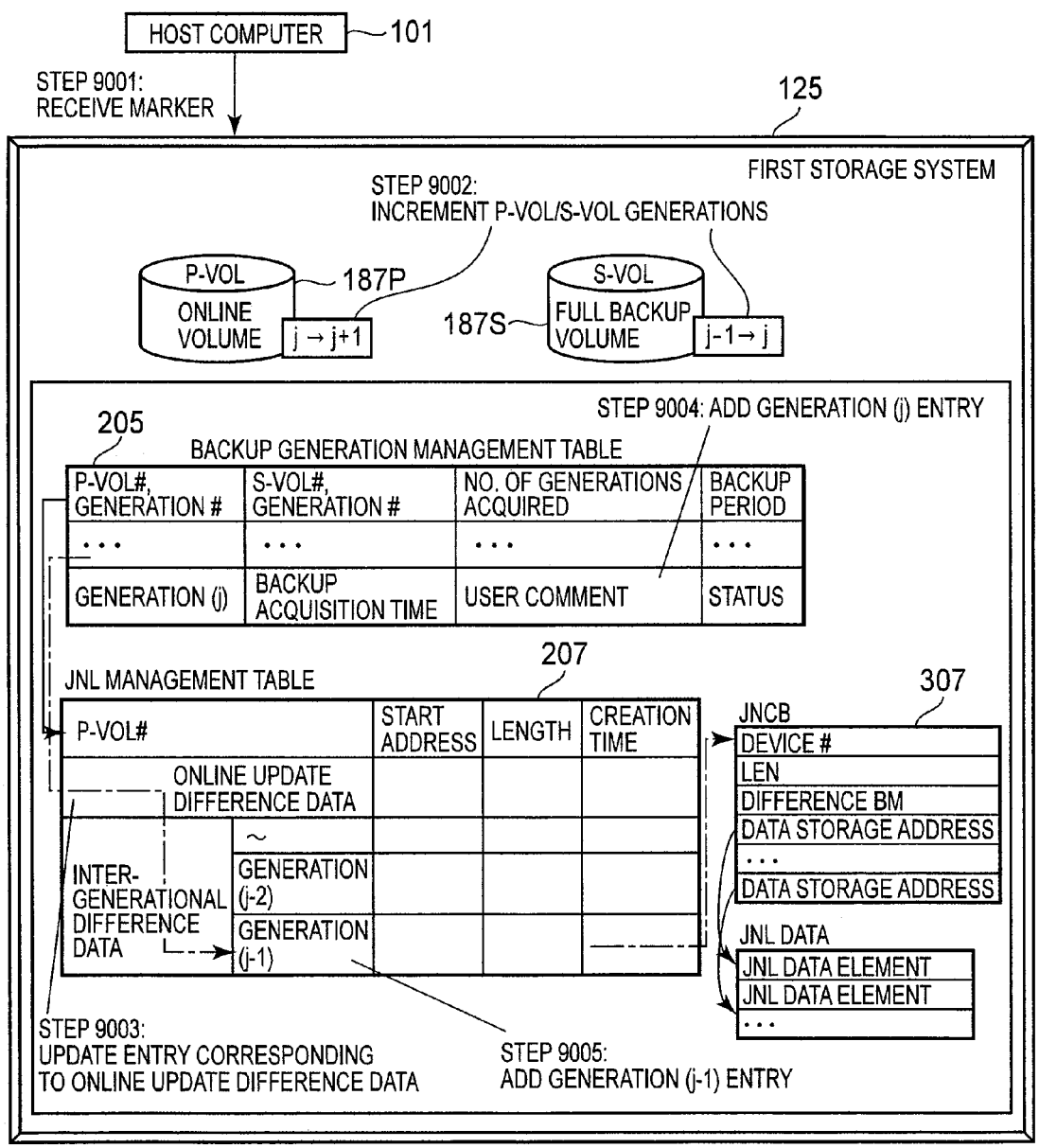
FIG. 9 shows marker reception and the flow of processing carried out in response to marker reception.

FIG. 9 shows the marker reception and the flow of processing carried out in response to marker reception. Furthermore, in the explanations of FIG. 9 and the subsequent FIG. 10, a P-VOL specified by a marker will be referred to as the "target P-VOL", and an S-VOL that configures a pair with a target P-VOL will be referred to as the "target S-VOL".

The front-end interface 127 receives a marker from the host computer 101 (Step 9001). The received marker is transferred to the processors 143.

The marker processing program 223 respectively increments by 1 the generations of the target P-VOL 187P and the target S-VOL 187S in response to receiving the marker (Step 9002). For example, the generation of the target P-VOL 187P is updated from j to j+1, and the generation of the target S-VOL 187S is updated from j−1 to j. More specifically, for example, the respective generation # of the target P-VOL and target S-VOL are updated in the backup generation management table 205. That is, generation (j) of the target P-VOL 187P is defined, and generation (j+1) is the undefined generation.

The marker processing program 223 adds the "start address", "length" and "creation time" corresponding to the online update difference data (j+1) to the first JNL management table 207 (Step 9003). That is, a JNL sub-area in which the online update difference data (j+1) is to be stored is prepared. Consequently, the online update difference data (j) of the marker reception value need not be overwritten by the online update difference data (j+1).

The marker processing program 223 adds the defined generation (j) row to the backup generation management table 205, and registers the backup acquisition time (marker reception time) and a user comment received at the same time as marker reception in this row (Step 9004).

The marker processing program 223 adds a generation (j−1) row for the inter-generational difference data to the first JNL management table 207 (Step 9005). At this time, JNCB (j−1) is created based on the "I/O size" (that is, the host write size) of the S-VOL (more specifically, for example, the number of bits configuring the difference BM (j−1) is used as the number of blocks for this "I/O size"). The start location of JNCB (j−1) is written in the added row as the "start address". JNCB (j−1) is updated on the basis of the sort process. This sort processing will be explained by referring to FIG. 10.

Figure 10:
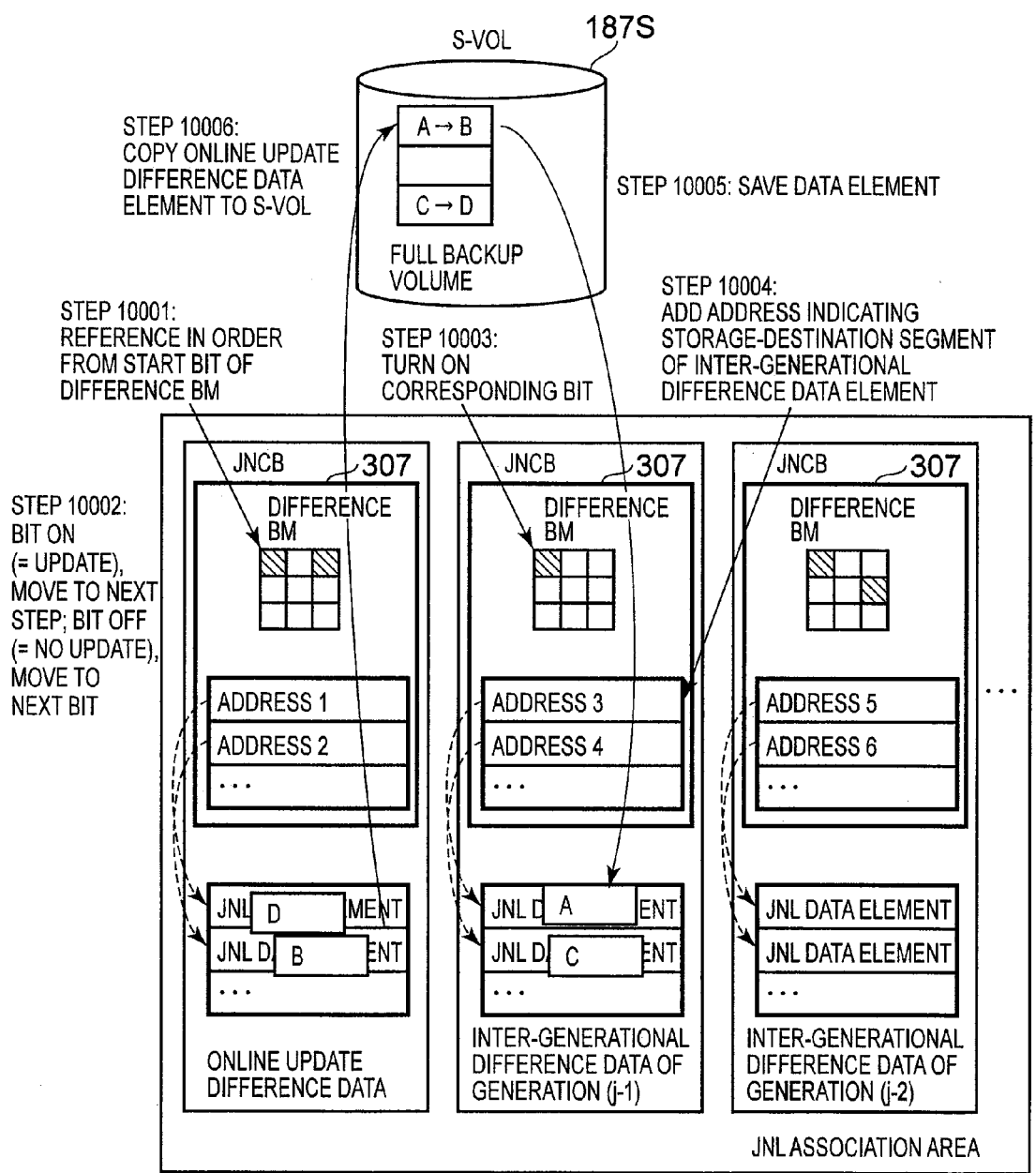
FIG. 10 shows the flow of a sort process of the first embodiment.

FIG. 10 shows the flow of the sort process. Furthermore, the online update difference data and the difference BM corresponding thereto shown in FIG. 10 correspond to generation (j).

In response to marker reception, the JNL sort program 217 (refer to FIG. 4) boots up. The JNL sort program 217 executes the sort process using the flow of processing shown in FIG. 10.

That is, the JNL sort program 217 references the bits of the difference BM (j) corresponding to the target P-VOL 187P sequentially from the start bit (Step 10001). If the referenced bit is ON (if this bit is indicated as having been updated), Step 10003 is carried out for this bit, and if the referenced bit is OFF (if this bit is indicated as not having been updated), the subsequent bit is referenced (Step 10002).

The JNL sort program 217 turns ON the bit in difference BM (j−1) that corresponds to the ON bit in difference BM (j) (Step 10003).

The JNL sort program 217 adds the data storage address corresponding to the bit that was turned ON in Step 10003 to the inside of JNCB (j−1) (Step 10004). This data storage address indicates the save-destination segment (the segment inside the JNL sub-area (j−1)) of Step 10005. This save-destination segment is the segment subsequent to the save-destination segment of the immediately previous time. Consequently, the respected data elements saved from the target S-VOL (j) are written to contiguous segments inside the JNL sub-area (j−1).

The JNL sort program 217 saves the data element "A" that is stored in the block (the block inside target S-VOL 187S) corresponding to the bit that is ON in difference BM (j−1) from this block to the above-mentioned save-destination segment (Step 10005).

The JNL sort program 217 writes data element "B", which is stored in the segment (the segment inside JNL sub-area (j)) indicating the data storage address corresponding to the ON bit in difference BM (j), to the save-source block (the block inside target S-VOL (j)) (Step 10006).

According to the above Steps 10005 and 10006, a COW resulting from the online update difference data element "B" being written to a block inside the target S-VOL (j), saves data element "A", which is stored in this block, to the segment inside JNL sub-area (j−1), and the online update difference data element "B" is written to the block inside the target S-VOL (j).

As described hereinabove, the bits configuring difference BM (j) are referenced in block address order, and each time an ON bit is detected, JNL data elements are sorted by Steps 10003 through 10006 being carried out. That is, the online update difference data elements, which had been chronologically contiguous in JNL sub-area (j), are reflected in the target S-VOL in block address order, thereby resulting in contiguous inter-generational difference data elements in block address order in JNL sub-area (j−1).

Furthermore, after the above sort processing has ended, all of the bits configuring the difference BM corresponding to the online update difference data are turned OFF (each time an online update difference data element is written to the S-VOL, the bit corresponding to this data element can be turned OFF).

Figure 11:
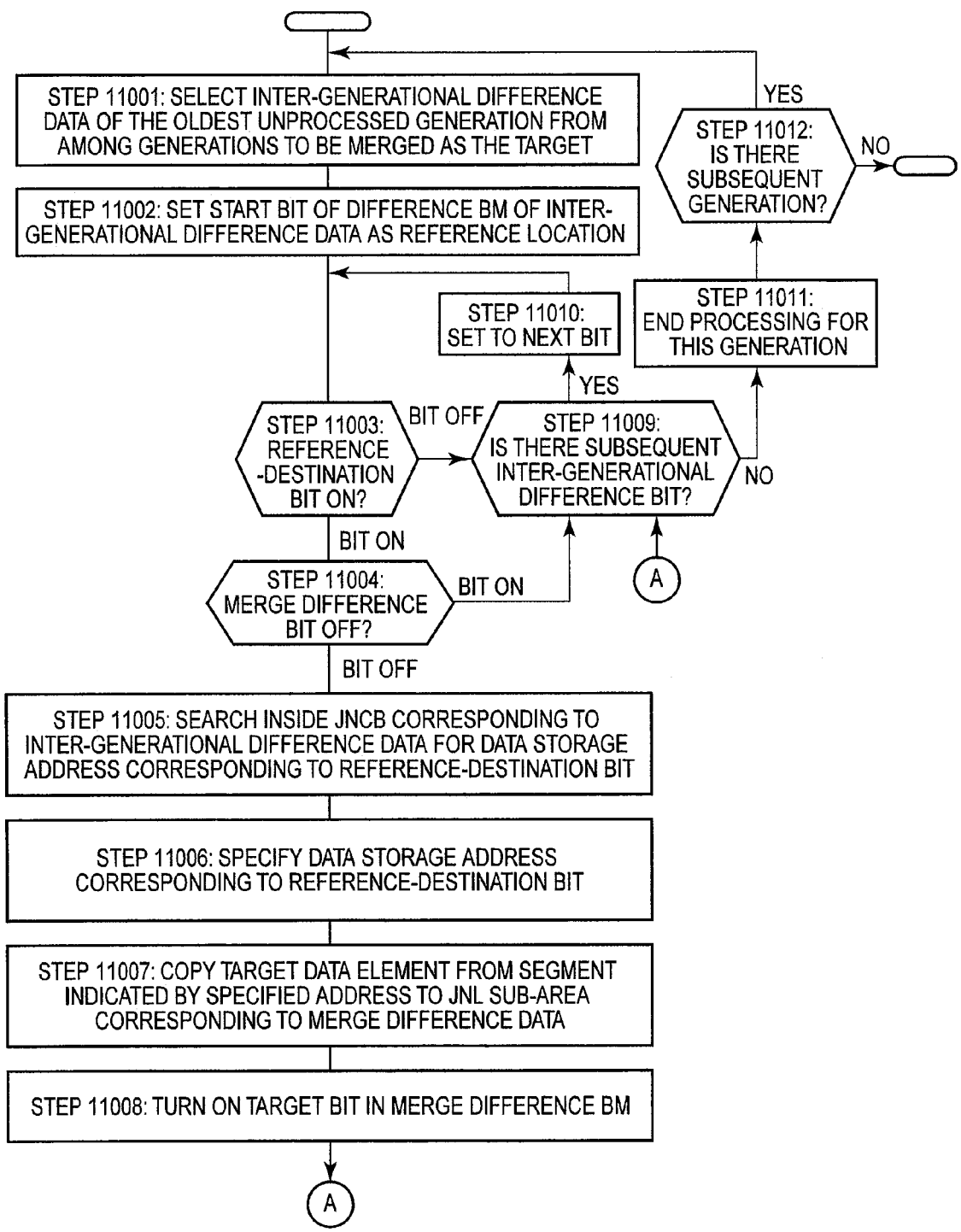
FIG. 11 is the flow of a merge process of the first embodiment.

FIG. 11 is the flow of merge processing for inter-generational difference data. FIG. 12 shows the movement of data elements related to this merge processing. Merge processing will be explained hereinbelow by referring to FIGS. 11 and 12.

Figure 12:
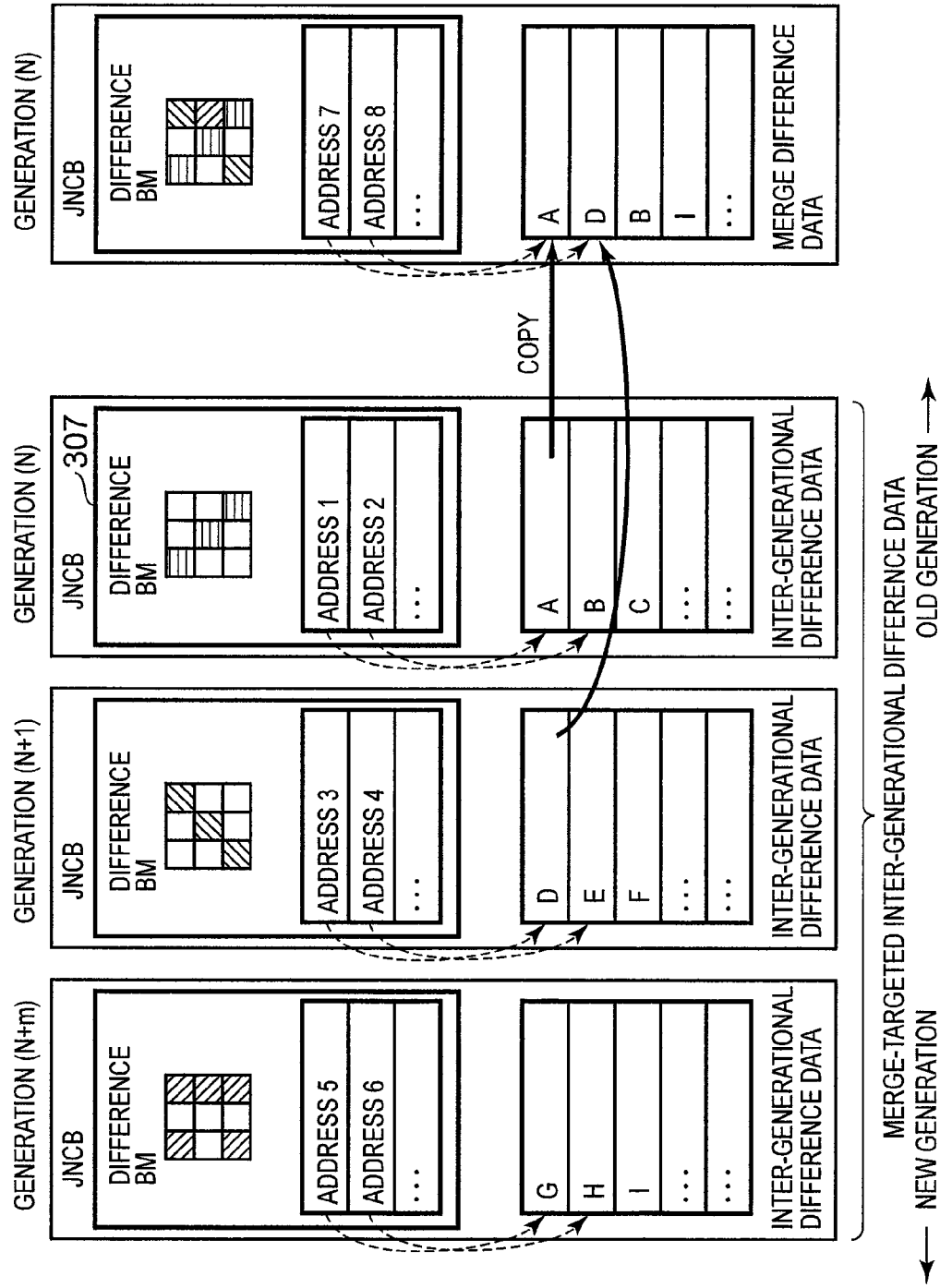
FIG. 12 shows the movement of data elements related to the merge process of the first embodiment.

As shown in FIG. 12, the JNL merge program 219 (refer to FIG. 4) commences merge processing, which converts (m+1) generations' worth of inter-generational difference data to merge difference data when the accumulation of a certain number of generations' worth of inter-generational difference data (for example, (m+1) generations (generation (N) through generation (N+m)) is detected. Furthermore, treating the detection of (m+1) generations' worth of inter-generational data as the trigger for commencing a merge process is only one example, and other triggers, for example, the passage of a prescribed period of time since the immediately previous merge process, are also possible.

The JNL merge program 219 sets the "status" of the merge-targeted generation (N) through generation (N+m) to "merging" in the backup generation management table 205. Then, the JNL merge program 219 selects as a target the inter-generational difference data of the oldest merge-targeted generation (N) (Step 11001).

The JNL merge program 219 decides the start bit of the difference BM (N) corresponding to the targeted inter-generational difference data as the reference location (Step 11002).

The JNL merge program 219 executes Step 11004 if the bit treated as the reference location for difference BM (N) is ON, and executes Step 11009 if this bit is OFF. In the explanations of FIGS. 11 and 12 below, the bit treated as this reference location will be referred to as the "target bit", and if this bit is ON, will be referred to as the "target ON bit", and if this bit is OFF, will be referred to as the "target OFF bit".

The JNL merge program 219 executes Step 11005 for the difference BM corresponding to recently created merge difference data (hereinafter referred to as the "merge difference BM" in the explanations of FIGS. 11 and 12) if the bit, which is in the same location as the above-mentioned target bit, is OFF, and executes Step 11009 if this bit is ON.

JNL merge program 219 searches for the data storage address corresponding to the target ON bit of the difference BM (N) (Step 11005), and specifies this address (Step 11006). Then, the JNL merge program 219 copies the inter-generational difference data element stored in the segment indicated by this address to the segment inside the JNL sub-area corresponding to the merge difference data to be created this time (the segment subsequent to the copy-destination segment of the immediately previous time) (Step 11007). Then, the JNL merge program 219 turns ON the bit that is in the same location as the above-mentioned target bit in the merge difference BM (Step 11008).

The JNL merge program 219 treats the subsequent bit as the reference location if there is a bit in the location subsequent of the reference location that has not been referenced yet in the difference BM (N) (Step 11009: YES), sets the subsequent bit as the reference location (Step 11010), and executes Step 11003. If there is no unreferenced bit in the subsequent location (Step 11009: NO), the processing for this generation (N) is ended (Step 11011), and if there is a subsequent generation (Step 11012: YES), Step 11001 is carried out for the subsequent generation (N+1). If there is no subsequent generation (that is, if the generation processed immediately prior is (N+m)) (Step 11012: NO), merge processing ends.

According to the flow of processing described hereinabove, as shown in FIG. 12, processing is first carried out from the inter-generational difference data corresponding to the oldest generation of the merge-targeted generations (N) through (N+m). If there is an ON bit in the difference BM corresponding to the inter-generational difference data, and the bit corresponding to this bit is OFF, the inter-generational difference data element corresponding to this ON bit is copied to the JNL sub-area corresponding to the merge difference data. Conversely, if there is an ON bit in the difference BM corresponding to the inter-generational difference data, and the bit corresponding to this ON bit is ON in the merge difference BM as well, the data element corresponding to the ON bit inside the difference BM corresponding to the inter-generational difference data is not copied.

In other words, the inter-generational difference data element corresponding to the older generation is preferentially copied to the JNL sub-area corresponding to the merge difference data. More specifically, for example, according to FIG. 12, inter-generational difference data elements "A" and "G", which correspond to the start blocks of the P-VOL, exist for two generations, generation (N) and generation (N+m). In this case, as described hereinabove, since the inter-generational difference data element corresponding to the older generation is given priority, the data element "A" of generation (N) is copied to the JNL sub-area corresponding to the merge difference data, but data element "G" of the generation that is newer than this generation (N) is not copied to this JNL sub-area.

Furthermore, in this merge process, processing starts from the old generation first, but processing can also start from a new generation first. However, in this case, if there is an ON bit in the difference BM corresponding to the inter-generational difference data, and the bit corresponding to this ON bit is ON in the merge difference BM as well, the data element that corresponds to the ON bit inside the difference BM corresponding to the inter-generational difference data can be overwritten by the merge difference data element corresponding to the ON bit, which is stored in the JNL sub-area corresponding to the merge difference data. Further, when the merge difference data is created, the plurality of generations' worth of inter-generational difference data that constitutes the basis of this merge difference data can be deleted either immediately after the end of merge difference data creation, or in response to an indication from a computer (for example, either the host computer 101 or the management server 111).

Further, inter-generational difference data and merge difference data can also be deleted from an old generation. In this case, for example, a JNL delete program not shown in the figure releases the JNCB and JNL data corresponding to the delete-targeted generation, and manages the deleted generation as a free area. Further, the JNL delete program deletes entries corresponding to the delete-targeted generation from the first JNL management table 207 and the backup generation management table 205.

Figure 13:
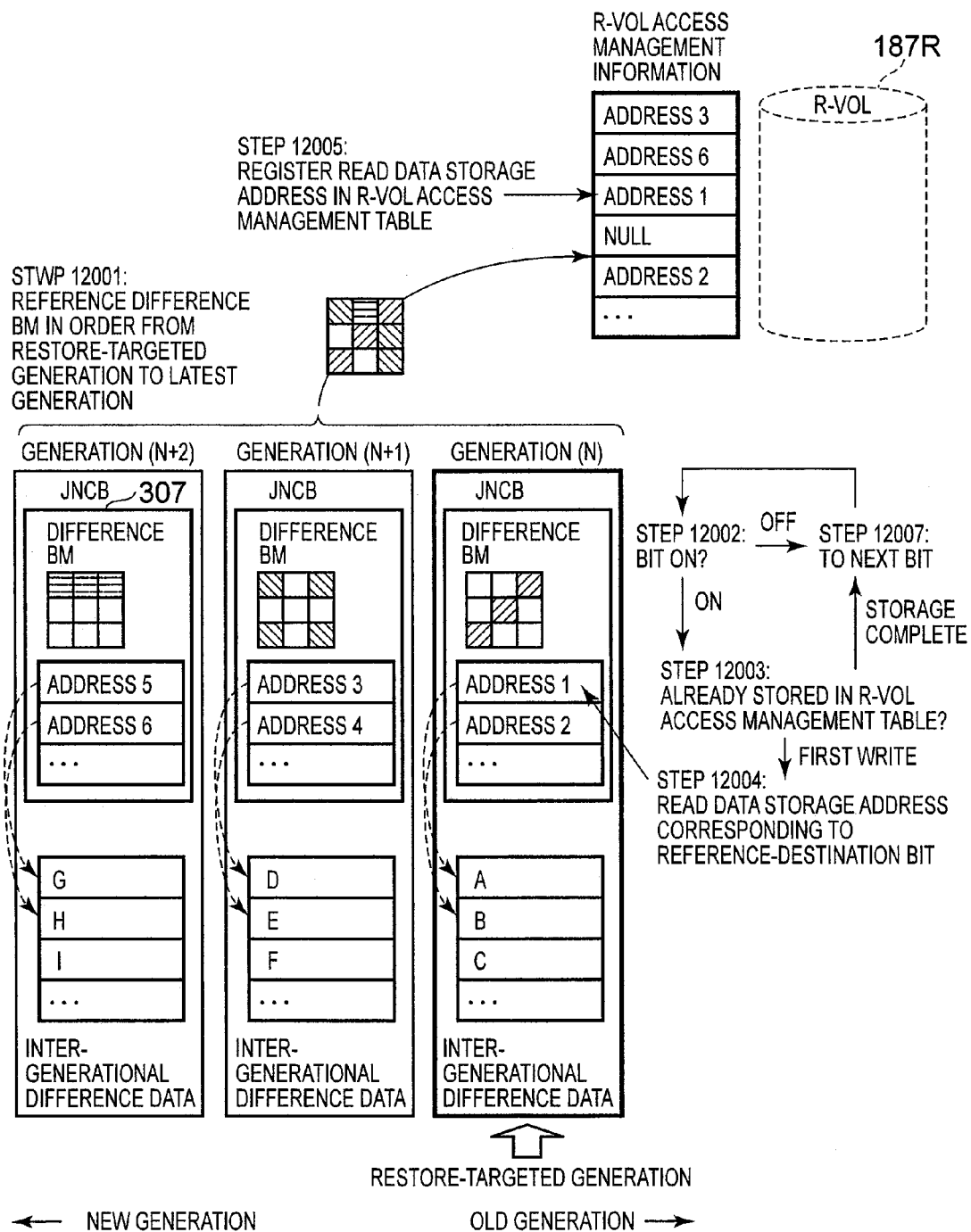
FIG. 13 shows the flow of a restore process.

FIG. 13 shows the flow of a restore process.

The restore program 221 (Refer to FIG. 4) receives a restore request having a restore-targeted generation specified by the user from either the host computer 101 or the management server 111. More specifically, for example, the restore program 221 sends the information of the backup generation management table 205 and so forth to either the host computer 101 or the management server 111 in response to a request from either the host computer 101 or the management server 111. The user references the "generation #", "backup acquisition time" and "user comment" in this table 205 and so forth, decides the restore-targeted generation, and specifies the decided restore-targeted generation to either the host computer 101 or the management server 111. The restore request having this specified restore-targeted generation (N) is sent to the restore program 221 from either the host computer 101 or the management server 111.

The restore program 221 executes the restore process in response to the restore request. In the restore process, the R-VOL access management table 209 is created. The R-VOL access management table 209 is configured from a plurality of address records. The respective address records correspond to the respective blocks (virtual blocks) that configure the R-VOL, and as such, correspond to the respective bits in the difference BM.

The restore program 221 sequentially references the difference BM of the inter-generational difference data (or the merge difference data) from the restore-targeted generation (N) to the new generations (N+1), (N+2) (Step 12001). A case in which the reference-destination difference BM is the restore-targeted generation (N) will be given as an example and explained hereinbelow.

The restore program 221 carries out ON-OFF determinations from the start bit of the difference BM (N) (Step 12002). When the referenced bit is ON, the restore program 221 references the address record corresponding to this ON bit (Step 12003). If an invalid address (for example, Null) is in this record, the restore program 221 reads out the data storage address corresponding to the referenced ON bit from inside JNCB (N) (Step 12004), and registers this record (Step 12005), and conversely, if a valid address has been registered in this record, references the subsequent bit (Step 12006).

The R-VOL access management table 209 is completed by carrying out the above Steps 12002 through 12006 for not only the restore-targeted generation (N), but also for the newer generations (N+1) and (N+2). That is, for example, in Step 12006, if there is no subsequent bit to serve as the reference destination, Steps 12002 through 12006 are carried out for the generation (N+1) subsequent to the restore-targeted generation (N).

When the R-VOL access management table 209 is created as described hereinabove, a read process (and write process) to the R-VOL is possible. In this case, the "status" corresponding to the R-VOL in the configuration management table 201 becomes "normal" (that is, R/W enabled) (prior to this, this "status" is "R/W disabled").

Incidentally, instead of creating an R-VOL access management table 209, an R-VOL can be provided as a real VOL. In this case, for example, the data storage address is specified using the same method as the method for creating the R-VOL access management table 209, and the data element can be copied from the segment indicated by the specified address to the block that corresponds to the bit to which this address corresponds inside the R-VOL (real VOL).

Figure 14:
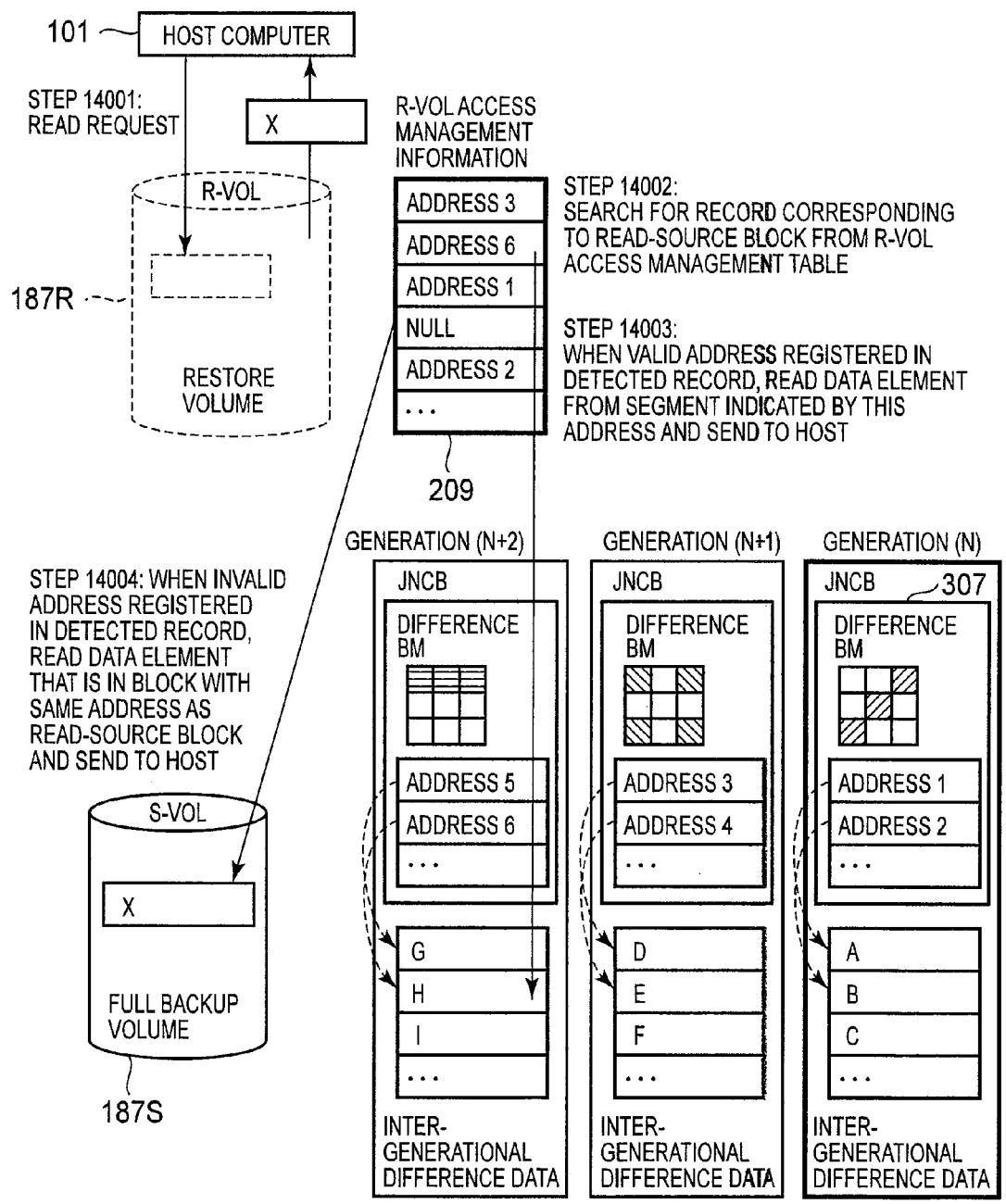
FIG. 14 shows the flow of a read process that uses an R-VOL management table.

FIG. 14 shows the flow of a read process that uses the R-VOL access management table 209.

The R/W program 213 (refer to FIG. 4) receives from the host computer 101 a read command that specifies the R-VOL 187R shown in FIG. 13 (Step 14001).

The R/W program 213 references the record (the record inside the R-VOL access management table 209) corresponding to the read-source block specified by this read command (Step 14002).

If the result of Step 14002 is that a valid address is registered in the reference-destination record, the R/W program 213 reads out the data element from the segment indicated by this address, and sends this data element to the host computer 101 (Step 14003).

Conversely, if the result of Step 14003 is that an invalid address is registered in the reference-destination record, the R/W program 213 reads out the data element from the block that has the same address as the above-mentioned read-source block inside the S-VOL (full backup volume) corresponding to the R-VOL, and sends this data element to the host computer 101 (Step 14004).

Figure 15:
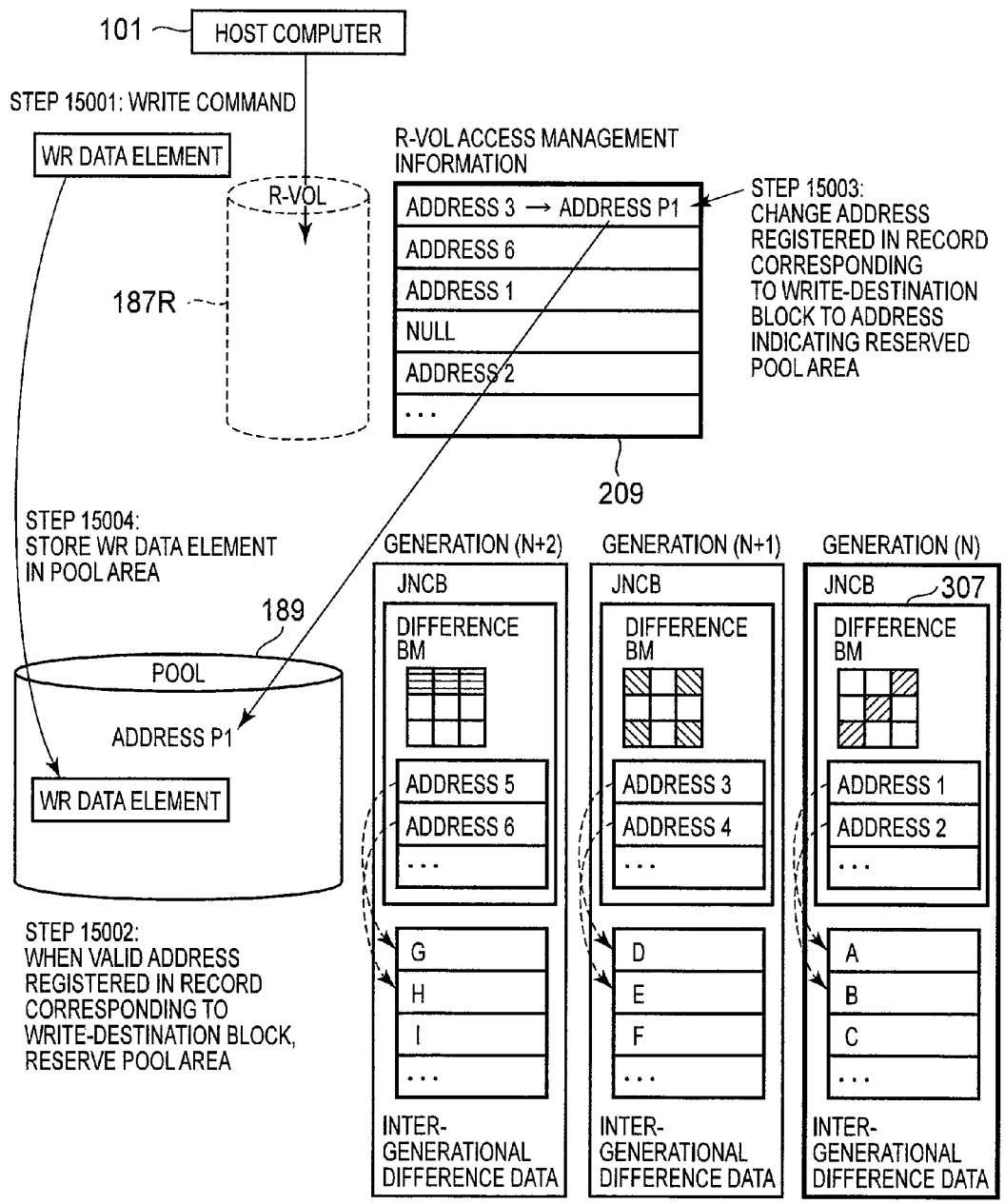
FIG. 15 shows the flow of a write process that uses an R-VOL management table.

FIG. 15 shows the flow of a write process that uses the R-VOL management table 209.

The R/W program 213 receives from the host computer 101 a write command that specifies the R-VOL 187R shown in FIG. 13 (Step 15001). The R/W program 213 references the record (the record inside the R-VOL access management table 209) corresponding to the write-destination block specified in this write command.

If the valid address "address 3" is registered in the reference-destination record, the R/W program 213 reserves an area the size of the host write size from either storage pool 189A or 189B (Step 15002), and changes the above-mentioned valid address "address 3" to "address P1", the address indicating this reserved area (Step 15003). Then, the R/W program 213 writes the write data element to this reserved area (Step 15004).

Furthermore, if an invalid address is registered in the reference-destination record, this invalid address is changed to the address indicating the reserved area inside either storage pool 189A or 189B.

Figure 20:
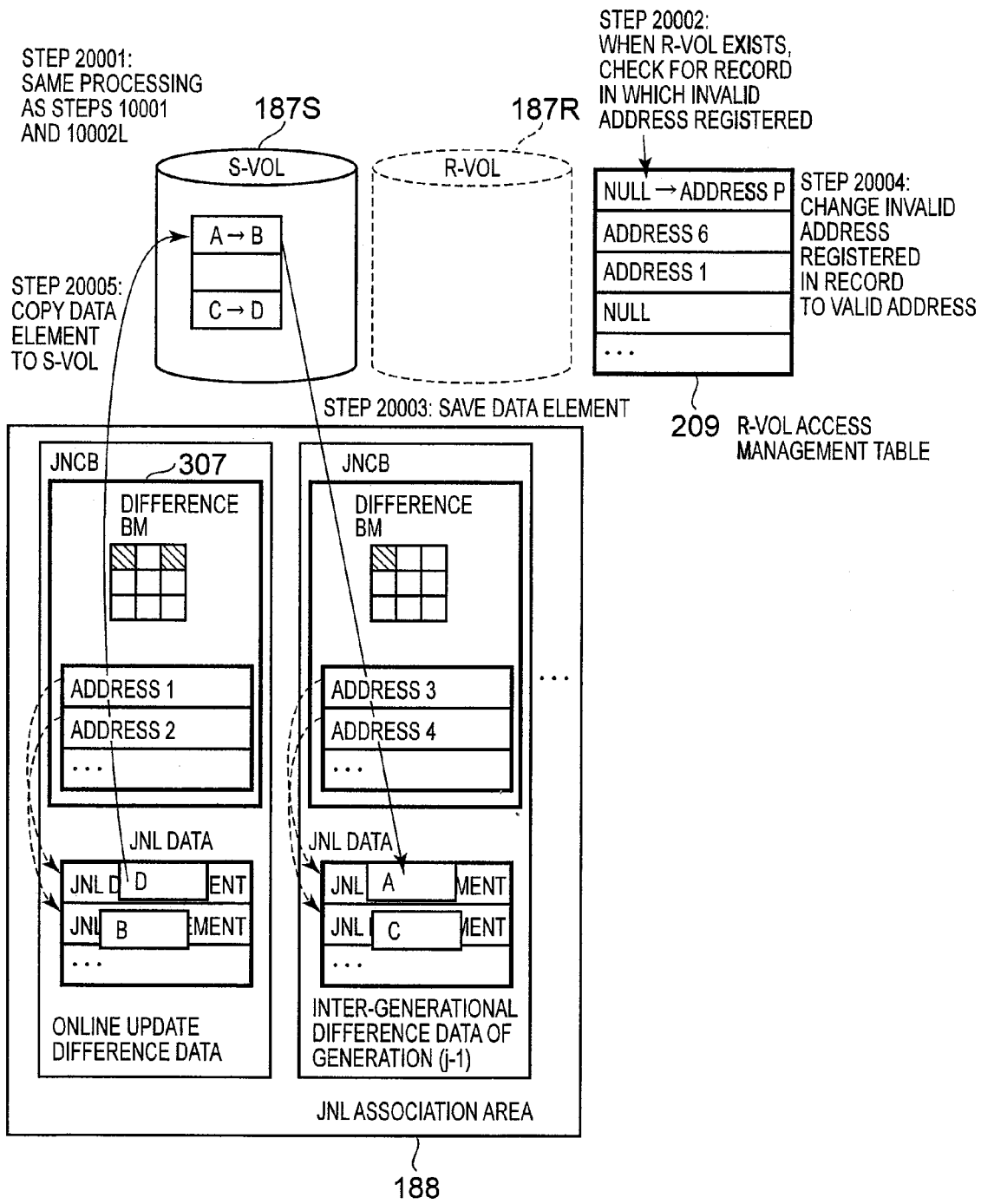
FIG. 20 shows the flow of a sort process in which there is a R-VOL.

FIG. 20 shows the flow of sort processing when there is an R-VOL.

Copying online update difference data to the S-VOL when a marker is received saves the data element that was stored in the S-VOL. Thus, when a marker is received in a state in which there is an R-VOL, there is the danger of the corresponding relationships between the respective addresses and the respective data elements stored in the R-VOL access management table changing. More specifically, for example, due to the fact that an invalid address is registered in the reference-destination record of the R-VOL access management table, a read of the data element stored in the block (a block inside the S-VOL) corresponding to this reference-destination record can be expected, but if the online update difference data element is copied to this block as a result of the above-mentioned marker reception, this data element will be saved to the JNL sub-area, making it impossible to acquire the expected data element from the S-VOL.

For this reason, the processing to be explained by referring to FIG. 20 is carried out.

First, Steps 10001 through 10002 are carried out (Step 20001).

Next, the JNL sort program 217 determines whether or not the corresponding S-VOL will be accessed when the R-VOL is accessed (Step 20002). More specifically, the JNL sort program 217 determines whether or not an invalid address is registered in the R-VOL access management table 209.

If the result of this determination is that an invalid address is discovered, the JNL sort program 217 specifies the block corresponding to the record in which the invalid address is registered, and references "address 3", which is the data element address (the data storage address corresponding to the bit inside difference BM (j−1)) corresponding to the specified block. Then, the JNL sort program 217 saves data element "A", which is stored in the block (the block inside the S-VOL) corresponding to the record in which this invalid address is registered, to the segment indicated by this address "address 3" (Step 20003). The JNL sort program 217 changes the invalid address "Null" to the address "address P1" indicating the save-destination segment of data element "A" in the R-VOL access management table 209 (Step 20004). Then, the JNL sort program 217 writes online update difference data element "B", which corresponds to this block, to the save-source block (Step 20005).

In accordance with the processing described hereinabove, a sort process that maintains the corresponding relationships between the respective blocks and the respective data elements inside the R-VOL can be carried out even when a marker is received when there is an R-VOL.

Embodiment 2

A second embodiment of the present invention will be explained hereinbelow. In so doing, explanations of the points in common with the first embodiment will be omitted or simplified, and the points of difference with the first embodiment will mainly be explained (Furthermore, this approach is not limited to the second embodiment, but rather will be the same for the third and subsequent embodiments as well.).

In the second embodiment, the online update difference data element is a before JNL data element of the P-VOL.

Figure 16:
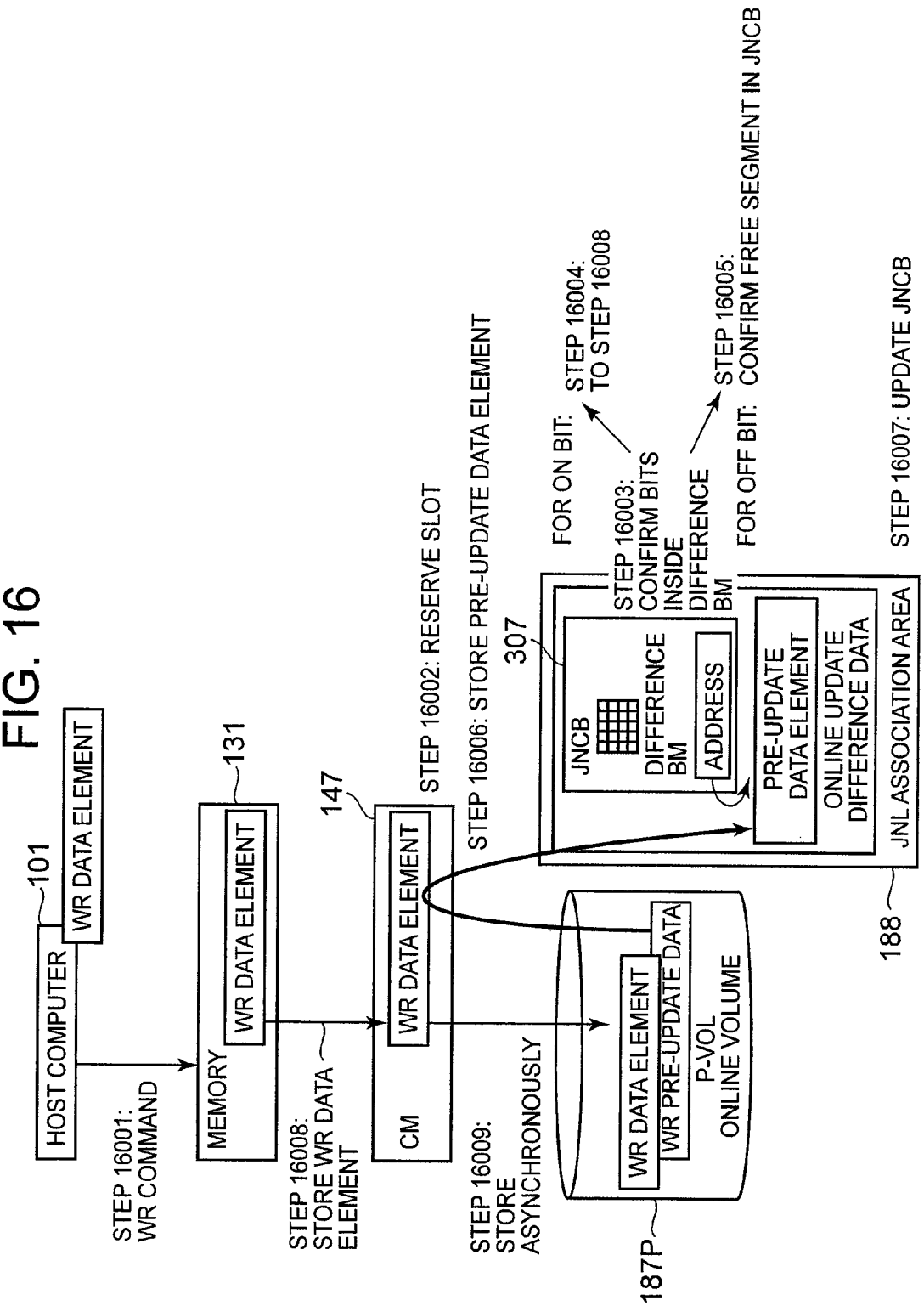
FIG. 16 shows the flow of a write process for writing a write data element to a P-VOL in a second embodiment of the present invention.

FIG. 16 shows the flow of write processing that writes a write data element to the P-VOL of the second embodiment.

The R/W program 213, upon receiving a write command from the host computer 101 (Step 16001), reserves a slot for storing the write data element (Step 16002). In addition, the R/W program 213 references the bit corresponding to the write-destination block, which was specified by the write command, inside the difference BM corresponding to the online update difference data (Step 16003).

When the result of Step 16003 is that the reference destination is the ON bit, the R/W program 213 executes Step 16008 and beyond (Step 16004). That is, the data element stored in the write-destination block is not saved to the JNL sub-area as the online update difference data element.

Conversely, when the result of Step 16003 is that the reference destination is the OFF bit, the R/W program 213 references the JNL area management table 203 corresponding to the target P-VOL (the P-VOL specified by the write command) 187P, thereby specifying the free segment inside the JNL sub-area corresponding to the online update difference data for the target P-VOL 187P (Step 16005). Furthermore, if there is no free segment, it is possible to reserve a new JNL sub-area.

Subsequent to Step 16005, the R/W program 213 saves the data element stored in the write-destination block to the above-mentioned specified free segment (Step 16006). Then, the R/W program 213 updates the JNCB corresponding to the online update difference data (Step 16007). More specifically, the R/W program 213 turns ON the bit (the OFF bit of the above-mentioned reference destination inside the difference BM) corresponding to the write-destination block, and adds the address indicating the above-mentioned free segment as the data storage address corresponding to this write-destination block.

Thereafter, the R/W program 213 writes the write data element stored in the memory 131 inside the front-end interface 127 to the slot reserved in Step 16002 (Step 16008).

The R/W program 213 writes the write data element written to this slot to the write-destination block inside the P-VOL (Step 16009).

Figure 17:
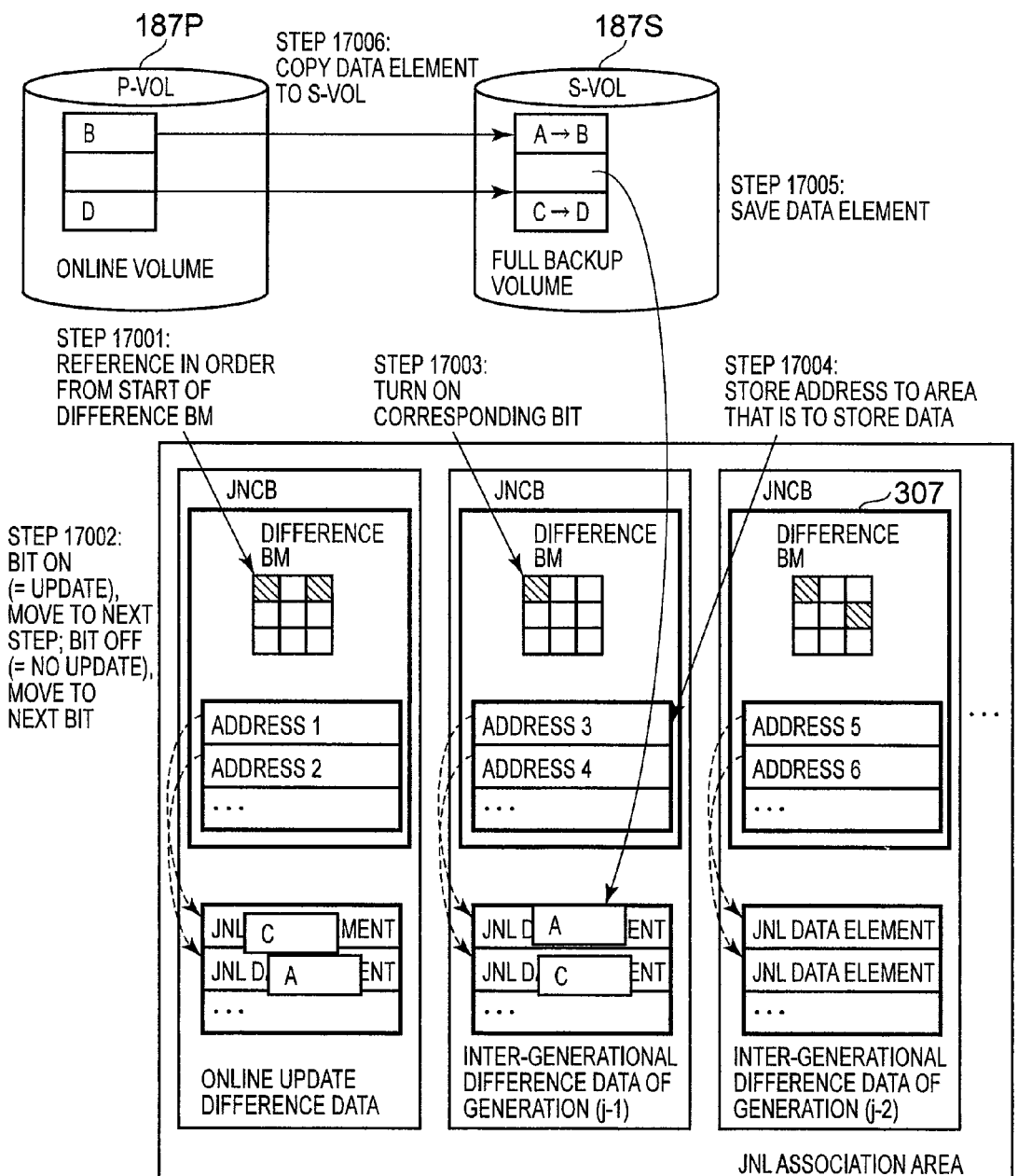
FIG. 17 shows the flow of a sort process of the second embodiment.

FIG. 17 shows the flow of sort processing in the second embodiment.

The same processing as Steps 10001 through 10005 is carried out (Steps 17001 through 17005).

Thereafter, the JNL sort program 217 copies the data elements, which correspond to the respective ON bits inside the difference BM corresponding to the online update difference data, from the respective blocks inside the P-VOL to the respective blocks of the same addresses inside the S-VOL (Step 17006).

Embodiment 3

In a third embodiment, online update difference data is not stored. Thus, this third embodiment differs from the first and/or second embodiments in the following aspects.

Figure 18:
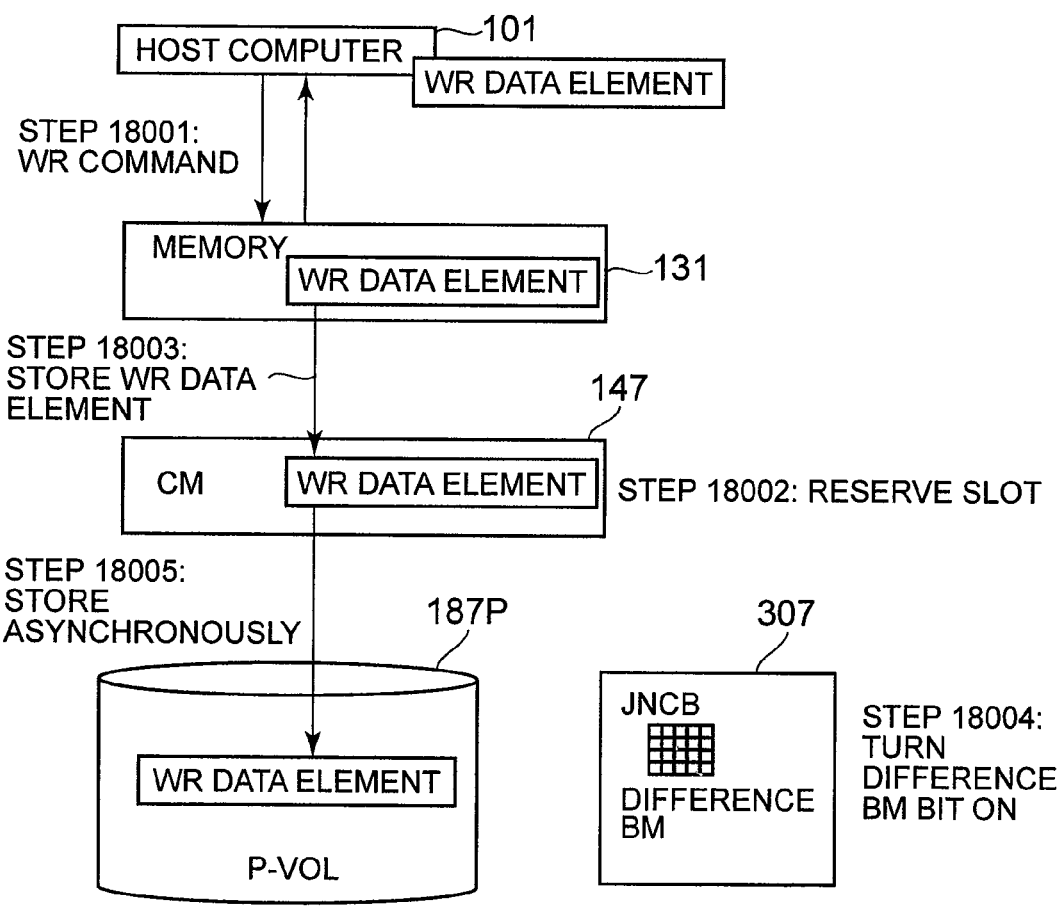
FIG. 18 shows the flow of a write process for writing a write data element to a P-VOL in a third embodiment of the present invention.

For example, as shown in Steps 18001 through 18005 of FIG. 18, a JNL data element for the P-VOL is not stored in the JNL area in a write process to the P-VOL.

Figure 19:
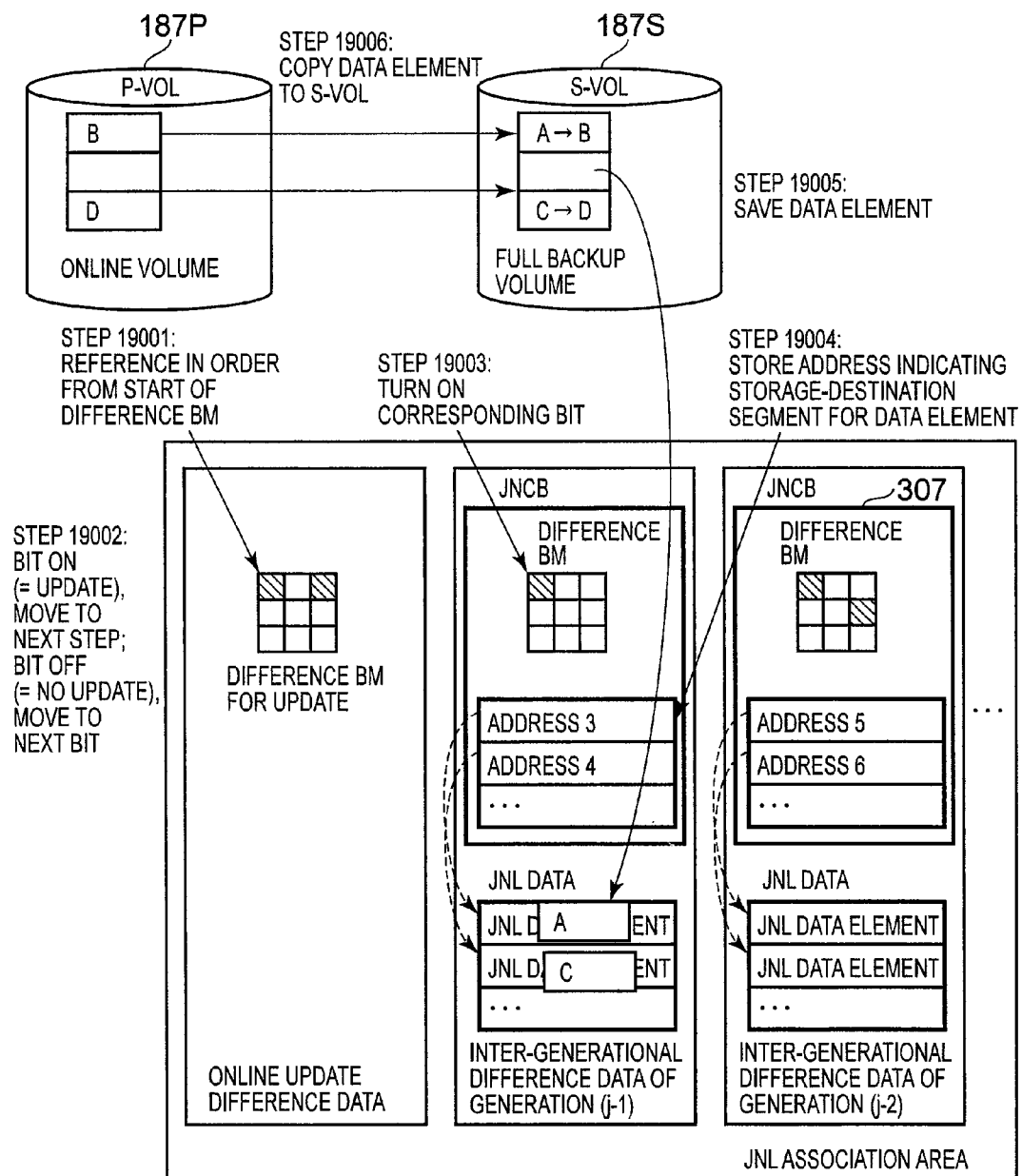
FIG. 19 shows the flow of a sort process of the third embodiment.

Further, for example, in the sort process, the same sort processing as that of FIG. 17 is carried out as shown in FIG. 19. That is, Steps 19001 through 19006 of FIG. 19 are the same as the respective Steps 17001 through 17006 of FIG. 17.

Figure 21:
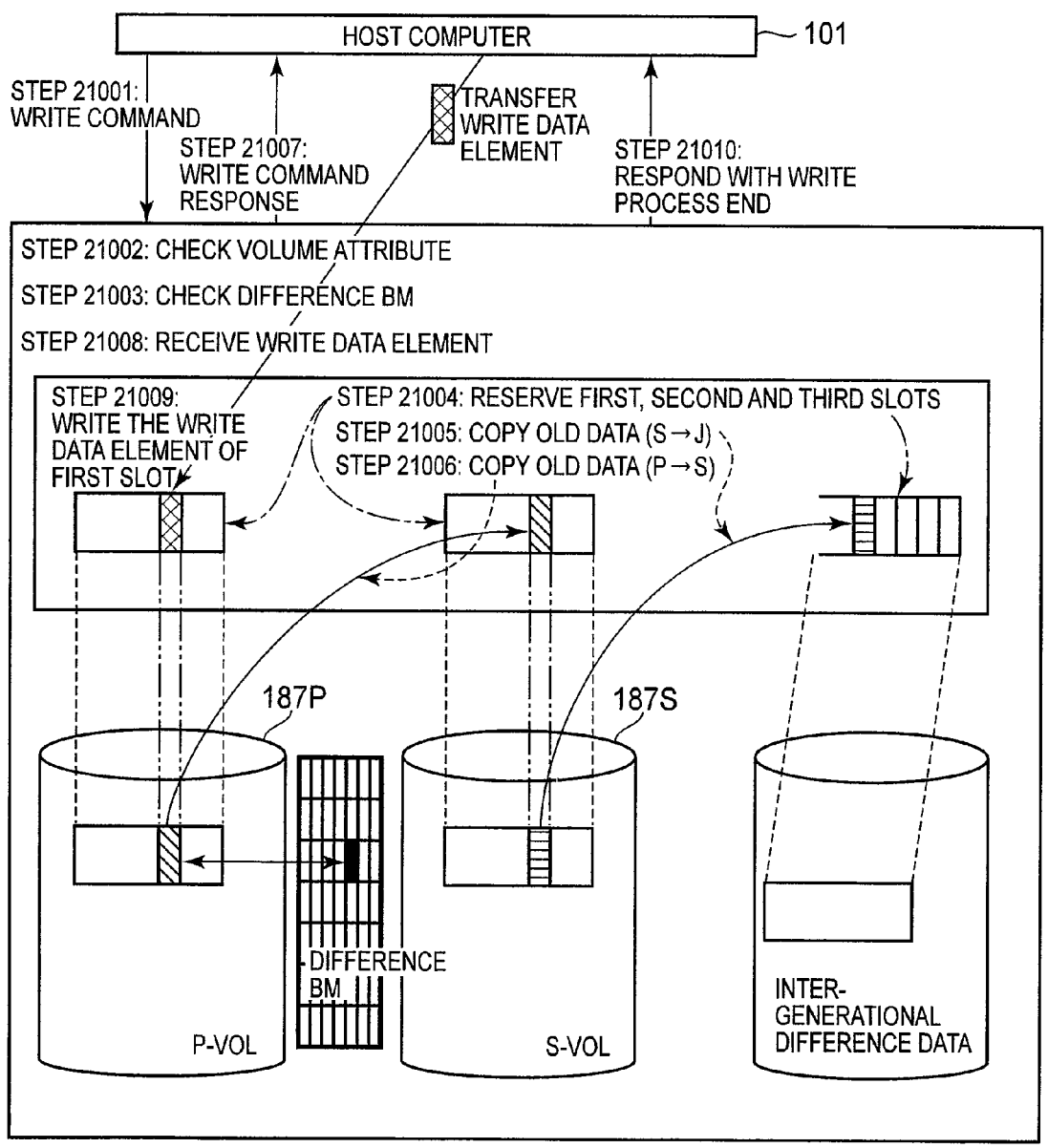
FIG. 21 shows a P-VOL write process immediately subsequent to marker reception in the second and third embodiments.

FIG. 21 shows a P-VOL write process immediately after marker reception in the third embodiment (and the second embodiment). In the following explanation, the timing at which the part of the data elements yet to be saved from among all the data elements to be saved from the S-VOL is considered.

The R/W program 213, upon receipt of a write command (Step 21001), checks the volume attribute of the VOL specified by the write command (Step 21002). If it is determined that this VOL is the P-VOL, the R/W program 213 references the bit corresponding to the write-destination block inside the latest difference BM for this P-VOL (Step 21003).

If this bit is ON as shown in FIG. 21, the data element stored in the write-destination block must be copied to the S-VOL before this data element is overwritten by the write data element. Thus, the R/W program 213 reserves a first slot that corresponds to the write data element, reserves a second slot that corresponds to the data element to be saved from the P-VOL, and reserves a third slot that corresponds to the data element to be saved from the S-VOL (Step 21004).

Thereafter, the R/W program 213 saves the data element from the block (block inside the S-VOL) of the same address as the write-destination block to the JNL sub-area by way of the third slot (Step 21005). Further, the R/W program 213 saves the data element from the write-destination block to the block (block inside the S-VOL) of the same address as the write-destination block by way of the second slot (Step 21006).

The R/W program 213 sends a response corresponding to the write command to the host computer 101 (Step 21007), receives the write data element from the host computer 101 in response thereto (Step 21008), and writes the received write data element to the first slot (Step 21009). The write data element, which was written to the first slot, is written to the write-destination block inside the P-VOL.

Furthermore, in the explanation up to this point, as a rule, if the acquired first JNL data element (for example, the online update difference data element) was corresponding to the same block as the second JNL data element that exists in the JNL sub-area, the second JNL data element has been overwritten by the first JNL data element in the JNL sub-area, and as such, the maximum size of the JNL data (for example, the online update difference data) has been treated as the same size as the P-VOL or S-VOL. However, the present invention is not limited to this, and the acquired JNL data element can also be stored in the JNL sub-area without being overwritten. In this case, the online update difference data, inter-generational difference data, and merge difference data can all exceed the size of the P-VOL and S-VOL.

Now then, the above-described P-VOL, S-VOL, R-VOL and JNL association area can be distributed among a plurality of storage systems. For example, the P-VOL and the JNL association area that stores the difference BM corresponding to the P-VOL can reside inside the first storage system, and the S-VOL and JNL association area that stores the difference BM and the inter-generational difference data corresponding to the respective generations of the S-VOL can reside inside a different storage system than the first storage system. Further, the R-VOL can reside in either the first storage system or the different storage system. Further, the R-VOL can reside in the first storage system, and the data element that is inside the R-VOL can reside in the different storage system.

A number of specific examples will be explained hereinbelow.

Embodiment 4

Figure 22:
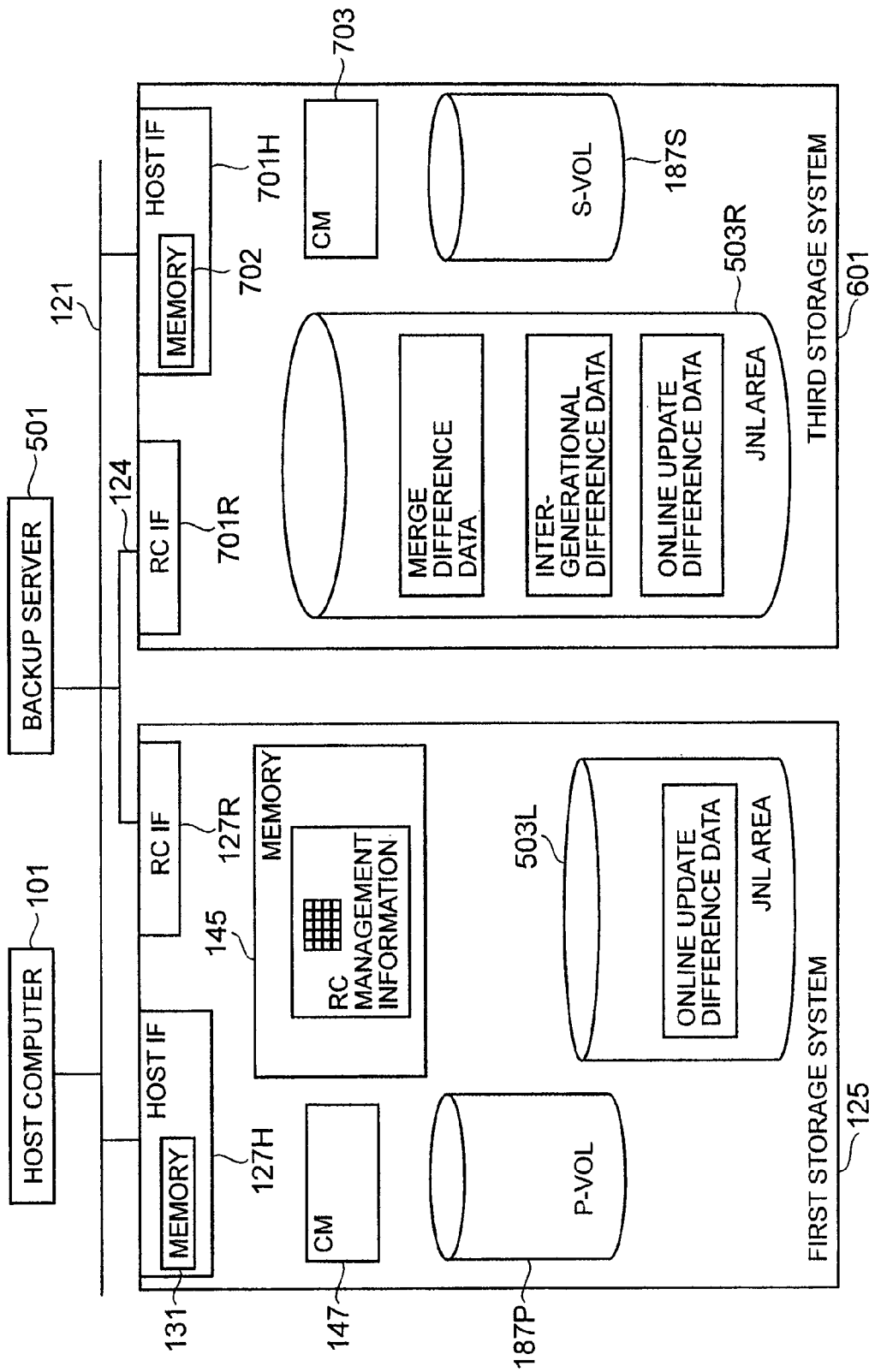
FIG. 22 shows the configuration of a computer system related to a fourth embodiment of the present invention.

FIG. 22 shows the configuration of a computer system related to a fourth embodiment of the present invention.

A third storage system 601 exists as the remote copy (hereinafter may be abbreviated as "RC") partner of the first storage system 125. The P-VOL 187P resides in the first storage system 125, and the S-VOL 187S resides in the third storage system 601. The third storage system 601 is connected to the first network 121, and, for example, has the same configuration as the first storage system 125. More specifically, for example, the third storage system 601 has a cache memory 703. Further, the third storage system 601 has an RC IF 701R and a host IF 701H as front-end interfaces ("IF" is the abbreviation for interface). The host IF 701H is connected to the first network 121, and the RC IF 701R and the RC IF 127R inside the first storage system 125 are connected to the third network 124. A backup server 501 is connected to the third network 124. The third network 124 can be the same network as the first or second networks 121 or 123, or can be a special inter-storage system network. Further, it is supposed that the first storage system 125 and the third storage system 601 are physically separated, but these storage systems can be logically separated without being physically separated.

Management information (RC management information) for carrying out a remote copy is stored in the control memory 145 (and in a not-shown control memory inside the third storage system 601). The RC management information comprises configuration information related to a remote copy, and this configuration information, for example, is information indicating which P-VOL and S-VOL configure a pair. Storing this management information in the control memory 145 makes possible a remote copy from the first storage system 125 to the third storage system 601.

Figure 23:
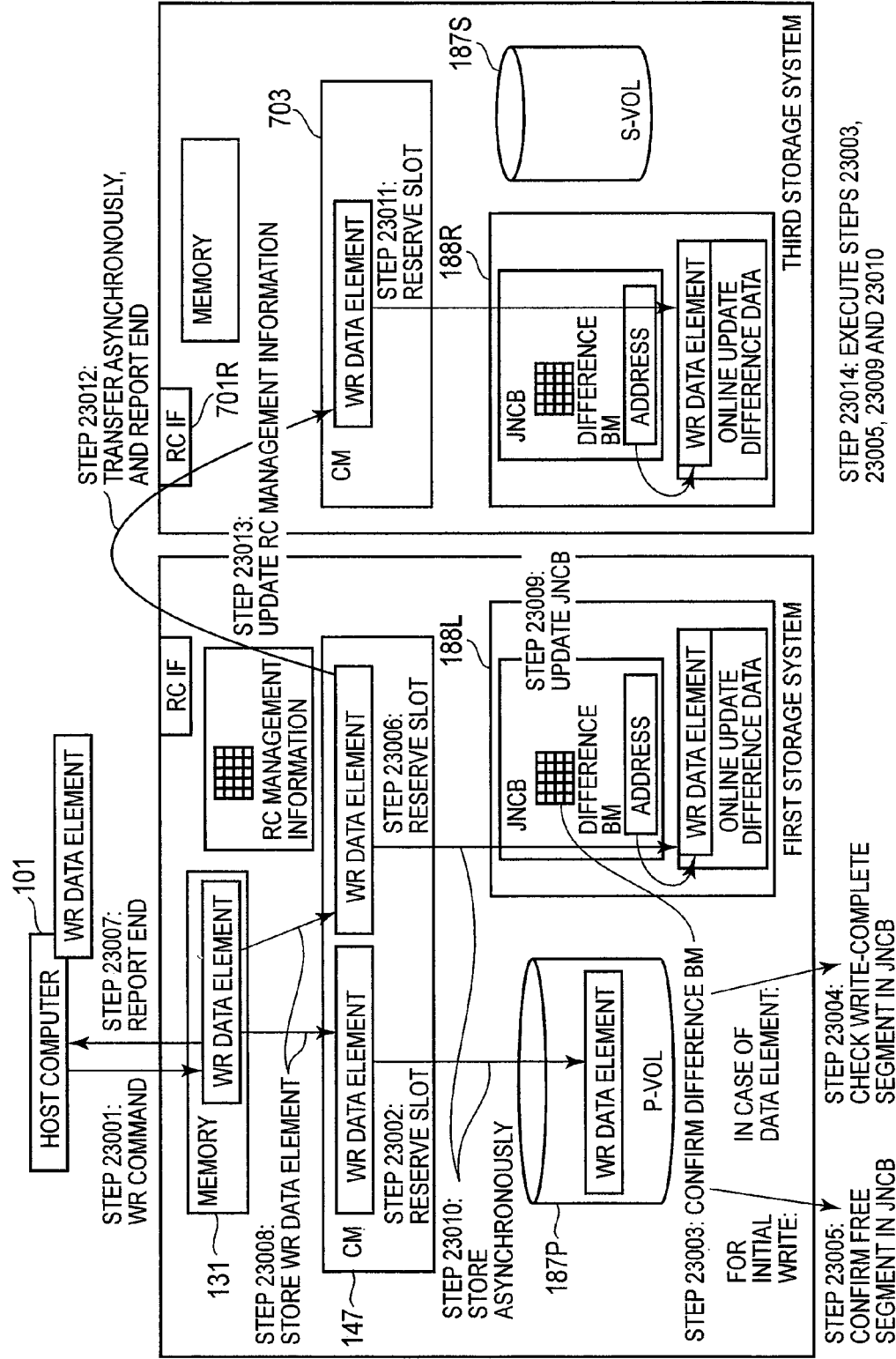
FIG. 23 shows the flow of a write process that writes a write data element to the P-VOL when Scheme 1 is employed in the fourth embodiment (the acquired online update difference data element is the after JNL data element)

In addition to the P-VOL 187P, the first storage system 125 also has a JNL area 503L in which online update difference data is stored. More specifically, as shown in FIG. 23, there is a JNL association area 188L that comprises this JNL area 503L.

In addition to the S-VOL 187S, the third storage system 601 also has a JNL area 503R. More specifically, as shown in FIG. 23, there is a JNL association area 188R that comprises this JNL area 503R. In the JNL area 503R are stored online update difference data (data that has been sent from the first storage system 125), inter-generational difference data, and merge difference data.

In a computer system (a system in which a remote copy is carried out) like that shown in FIG. 22, management is possible with any of Schemes 1 through 4 below:

Scheme 1 (Transfer Scheme: Intermittent, JNL Acquisition Method: Latest)
Scheme 2 (Transfer Scheme: Intermittent, JNL Acquisition Method: All)
Scheme 3 (Transfer Scheme: Difference, JNL Acquisition Method: Latest)
Scheme 4 (Transfer Scheme: Difference, JNL Acquisition Method: All)

"Transfer Scheme: Intermittent" is a scheme that transfers a write data element (or a pre-update data element to be updated by this write data element) to the third storage system 601 each time the first storage system 125 receives this write data element from the host computer 101.

"Transfer Scheme: Difference" is a scheme that transfers online update difference data to the third storage system 601 only in response to the first storage system 125 having received a marker from the host computer 101.

"JNL Acquisition Method: Latest" is a method by which, when a new JNL data element is acquired for a certain block corresponding to a certain JNL data element inside the JNL area 503, this certain JNL data element is overwritten by this new JNL data element.

"JNL Acquisition Method: All" is a method by which, when a new JNL data element is acquired for a certain block corresponding to a certain JNL data element, this new JNL data element is also stored in the JNL area in addition to this certain JNL data element.

A number of specific examples will be explained hereinbelow.

FIG. 23 shows the flow of a write process that writes a write data element to the P-VOL when Scheme 1 is employed in the fourth embodiment. In FIG. 23, the P-VOL JNL data element is the after JNL data element. In the following explanation, although not shown in the figure, the R/W program 213, which is executed by the control processors 143 inside the first storage system 125, will be referred to as "R/W program 213L", and the R/W program 213, which is executed by the processor inside the third storage system 601, will be referred to as "R/W program 213R" to avoid confusion.

The R/W program 213L, upon receipt of a write command from the host computer 101 specifying the P-VOL 187P (Step 23001), reserves a first slot of a size equivalent to the amount of data indicated by the write command in the cache memory 147 (Step 23002). Next, the R/W program 213L references the bit, which is inside the difference BM (latest), and which corresponds to the write-destination block specified from the write command (Step 23003).

If the referenced bit is the ON bit, the R/W program 213L specifies the segment indicated by the data storage address corresponding to this ON bit using the same method as that of Step 8004 (refer to FIG. 8) (Step 23004), and conversely, if the referenced bit is the OFF bit, the R/W program 213L specifies a free segment using the same method as that of Step 8005 (refer to FIG. 8) (Step 23005). Then, the R/W program 213L reserves a second slot the same as in Step 8008 (refer to FIG. 8) (Step 23006), and returns a response relative to the write command to the host computer 101 (Step 23007).

Thereafter, the write data element is sent from the host computer 101, and this write data element is stored in the memory 131 inside the host IF 127H. The R/W program 213L writes the write data elements, which are stored in the memory 131, to the first slot and second slot (Step 23008), and responds to the host that the write process has ended. The R/W program 213L updates as needed the JNCB (latest) the same as in Step 8009 (refer to FIG. 8) (Step 23009). Further, the R/W program 213L writes the write data element inside the first slot to the write-destination block inside the P-VOL 187P, and writes the write data element inside the second slot to the segment specified in either Step 23004 or 23005 (Step 23010).

After Step 23008, the R/W program 213L transfers the write command from the host computer 101 to the third storage system 601. In the third storage system 601, the R/W program 213R reserves a third slot in the cache memory 703 in response to receiving this write command (Step 23011), and returns a response relative to this write command to the first storage system 125.

The R/W program 213L, upon receiving the response from the third storage system 601, transfers the data element in the second (or first) slot to the third storage system 601 (Step 23012).

The R/W program 213L updates the RC management information (Step 23013).

In the third storage system 601, which receives the data element, the R/W program 213R carries out the same processing as Steps 23003 through 23005, and Steps 23009 and 23010, and in the end, returns a report to the first storage system 125 that write processing has ended (Step 23014).

The example explained here was one in which the write data element (online update difference data element) is transferred from the first storage system 125 to the third storage system 601 asynchronously to the write data element write from the host computer 101, but this write data element can also be transferred at a timing that differs therefrom. For example, the write data element can be sent from the first storage system 125 to the third storage system 601 at the same time as the write command transfer.

Figure 24:
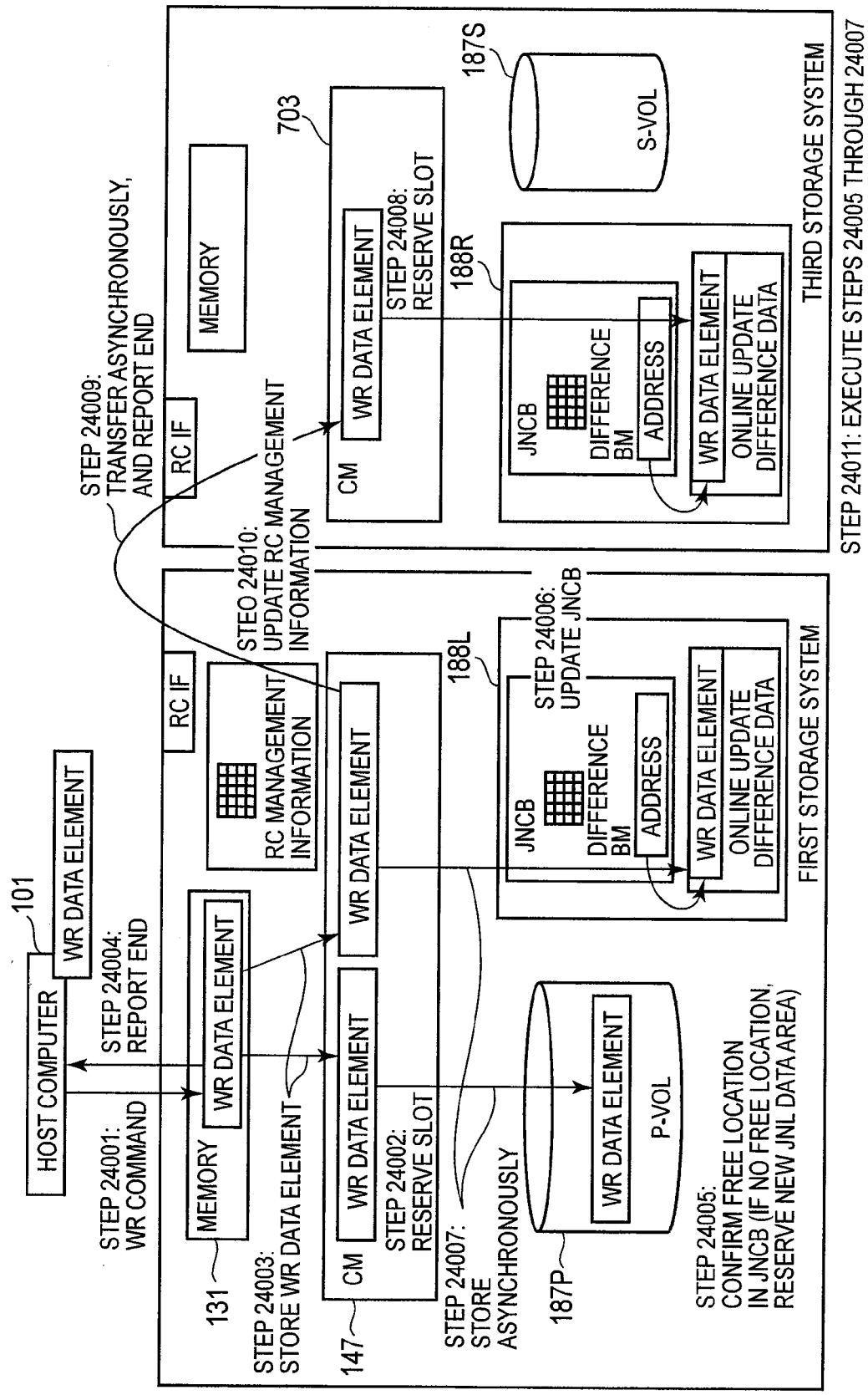
FIG. 24 shows the flow employed by Scheme 2 in a write process for writing a write data element to a P-VOL in the fourth embodiment (the acquired online update difference data element is the after JNL data element)

FIG. 24 shows the flow of write processing for writing a write data element to the P-VOL when Scheme 2 is employed in the fourth embodiment.

The corresponding relationships between the respective steps disclosed in FIG. 23 and the respective steps disclosed in FIG. 24 are as follows.

| FIG. 23 | FIG. 24 |
| --- | --- |
| Step 23001 | Step 24001 |
| Step 23002 | Step 24002 |
| Step 23003 | (None) |
| Step 23004 | (None) |
| Step 23005 | Step 24005 |
| Step 23006 | Step 24002 |
| Step 23007 | Step 24004 |
| Step 23008 | Step 24003 |
| Step 23009 | Step 24006 |
| Step 23010 | Step 24007 |
| Step 23011 | Step 24008 |
| Step 23012 | Step 24009 |
| Step 23013 | Step 24010 |
| Step 23014 | Step 24011 |

As described above, in the flow of processing of FIG. 24, all the data elements are stored without the JNL data elements being overwritten in Scheme 2, thereby doing away with the need for Steps 23003 and 23004 shown in FIG. 23. Further, in the third storage system 601, Steps 24005 through 24007 are carried out as Step 24011 as shown in FIG. 24.

Figure 27:
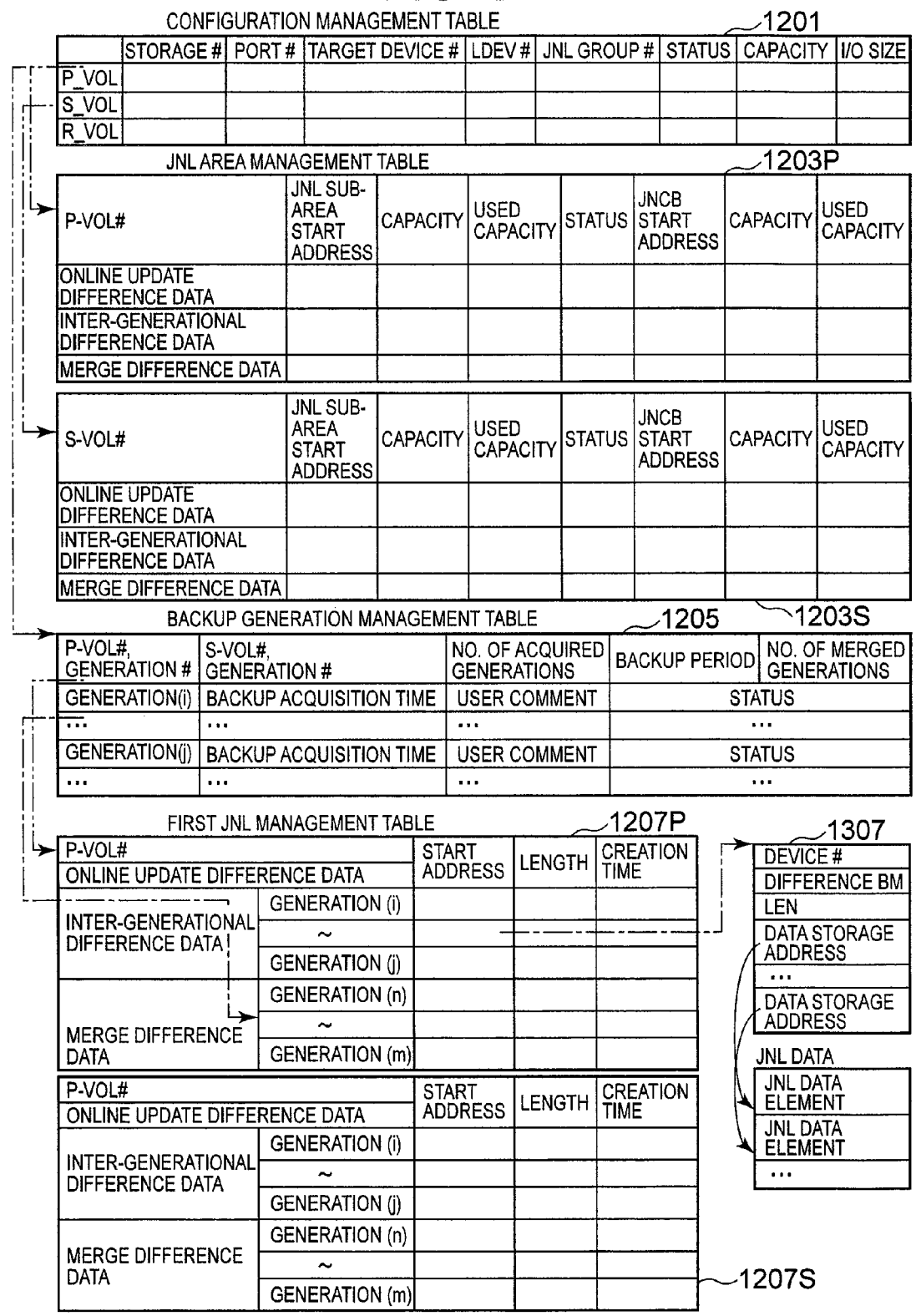
FIG. 27 shows examples of a configuration management table, JNL area management table, backup generation management table, first JNL management table and JNCB of the fourth embodiment.

FIG. 27 shows examples of the configuration management table, JNL area management table, backup generation management table, first JNL management table, and JNCB of the fourth embodiment.

As shown in FIG. 27, these tables are basically the same as the respective tables shown in FIG. 5, and remain fundamentally unchanged from the respective tables of FIG. 5, but information for a remote configuration is added. More specifically, these tables are as described below.

That is, the configuration management table 1201 is the configuration management table 201 shown in FIG. 5 to which a "storage #" has been added for each VOL. The "storage #" is the number indicating the storage system having the corresponding VOL.

The JNL area management table 1203P is the same as JNL area management table 203 shown in FIG. 5. JNL area management table 1203S differs from JNL area management table 1203P in that table 1203S corresponds to the S-VOL.

The backup generation management table 1205 is the same as the backup generation management table 205 shown in FIG. 5.

First JNL management table 1207P is the same as the first JNL management table 207 shown in FIG. 5. First JNL management table 1207S differs from first JNL management table 1207P in that table 1207S corresponds to the S-VOL.

JNCB 1307 is the same as the JNCB 307 shown in FIG. 5.

The respective tables shown in FIG. 27 are stored in both the first and third storage systems 125 and 601. Furthermore, the host write size, for example, can be received by either one of the first storage system 125 or the third storage system 601, configured inside the one receiving storage system, transferred to the other storage system, and configured inside the other storage system as well. Or, for example, the host write size can be received by both the first and third storage systems 125 and 601.

Figure 28:
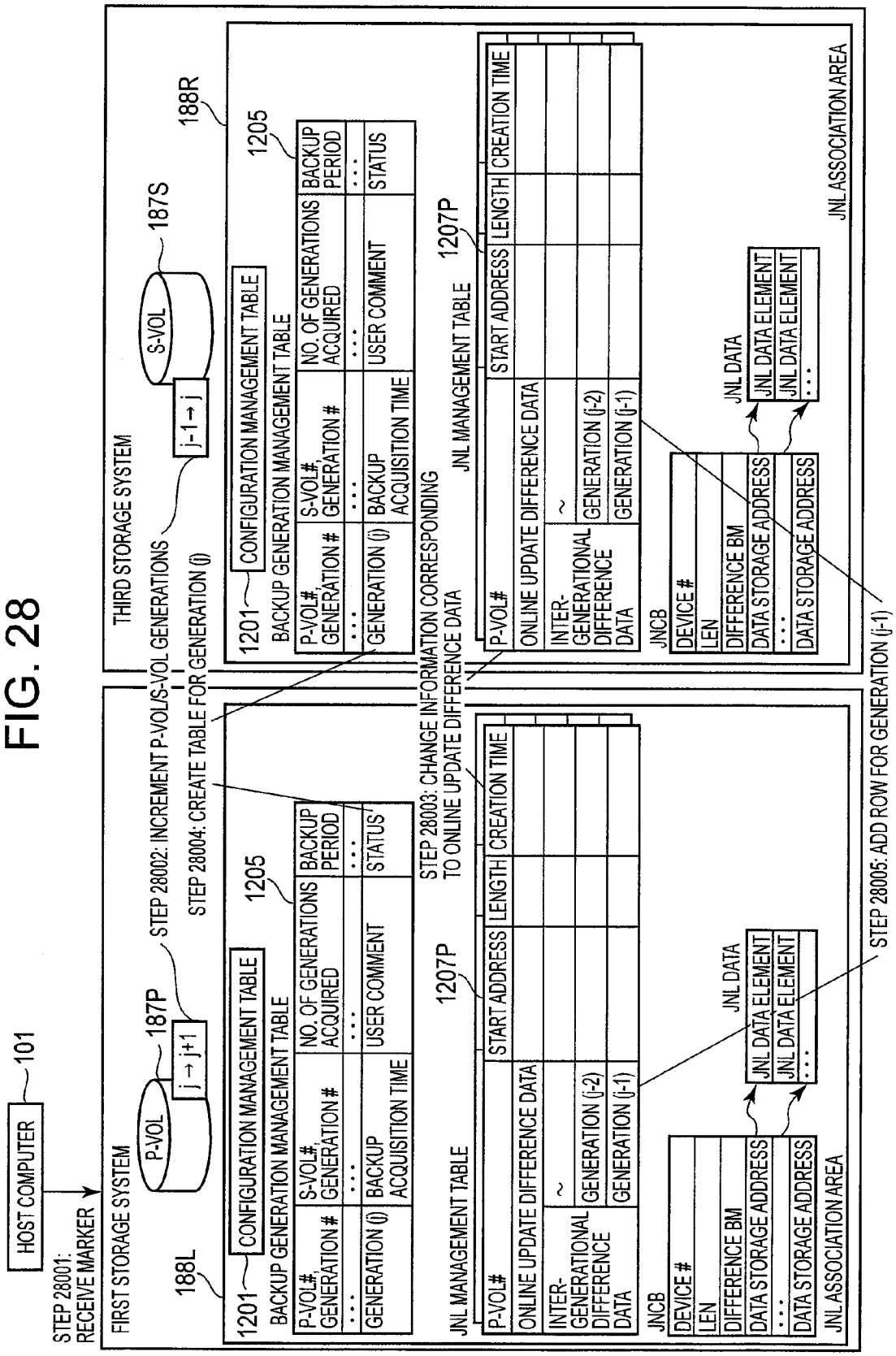
FIG. 28 shows marker reception and the flow of processing carried out in response to marker reception of FIGS. 23 and 24.

FIG. 28 shows marker reception and the flow of processing carried out in response to marker reception of FIGS. 23 and 24. In the explanation that follows, although not shown in the figure, the marker processing program 223, which is executed by the control processor 143 inside the first storage system 125, will be referred to as "marker processing program 223L", and the marker processing program 223, which is executed by the processor inside the third storage system 601, will be referred to as "marker processing program 223R" to avoid confusion.

The basic operation is the same as Steps 9001 through 9005 shown in FIG. 9. However, because of the remote copy configuration, it becomes necessary to transfer a marker from the first storage system 125 to the third storage system 601.

When the first storage system 125 receives a marker from the host computer 101 (Step 28001), the marker processing program 223L transfers the marker to the third storage system 601, and increments the P-VOL generation by 1, and at the same time, the marker processing program 223R increments the S-VOL generation by 1 in response to receiving the transferred marker (Step 28002).

The marker processing programs 223L and 223R update the "start address", "length" and "creation time" corresponding to the online update difference data (j+1) in the first JNL management table 1207P the same as in Step 9003 of FIG. 9 (Step 28003).

The marker processing programs 223L and 223R add the defined generation (j) row to the backup generation management table 1205 the same as in Step 9004 (Step 28004), and add a generation (j−1) row for the inter-generational difference data in the first JNL management table 1207P that same as in Step 9005 (Step 28005).

That is, in FIG. 28, the backup generation management table 1205 and the first JNL management table 1207P are updated by both the first and third storage systems 125 and 601. Further, the configuration management table 1201 is held in at least the third storage system 601 of the first and third storage systems 125 and 601.

As the sort process at marker reception time, the number of JNL data elements is different in FIG. 23 and FIG. 24, but the processing is basically the same. For example, in the case of FIG. 24, since there is a plurality of online update difference data elements corresponding to the same block, for example, the JNL sort program 217 inside the third storage system 601 searches for ON bits in order from the start of the difference BM (latest), and if there are ON bits, carries out either (1) or (2) below:

(1) reads out from the JNL sub-area the latest online update difference data element from among the plurality of online update difference data elements corresponding to these ON bit locations, and writes this latest data element to the S-VOL; or (2) reads out the plurality of online update difference data elements corresponding to the locations of these ON bits in the order these data elements were written to the JNL sub-area, and writes these data elements to the S-VOL.

In the case of (1), the JNCB must be configured to enable the search for the latest online update difference data element. For example, a plurality of data storage addresses can exist for the respective bits of the difference BM, and a flag indicating whether or not the latest data storage address of this plurality of data storage addresses is configured in the respective data storage address, and searching for the data storage address for which the flag signifying the latest data storage address is configured makes it possible to check which segment-stored online update difference data element is the latest data element.

Figure 25:
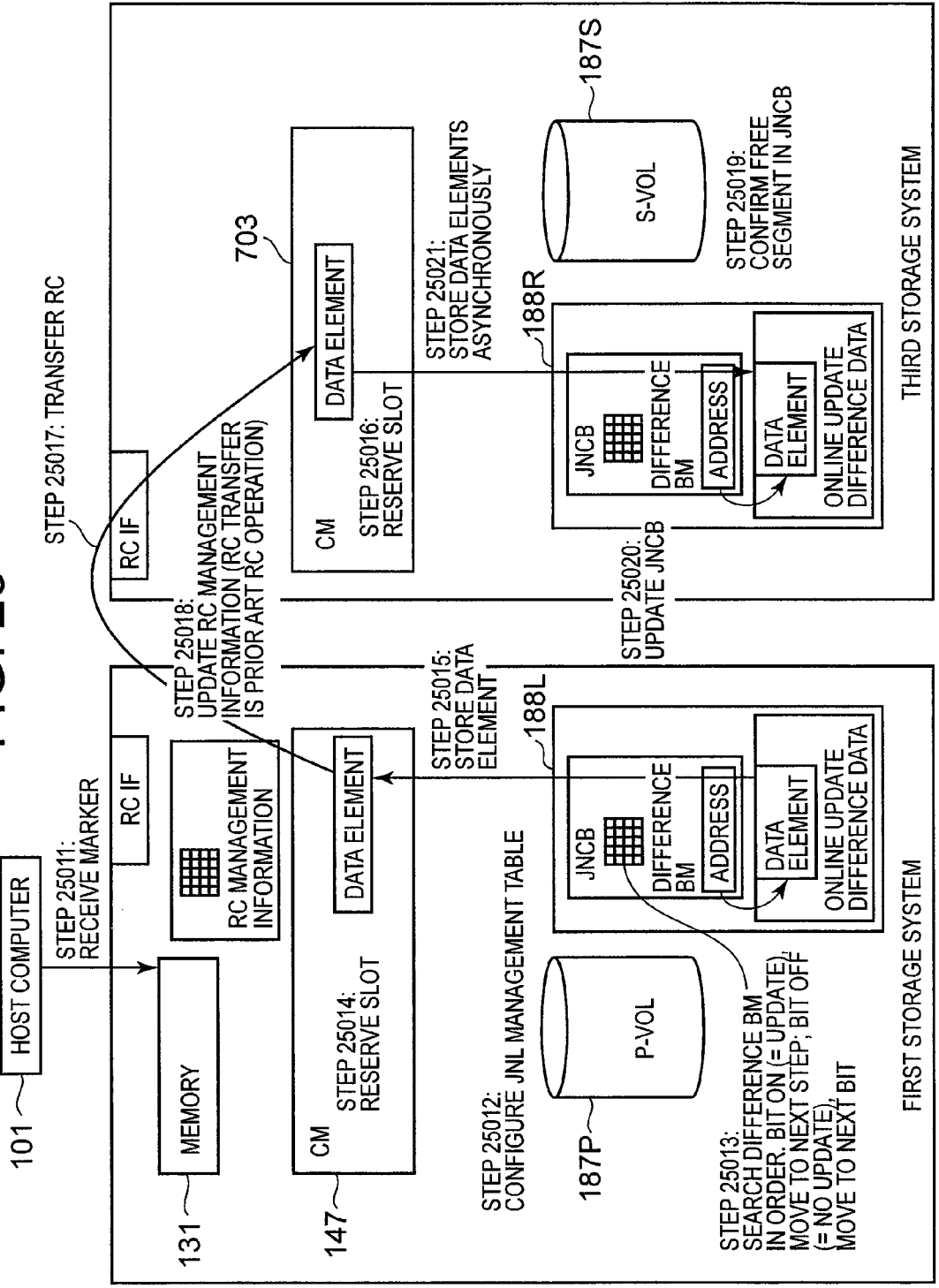
FIG. 25 shows marker reception and the flow of processing carried out in response to marker reception in an environment adopted by Scheme 3 or Scheme 4.

FIG. 25 shows marker reception and the flow of processing carried out in response to marker reception in an environment in which either Scheme 3 or Scheme 4 is employed.

When the first storage system 125 receives the marker (Step 25011), the marker processing program 223L transfers the marker to the third storage system 601, reserves a new JNL sub-area corresponding to the online update difference data, and carries out the same processing as Steps 28003 through 28005 (Step 25012).

The marker processing program 223L references the bits in the difference BM (latest) sequentially from the start bit, if a referenced bit is ON, executes Step 25014 and beyond for this ON bit, references the subsequent bit, and if the referenced bit is OFF, references the subsequent bit without carrying out Step 25014 (Step 25013).

The marker processing program 223L sends the marker and online update difference data element transfer request (for example, comprising the address indicating which block of the P-VOL the data element corresponds) to the third storage system 601 in order to transfer the online update difference data element written to the slot (pre-marker reception data element). Marker processing program 223R inside the third storage system 601 reserves a new JNL sub-area corresponding to the online update difference data, and reserves a slot in the cache memory 703 in response to receiving the marker and transfer request from the first storage system 125 (Step 25016), and notifies the first storage system 125 that preparations have been made to receive the data. Marker processing program 223L, upon receiving the notification that preparations have been made to receive the data from the third storage system 601, reserves a slot in the cache memory 147 for transferring the online update difference data element (Step 25014), reads out the online update difference data element from the JNL sub-area and writes this data element to this slot (Step 25015). In parallel with this processing, marker processing program 223L transfers the online update difference data element written to the slot to the third storage system 601 (Step 25017), and updates the RC management information as needed (Step 25018). Marker processing program 223R inside the third storage system 601 writes the transferred online update difference data element to the slot reserved by Step 25016. Marker processing program 223R references the JNCB (latest), and specifies a free segment of the JNL sub-area (latest) (Step 25019). Further, marker processing program 223R updates the bit corresponding to the block specified from the transfer request (the bit inside the difference BM (latest)) to ON, and adds the data storage address indicating the above-mentioned specified free segment as the address corresponding to this bit (Step 25020). Then, marker processing program 223R writes the online update difference data element stored in the slot to the above-mentioned free segment inside the JNL sub-area (latest) (Step 25021).

Figure 26:
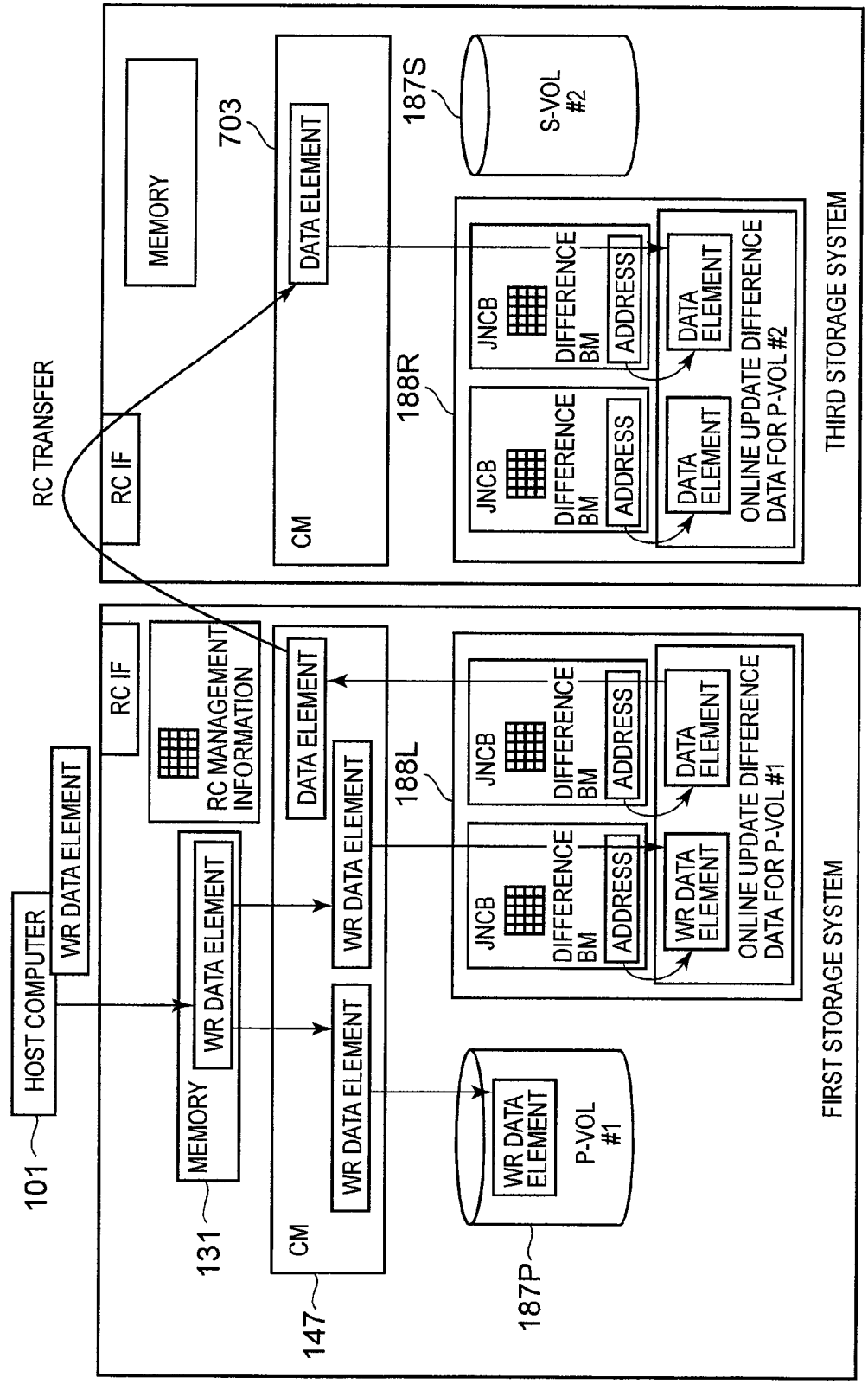
FIG. 26 shows the flow of a write process carried out when the first storage system 125 receives a write data element during the processing shown in FIG. 25 (the acquired online update difference data element is the after JNL data element)

FIG. 26 shows the flow of a write process carried out when the first storage system 125 receives a write data element during the processing shown in FIG. 25.

As described hereinabove, the first and third storage systems 125 and 601 provide a new JNL sub-area (latest) subsequent to marker reception so that even if a write data element is subsequently received from the host computer 101, this write data element is not overwritten by the pre-marker reception online update difference data.

Thus, when a write data element is received subsequent to marker reception, R/W program 213L writes the write data element to the new JNL sub-area (latest). The pre-marker reception online update difference data is transferred to the third storage system 601 asynchronously to the write process in response to the write command from the host computer as shown in FIG. 25.

In FIGS. 23 through 28 described hereinabove, the online update difference data element is an after JNL data element. Processing carried out by the fourth embodiment when the online update difference data element is a before JNL data element will be explained hereinbelow by referring to FIGS. 29 and 30.

Figure 29:
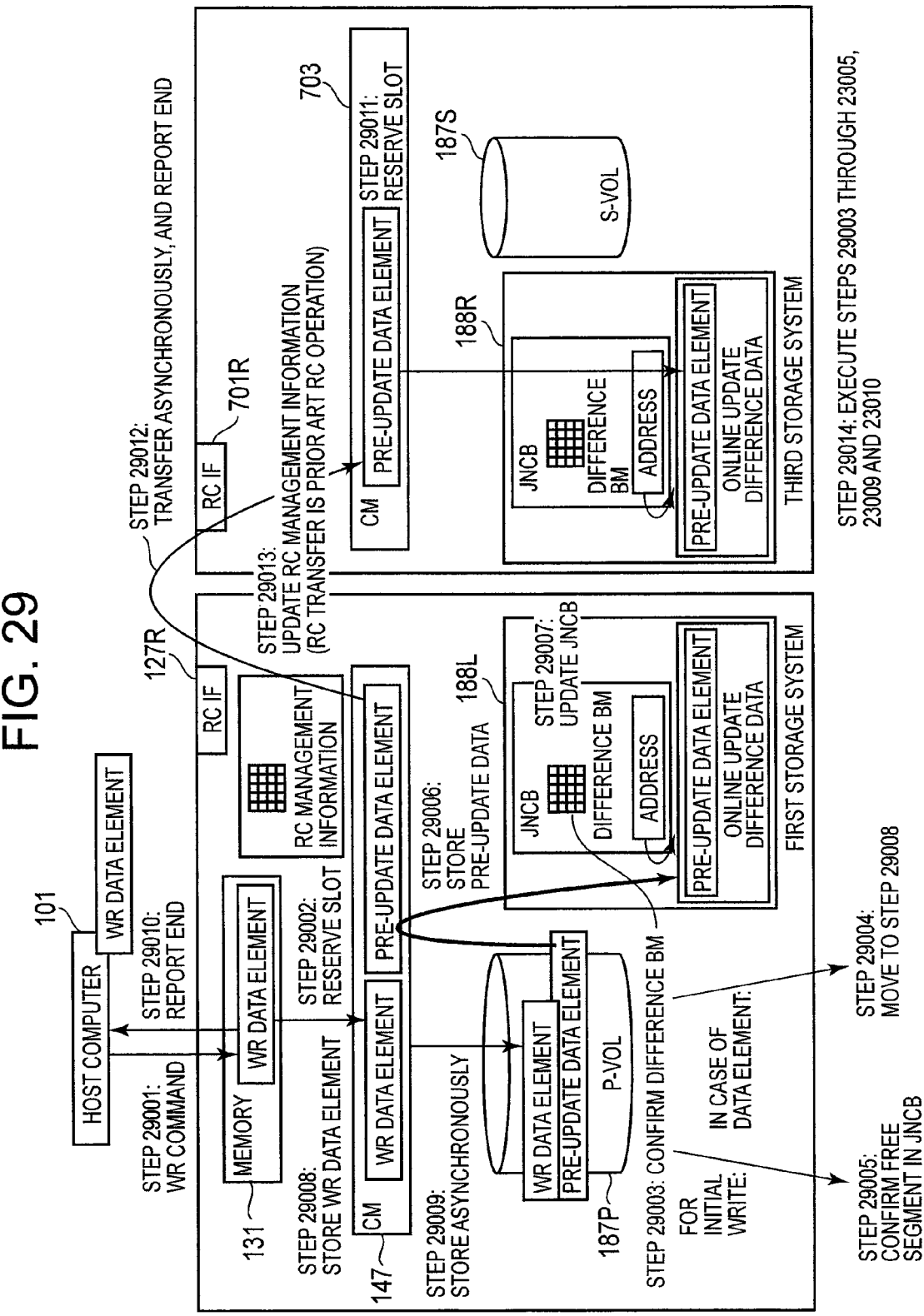
FIG. 29 shows the flow of a write process that writes a write data element to the P-VOL when Scheme 1 is employed in the fourth embodiment (the acquired online update difference data element is the before JNL data element)

FIG. 29 shows the flow of write processing for writing a write data element to the P-VOL when Scheme 1 is employed in the fourth embodiment. However, as mentioned above, the acquired online update difference data element is a before JNL data element.

R/W program 213L inside the first storage system 125 carries out the same processing as Steps 16001 through 16009 (refer to FIG. 16) to create the online update difference data element (Steps 29001 through 29009). Thereafter, a write-end report is sent from the first storage system 125 to the host computer 101 (Step 29010). In addition, the same processing as that of Steps 23011 through 23014 (refer to FIG. 23) is carried out to send the online update difference data element from the first storage system 125 to the third storage system 601 (Steps 29011 through 29014).

Figure 36:
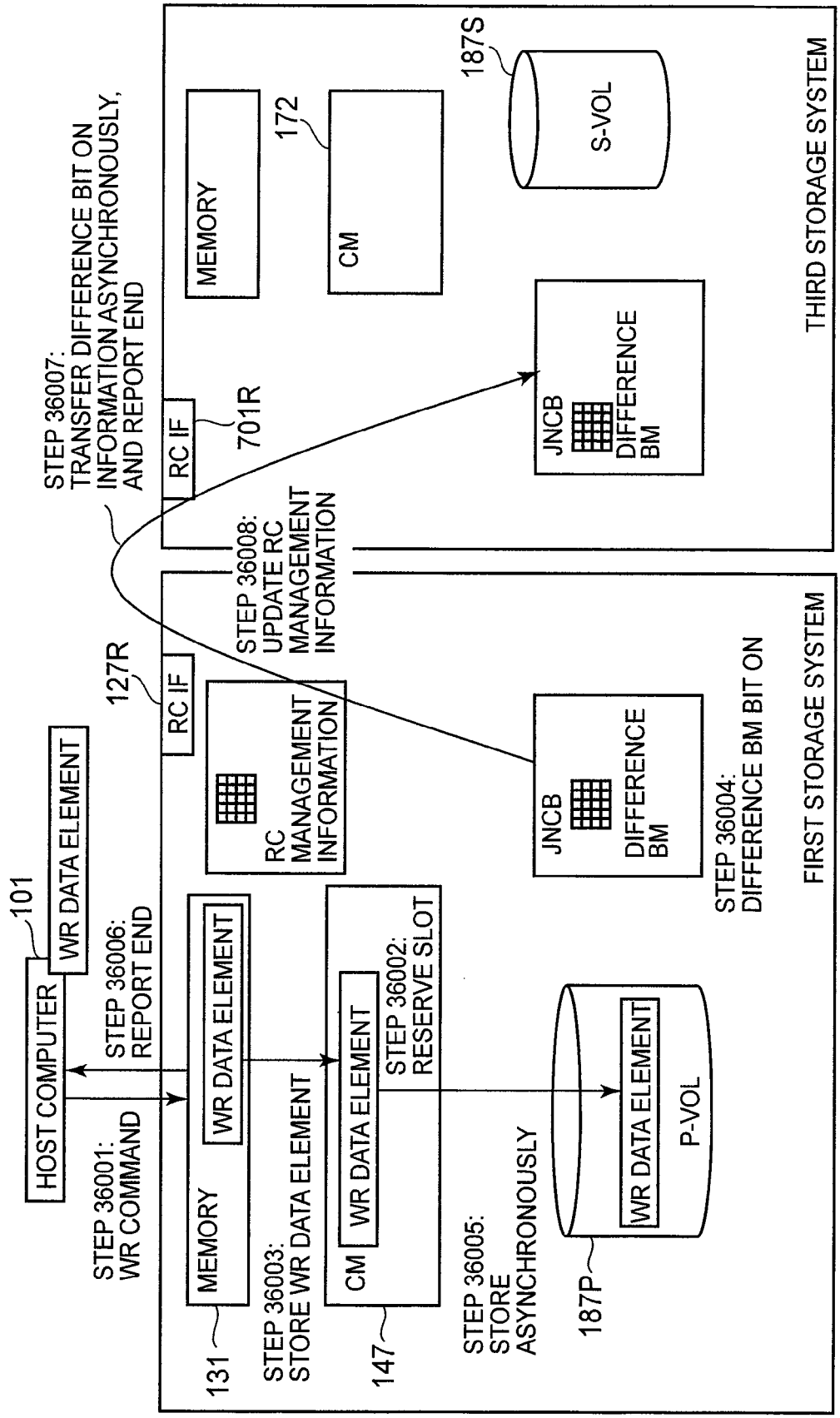
FIG. 36 shows one remote copy process when an online update difference data element is not acquired in the fourth embodiment.

Furthermore, as shown in FIG. 36, the online update difference date element (either the before JNL data element or the after JNL data element) need not be acquired in the fourth embodiment either. In this case, for example, the same processing as that of Steps 18001 through 18005 (refer to FIG. 18) is carried out (Steps 36001 through 36005). Thereafter, for example, R/W program 213L transfers information indicating the location of a bit that is ON in the difference BM (latest) to the third storage system 601 (Step 36007), and updates the RC management information as needed (Step 36008). R/W program 213R updates the bit in the location indicated by the received information (the bit inside the difference BM (latest)) to ON. In this case, the data element, that corresponds to the block (block inside the P-VOL) corresponding to the ON bit can be transferred from the first storage system 125 to the third storage system 601, and this data element can be written to the block inside the S-VOL that is in the same location as this block.

Figure 30:
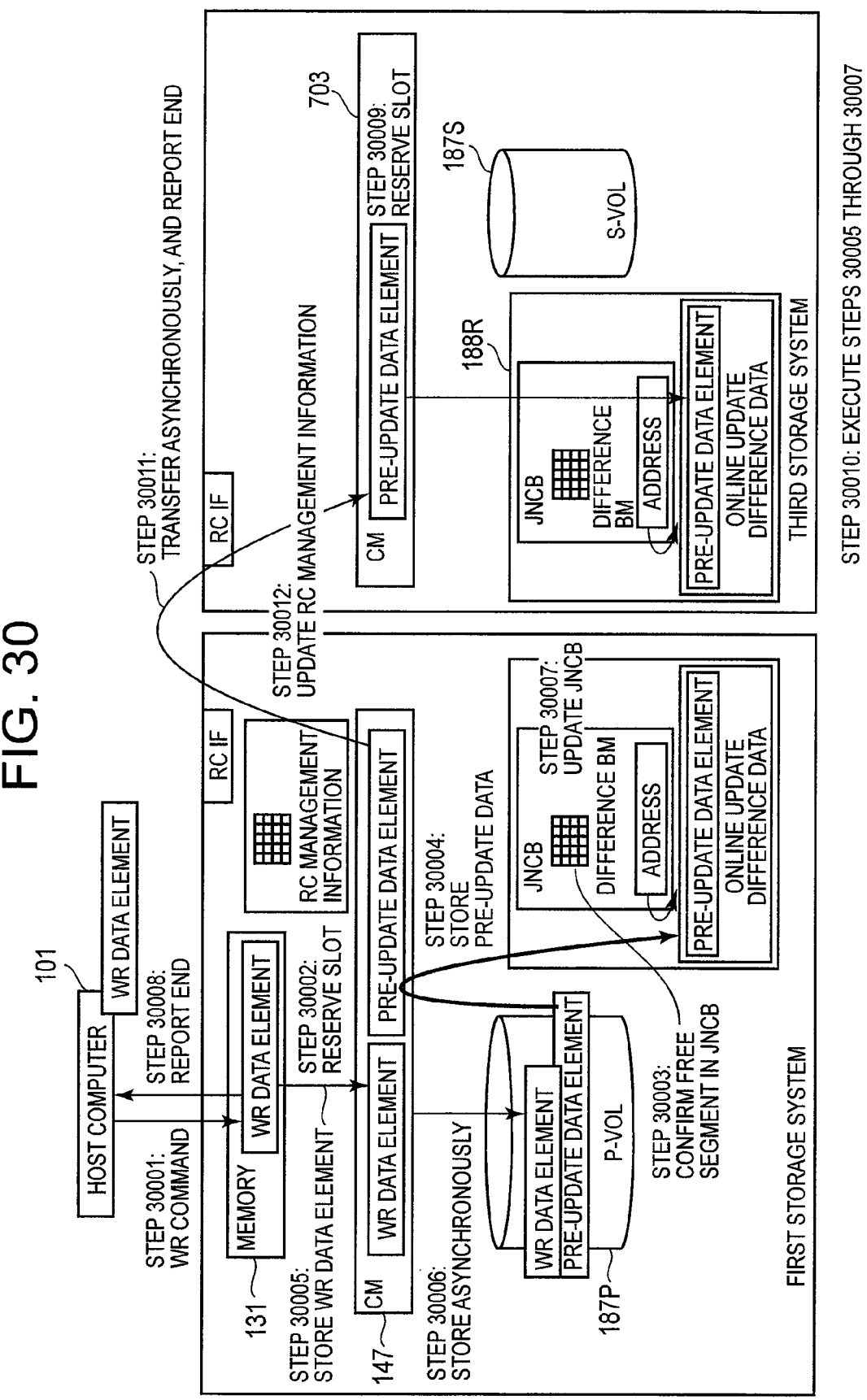
FIG. 30 shows the flow of a write process that writes a write data element to the P-VOL when Scheme 2 is employed in the fourth embodiment (the acquired online update difference data element is the before JNL data element)

FIG. 30 shows the flow of write processing for writing a write data element to the P-VOL when Scheme 2 is employed in the fourth embodiment. However, as described hereinabove, the acquired online update difference data element is the before JNL data element.

The corresponding relationships between the respective steps disclosed in FIG. 29 and the respective steps disclosed in FIG. 30 are as shown below:

| FIG. 29 | FIG. 30 |
| --- | --- |
| Step 29001 | Step 30001 |
| Step 29002 | Step 30002 |
| Step 29003 | (None) |
| Step 29004 | (None) |
| Step 29005 | Step 30003 |
| Step 29006 | Step 30004 |
| Step 29007 | Step 30007 |
| Step 29008 | Step 30005 |
| Step 29009 | Step 30006 |
| Step 29010 | Step 30008 |
| Step 29011 | Step 30009 |
| Step 29012 | Step 30011 |
| Step 29013 | Step 30012 |
| Step 29014 | Step 30010 |

As described above, in the flow of processing of FIG. 30, all the data elements are stored without the JNL data elements being overwritten in Scheme 2, thereby doing way with the need for Steps 29003 and 29004 shown in FIG. 29. Further, as shown in FIG. 30, Steps 30005 through 30007 are carried out as Step 30010 in the third storage system 601.

Furthermore, the flow of write processing for writing a write data element to the P-VOL when either Scheme 3 or Scheme 4 is employed in the fourth embodiment can be as follows.

That is, in the case of Scheme 3, Steps 31001 through 31021 can be considered. Of these steps, Steps 31001 through 31010 can be made the same as Steps 29001 through 29010 of FIG. 29. Further, the remaining Steps 31011 through 31021 can be made the same as Steps 25011 through 25021 of FIG. 25.

Conversely, in the case of Scheme 4, Steps 30001' through 31018' can be considered. Of these steps, Steps 30001' through 30007' can be made the same as Steps 30001 through 30007. The remaining Steps 31008' through 31018' can be made the same as Steps 25011 through 25021.

Figure 37:
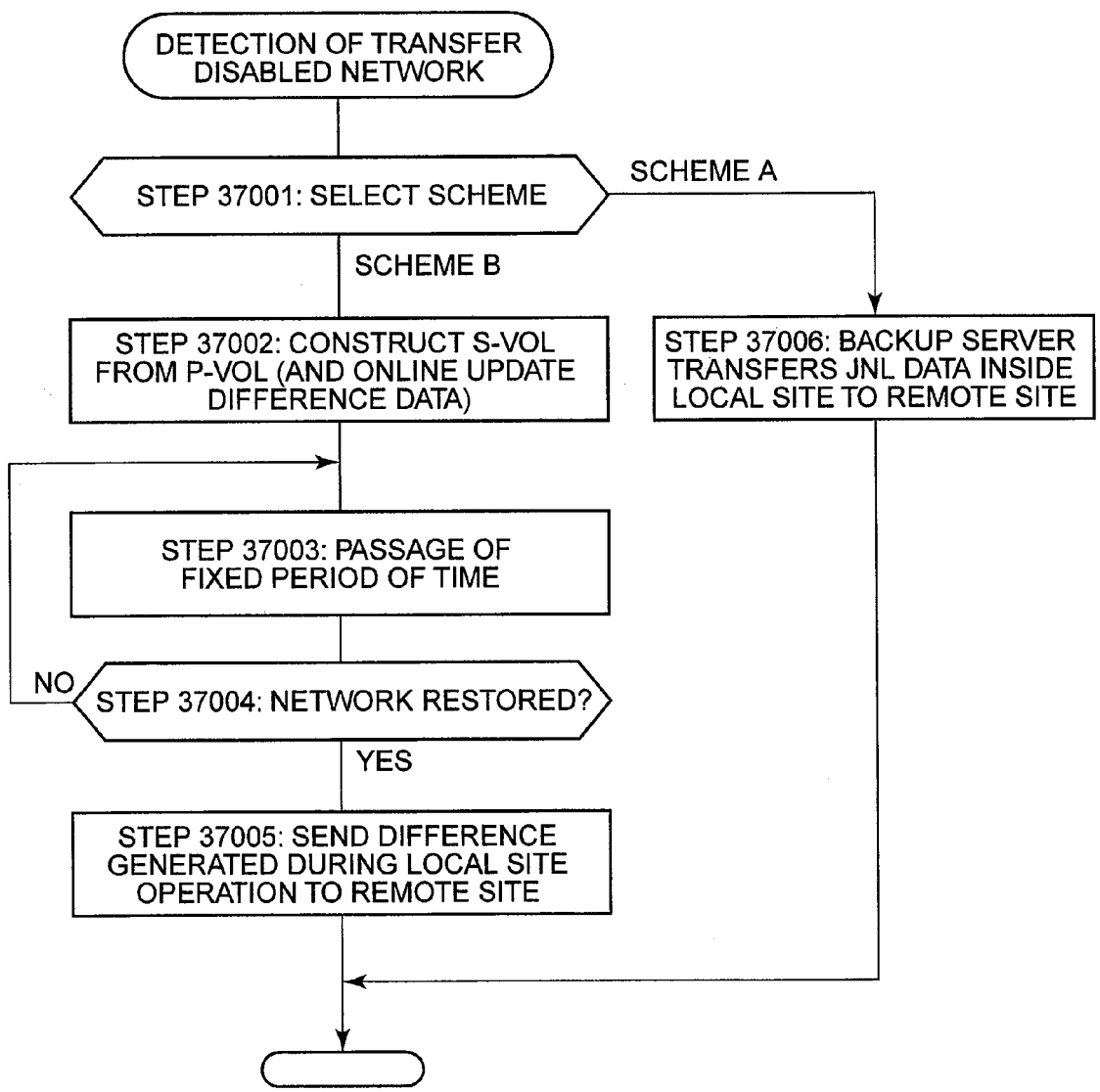
FIG. 37 shows the flow of a process carried out when the inability to transfer a data element to the remote side has been detected.

FIG. 37 shows the flow of processing carried out when the fact that a data element cannot be transferred to the remote side has been detected.

There are instances when the RC IF (and external connection IF described further below) detects that network transfer is not possible (that is, the fact that a data element cannot be transferred). The inability of a network to carry out a transfer can be caused, for example, by the failure of a switch on the transfer path, a broken cable, or a failure of the third storage system 601 (or the externally connected second storage system 161).

In this case, the control processors 143 (refer to FIG. 1), backup server 501 (Refer to FIG. 22) or management server 111 will select either Scheme A, which uses the backup server 501, or Scheme B, which uses only the local site (Step 37001).

When Scheme A is selected, the various information that is stored in the control memory 145 of the first storage system 125 is transferred to either the backup server 501 or the management server 111. Either the backup server 501 or the management server 111, based on this various information, recognizes the JNL association area 188L inside the first storage system 125 and the S-VOL inside the third storage system 601. Either the backup server 501 or the management server 111 reads out the online update difference data element from the first storage system 125, and writes this online update difference data element to the S-VOL inside the third storage system 601 (Step 37006).

If Scheme B is selected, either the backup server 501 or the management server 111, in response to a failure detection report (report of a disabled network transfer) from the first storage system 125, issues an indication to the first storage system 125 to continue the backup. After detecting that the network is unable to carry out a transfer, an online update difference data element is acquired as needed in accordance with updating the P-VOL.

The control processors 143 inside the first storage system 125 that received the indication to continue the backup creates an S-VOL from the P-VOL (and, as needed, from the online update difference data element) (Step 37002).

In the meantime, the control processors 143 monitors the status of the above-mentioned transfer path at fixed times (Step 37003), and determines whether or not the network has been restored (Step 37004). When it is determined that the network has been restored, the control processors 143 either spontaneously, or when the either backup server 501 or management server 111 has been notified of the restoration and a transfer start indication has been received from either server 501 or server 111, transfers the online update difference data elements that have accumulated inside the first storage system 125 to the third storage system 601 (Step 37005).

FIG. 38 shows three examples of the flow of a restore process of the fourth embodiment. In the explanation that follows, although not shown in the figure, the restore program 221, which is executed by the control processors 143 inside the first storage system 125, will be referred to as "restore program 221L", and the restore program 221, which is executed by the processor inside the third storage system 601, will be referred to as "restore program 221R" to avoid confusion.

Figure 38A:
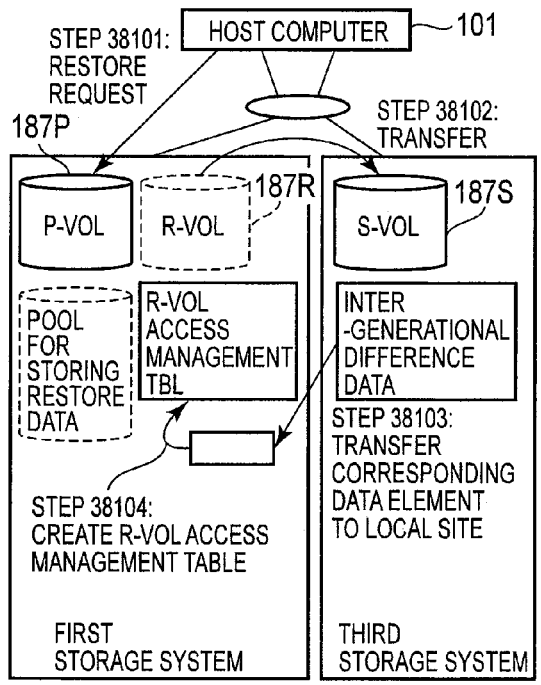
FIG. 38 shows the flows in three examples of restore processing of the fourth embodiment.

FIG. 38A shows a case in which the control processor 143 uses backup data elements (inter-generational difference data element, and data element inside the S-VOL) in the third storage system 601 to create an R-VOL inside the first storage system 125. More specifically, for example, restore program 221L, upon receipt of a restore request from the host computer 101 (or another external computer) (Step 38101), transfers this restore request to the third storage system 601 (Step 38102). In response to this restore request, restore program 221R transfers the data elements (data elements from inside the S-VOL and/or inter-generational difference data elements specifiable using the method explained by referring to FIGS. 13 and 14) configuring the R-VOL corresponding to the restore-targeted generation of the P-VOL to the first storage system 125 (Step 38103). The transferred data elements are stored in the storage pool inside the first storage system 125. The addresses indicating the storage-destination segments of the respective data elements are registered in the R-VOL access management table created by restore program 221L (Step 38104). Access (for example, a read) to the R-VOL inside the first storage system 125 is controlled using this R-VOL access management table.

Figure 38B:
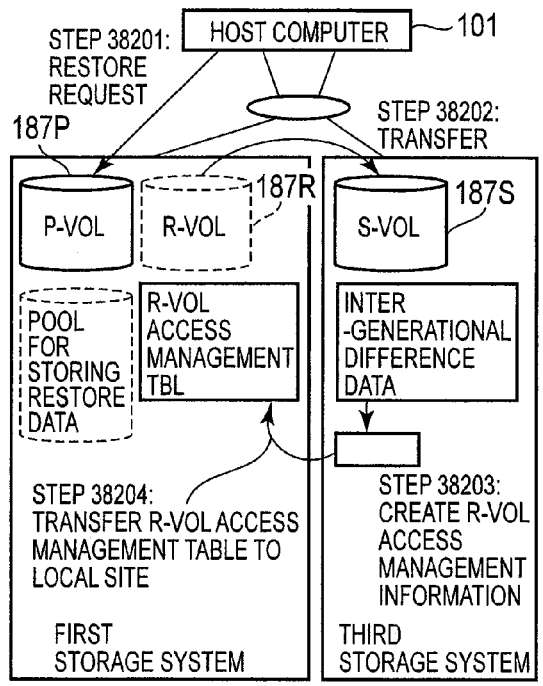

FIG. 38B shows a case in which, using the processing of FIG. 38A, the R-VOL access management table is created by restore program 221R of the third storage system 601 and transferred to the first storage system 125. More specifically, the same processing as that of Steps 38101 and 38102 is carried out (Steps 38201 and 38202). Restore program 221R creates the R-VOL access management table, which comprises the addresses indicating the respective locations of the data elements that configure the R-VOL corresponding to the restore-targeted generation of the P-VOL (Step 38203). Then, restore program 221R transfers this R-VOL access management table to the first storage system 125. In this case, unlike the case of FIG. 38A, the data elements configuring the R-VOL are inside the third storage system 601. Thus, when the first storage system 125 receives a read command specifying the R-VOL, data elements that accord with this read command are acquired from the third storage system 601 and sent to the source of the read command.

Figure 38C:
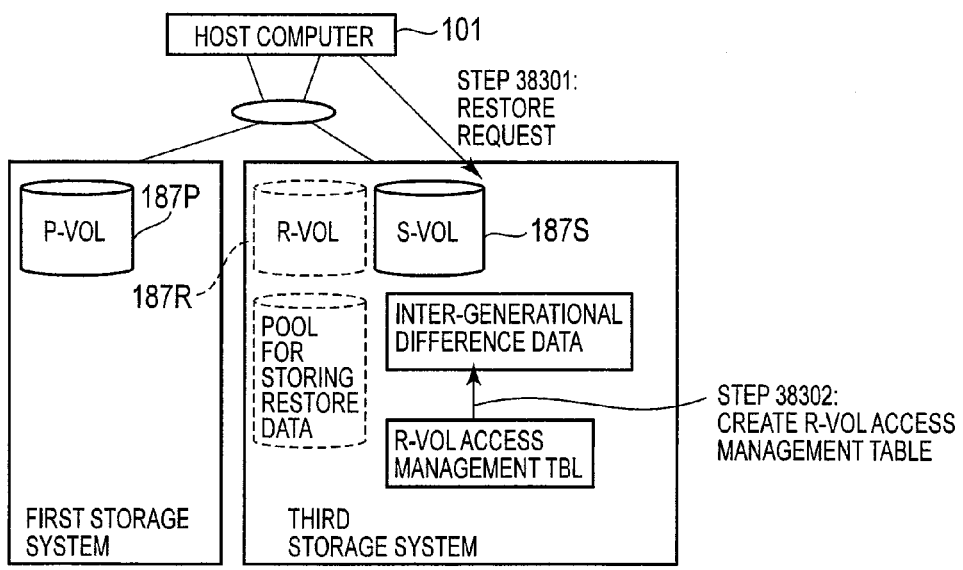

FIG. 38C shows a case in which the third storage system 601 receives a restore request. That is, in this case, restore program 221R receives the restore request (Step 38301), and creates the R-VOL access management table using the method explained by referring to FIG. 13 (Step 38302).

In any of the cases described above, the pool area corresponding to the R-VOL can reside in either the first or third storage system 125 or 601. In the examples shown in FIGS. 38A through 38C, the pool area corresponding to the R-VOL resides inside the storage system in which the S-VOL exists. During restore processing, it is possible to receive a write command that specifies the R-VOL, and the write data element that accords with this write command is saves to this pool area.

Embodiment 5

In a fifth embodiment of the present invention, the second storage system 161 is used instead of the third storage system 601. The third storage system 601 was connected to the first storage system 125 in a so-called remote copy configuration, but the second storage system 161 is connected to the first storage system 125 in a so-called external connection configuration. When a data element is written to the write destination inside the first storage system 125 using a connection in the "remote copy configuration", this data element is stored in both the PDEV inside the first storage system 125 and the PDEV inside the third storage system 601, but when a data element is written to the write destination inside the first storage system 125 using a connection in the "external connection configuration", this data element is not stored in the PDEV inside the first storage system 125, but rather, this data element is stored in the PDEV that constitutes the basis of a storage area inside the second storage system 161, which corresponds to an area comprising this write destination.

Figure 32:
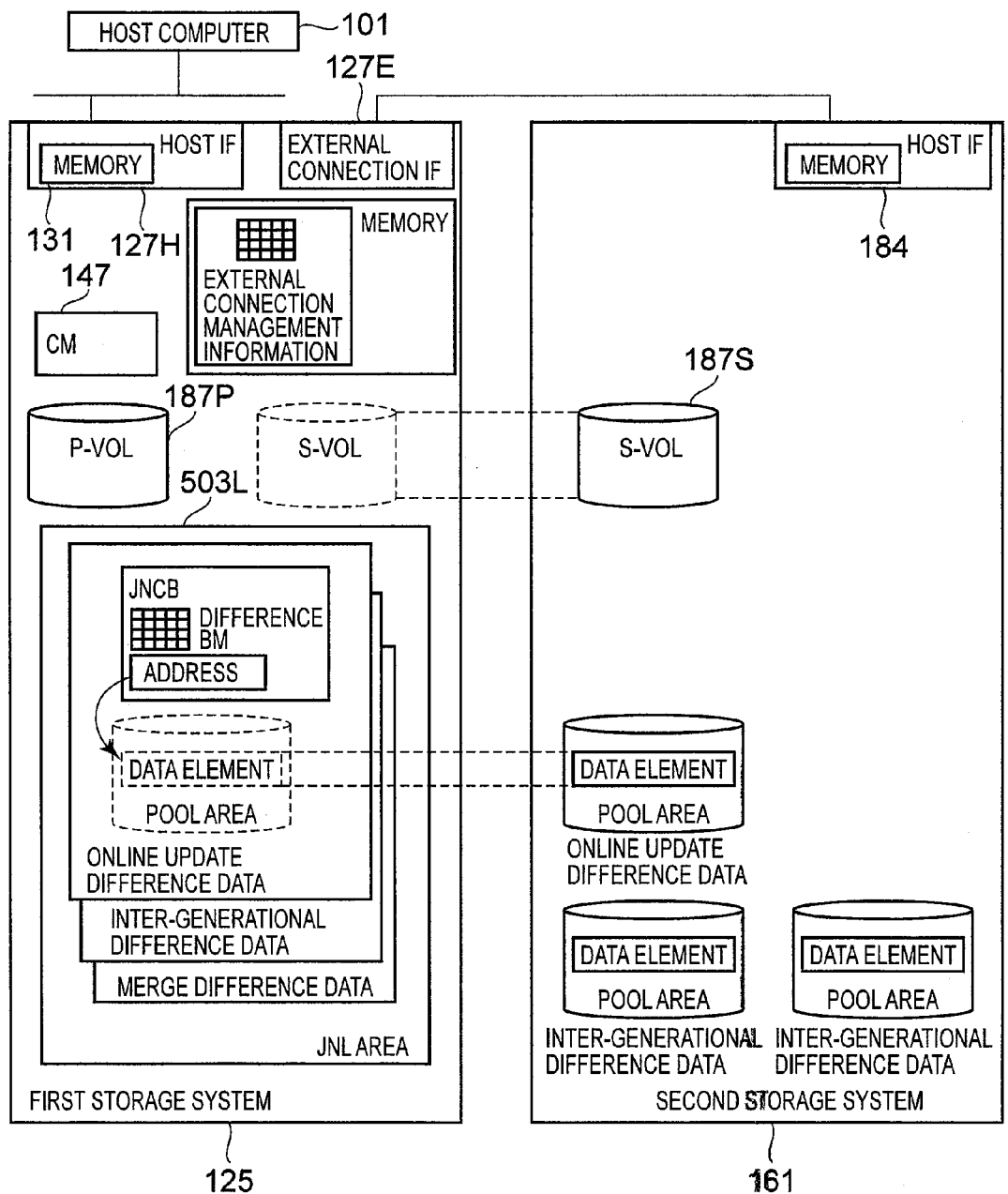
FIG. 32 shows the configuration of a computer system related to a fifth embodiment of the present invention.

FIG. 32 shows the configuration of a computer system related to the fifth embodiment of the present invention.

The storage resources inside the second storage system 161 are utilized as if the storage resources are inside the first storage system 125. More specifically, for example, the second storage system 161 is connected to the first storage system 125 using the technology disclosed in Japanese Patent Application Laid-open No. 2006-331458.

A plurality of target devices inside the second storage system 161, for example, is associated on a one-to-one basis to the S-VOL inside the first storage system 125, the JNL sub-area (pool area) for online update difference data, the JNL sub-area (pool area) for inter-generational difference data, and the JNL sub-area (pool area) for merge difference data. In this case, for example, a data element stored in the JNL sub-area for inter-generational difference data is transferred from the first storage system 125 to the second storage system 161, and stored in a logical volume associated to the target device (target device inside the second storage system) that is associated to this JNL sub-area.

Figure 43:
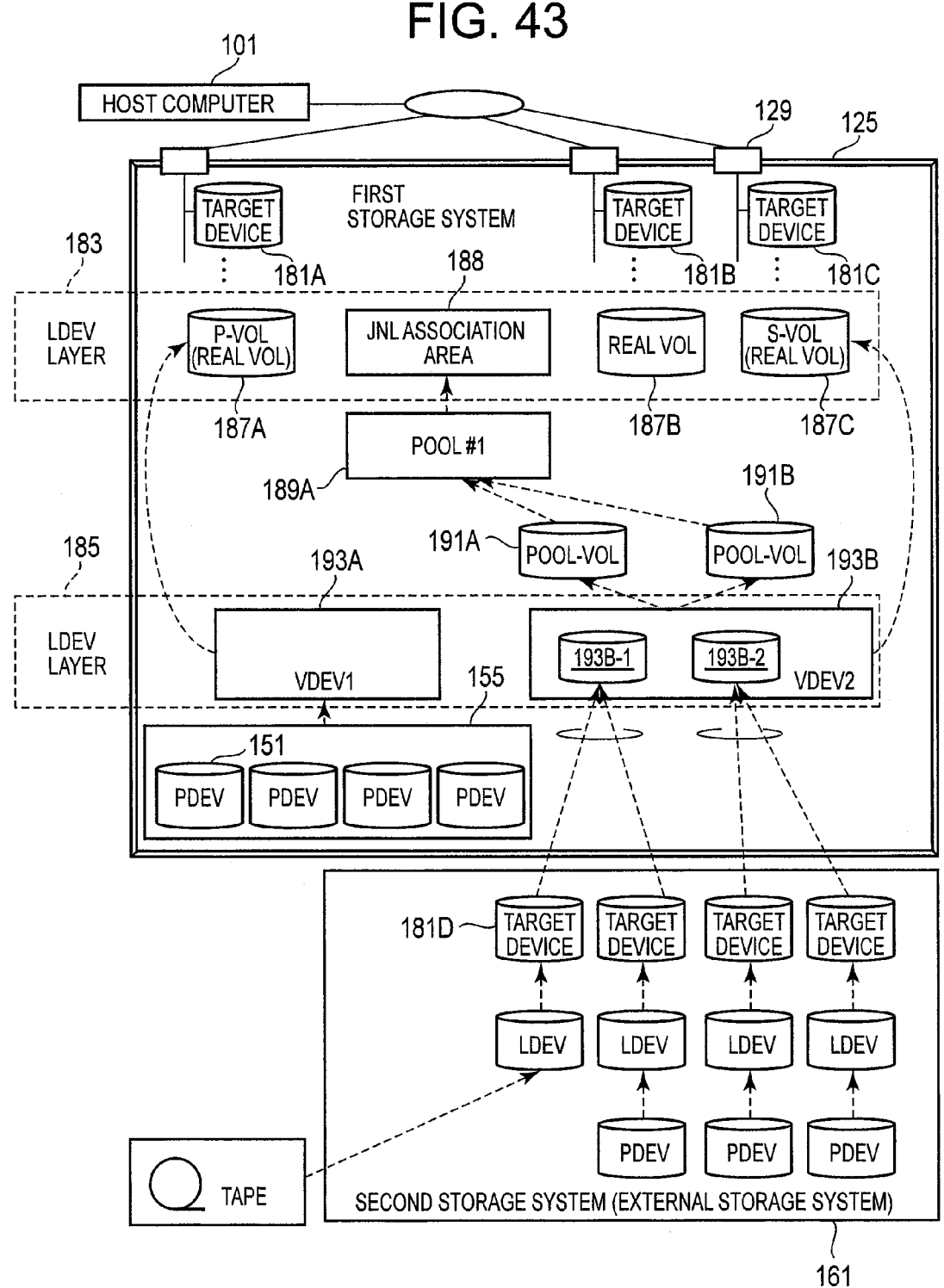
FIG. 43 shows an example of the device mapping relationship in the fifth embodiment.

FIG. 43 shows an example of the device mapping relationship of the fifth embodiment.

The target devices inside the second storage system 161 correspond to the respective storage areas 193B-1 and 193B-2 inside the VDEV 193B of the first storage system 125. In this embodiment, switching of the target devices corresponding to the respective storage areas 193B-1 and 193B-2 is possible.

Further, a tape can be used as the basis of a logical volume associated to a target device. More specifically, the tape can be used because a plurality of data elements configuring the inter-generational difference data and a plurality of data elements configuring the merge difference data are written in order to addresses by the already explained sort program. However, in this case, dividing the allocations of the JNL sub-area into the target device units of the second storage system 161 is easier to control. Then, storing one or more inter-generational difference data and merge difference data in the second storage system 161 enables data to be accessed by way of the target devices as needed. In addition, it is possible to remove old difference data (JNL data) from the second storage system 161 in order. More specifically, for example, the control processors 143 can reference the JNL area management table 203, specify the location of the JNL sub-area corresponding to the old generation, and disengage the target device by severing the relationship between this JNL sub-area and the target device (a target device inside the second storage system) that corresponds thereto (for example, deleting the identifier of the target device corresponding to the JNL sub-area). More specifically, for example, upon transitioning to a second period (February) subsequent to a first period, the first target device corresponding to the area in which JNL data acquired in the first period (for example, January) is stored is disengaged from the VDEV 193B, and the second target device corresponding to the area in which JNL data acquired in the second period is stored is connected to the VDEV 193B.

Further, the information of the following either (1) or (2) can be managed in the backup generation management table 205 as the "status" for each generation:

(1) information indicating that the corresponding JNL data (for example, inter-generational difference data) is stored in the second storage system 161; or (2) information indicating that the path between the VDEV inside the first storage system 125 and the target device is offline (information signifying that an indication is needed to make it possible to reference this path from the first storage system by putting this path online).

Figure 33:
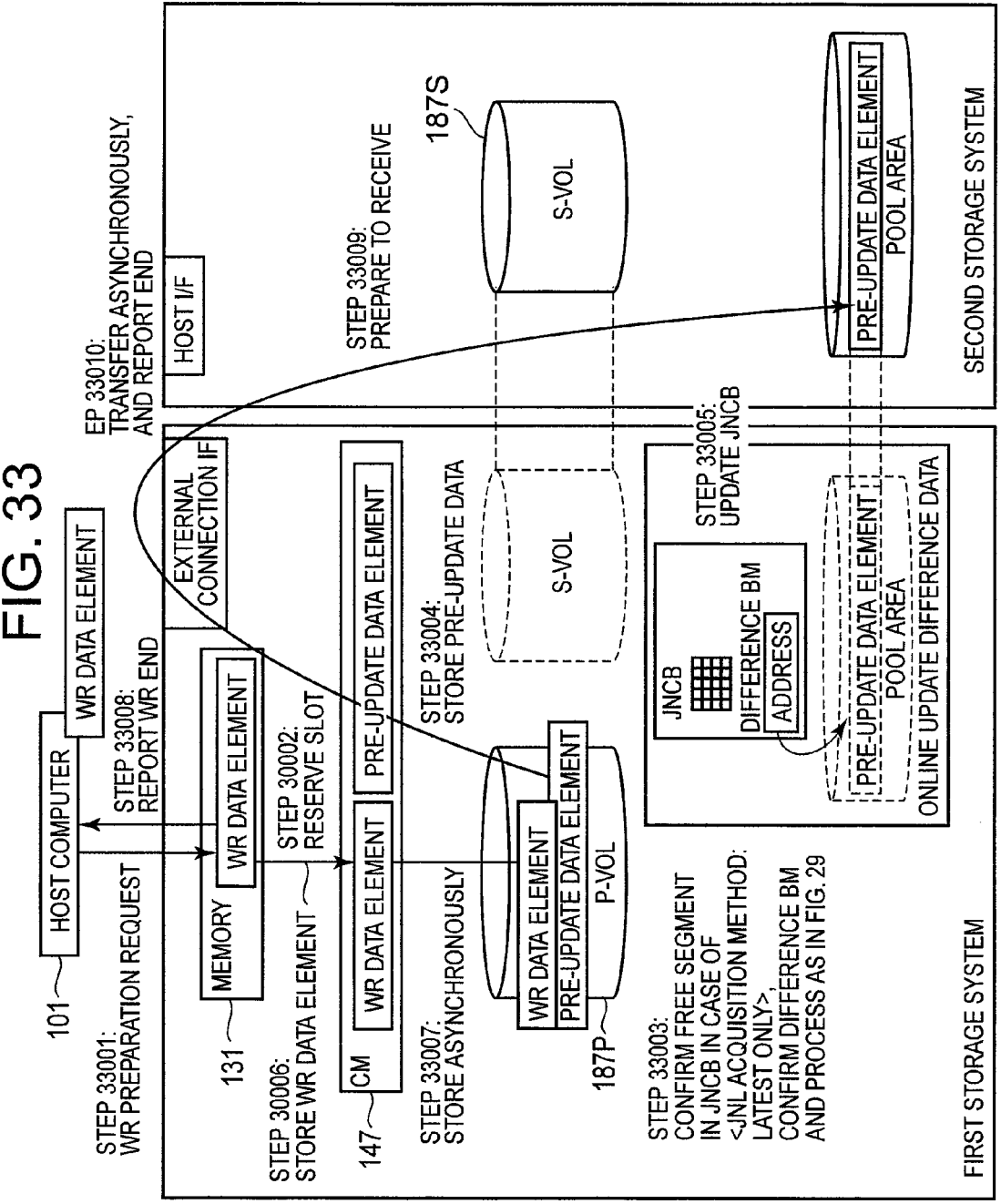
FIG. 33 shows the flow of a write process for writing a write data element to a P-VOL in the fifth embodiment.

FIG. 33 shows the flow of write processing for writing a write data element to the P-VOL in the fifth embodiment. Furthermore, in FIG. 33, the online update difference data element is a before JNL data element. Further, in the explanation that follows, although not shown in the figure, the R/W program 213, which is executed by the control processors 143 inside the first storage system 125, will be referred to as "R/W program 213L", and the R/W program 213, which is executed by the processors 167 inside the second storage system 161, will be referred to as "R/W program 213E" to avoid confusion.

Steps 33001 through 33008 shown in FIG. 33 are the same as Steps 30001 through 30008 shown in FIG. 30 (The corresponding relationships between the step numbers are partially different, but the overall processing that is carried out is the same). However, the storage destination of the pre-update data element in Step 33004 is a slot reserved in the cache memory 147 instead of the JNL sub-area. Further, Steps 33009 and 33010 are carried out.

An overview is as follows. That is, R/W program 213L reads out the pre-update data element from the write-destination block inside the P-VOL, and writes this data element to the cache memory 147 in response to a write command from the host computer 101. Then, R/W program 213L sends a write preparation request to the second storage system 161. In response to this write preparation request, R/W program 213E reserves a slot in the cache memory, and responds to the first storage system 125 to the effect that preparation has ended (Step 33009). R/W program 213L, upon receiving this response, transfers the pre-update data element and write command (command that specified the target device corresponding to the JNL sub-area (latest) inside the first storage system 125), which are inside the cache memory 147, to the second storage system 161. R/W program 213E temporarily writes this pre-update data element to cache memory, and writes this pre-update data element to the JNL sub-area associated to the target device specified by this command. Further, R/W program 213E sends a write-end report to the first storage system 125 (Step 33010).

Figure 34:
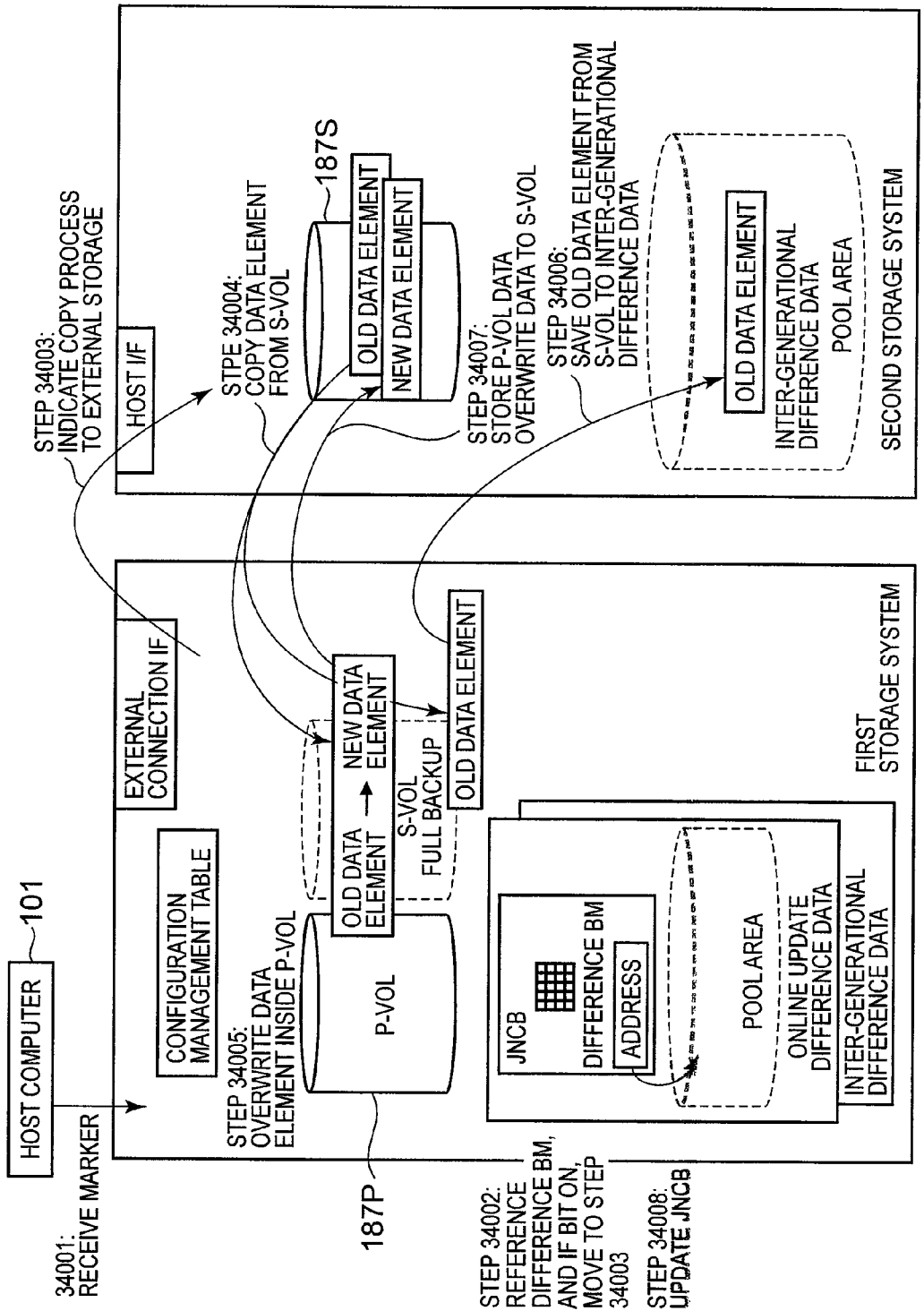
FIG. 34 shows the flow of a process carried out when a marker is received during the write process of FIG. 33.

FIG. 34 shows the flow of processing carried out when a marker is received during the write process of FIG. 33. Furthermore, it is supposed that generation (j) is defined in accordance with the reception of this marker.

The JNL sort program 217, responds to marker reception (Step 34001), references bits in order from the start of difference BM (j) (Step 34002), and if there is an ON bit, issues an indication to the second storage system 161 for a copy process (Step 34003). The JNL sort program 217 reads out the data element (data element that is stored in the block corresponding to the above-mentioned ON bit) stored in the S-VOL inside the second storage system 161 (Step 34004), and writes this data element to JNL sub-area (j–1) that corresponds to the inter-generational difference data (j–1) located inside the second storage system 161 (Step 34005). Thereafter, the JNL sort program 217 copies the data element (data element inside the block corresponding to the above-mentioned ON bit) in the block inside the P-VOL to a block inside the S-VOL (the block of the same address as the copy-source block) (Steps 34006 and 34007). Thereafter, the JNL sort program 217 updates the JNCB (j–1) (Step 34008). The data storage address inside the post-updated JNCB (j–1) shows the storage-destination segment (the segment inside the JNL sub-area (j–1)) of the pre-update data element of inside the second storage system 161.

Furthermore, upon receiving a command that specifies a block (block for which copying is not complete) ahead of the progress of the data element copy from the P-VOL to the S-VOL, R/W program 213L prepares a buffer area in the cache memory 147, and writes the write data element that accords with the received write command to this buffer area. When the address shifts to an address ahead of the copy-source address, and constitutes the address of the write-destination block specified by the above-mentioned write command, R/W program 213L copies the pre-update data element (old data element) stored in this write-destination block to the S-VOL, and thereafter, writes the write data element in the buffer area to the write-destination block inside the P-VOL.

Figure 35:
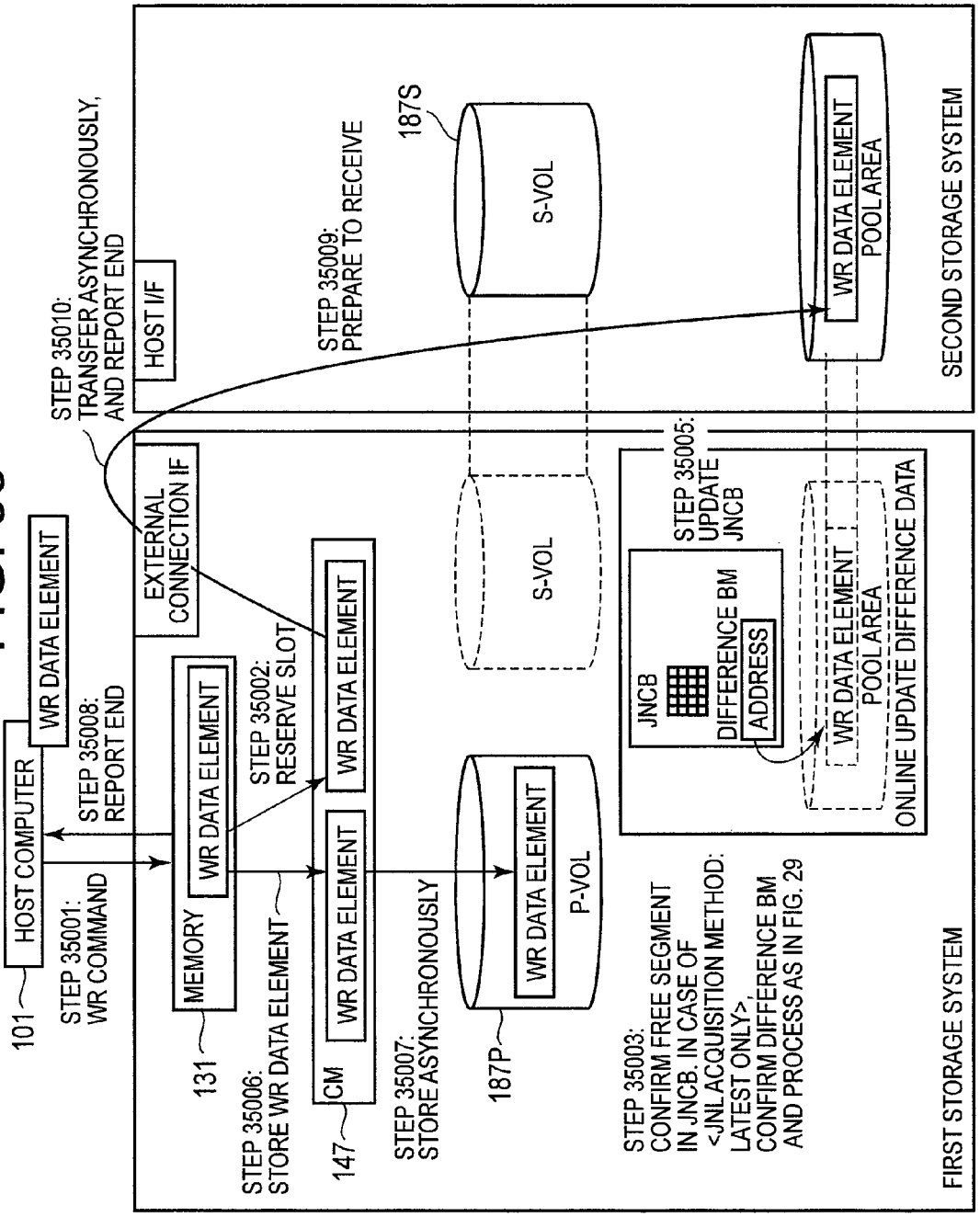
FIG. 35 shows the flow of a write process for writing a write data element to a P-VOL in the fifth embodiment.

FIG. 35 shows the flow of write processing for writing a write data element to the P-VOL in the fifth embodiment. Furthermore, in FIG. 35, the online update difference data element is the after JNL data element.

Approximately the same processing as that of Steps 33001 through 33010 of FIG. 33 is carried out (Steps 35001 through 35010). However, since the online update difference data element is the after JNL data element, instead of processing that is equivalent to Step 33004, the write data element is stored in the cache memory 147 as the online update difference data element. This online update difference data element, which is stored in the cache memory 147, is transferred to the second storage system 161.

Figure 44:
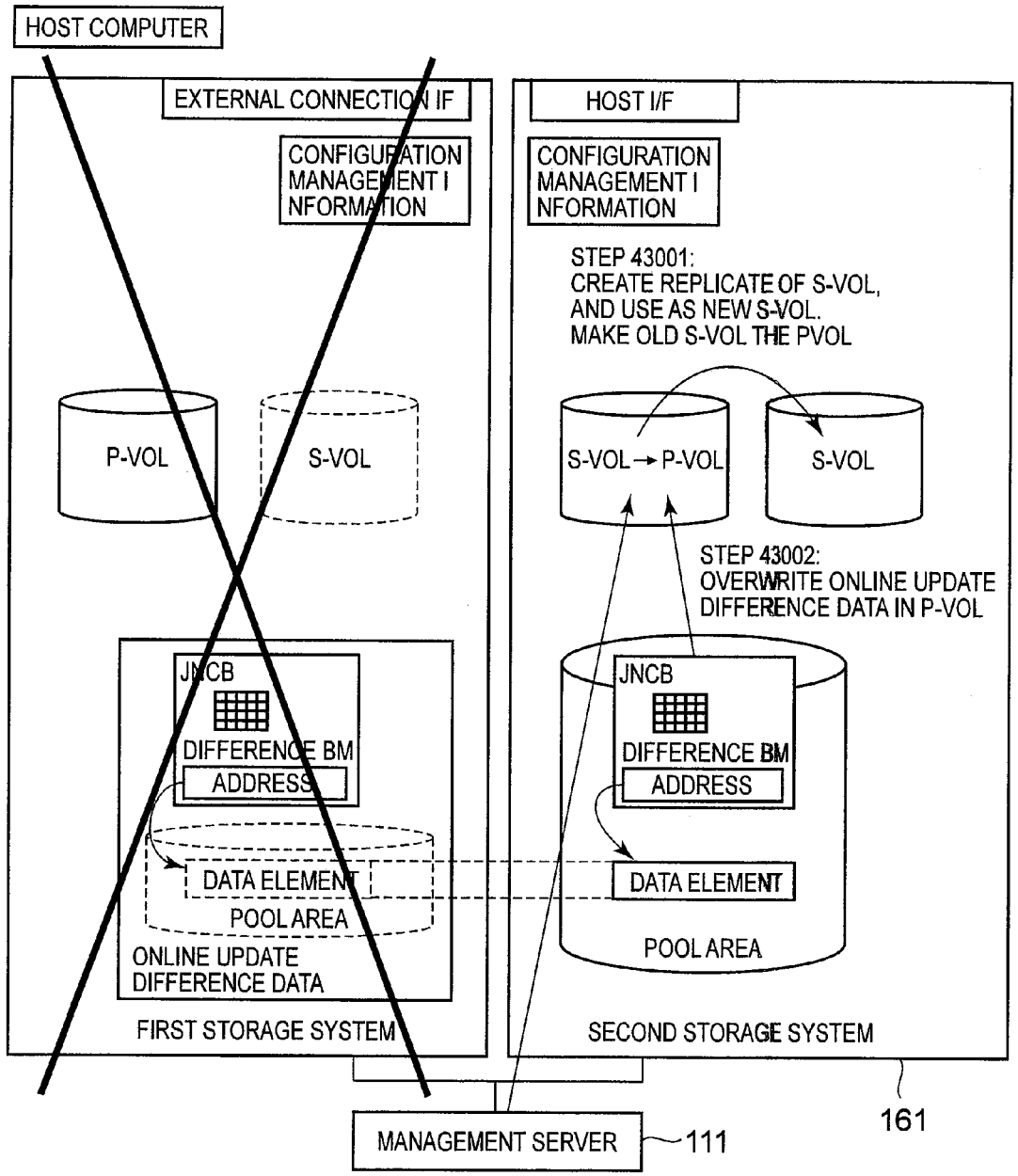
FIG. 44 shows the flow of a restore process carried out when a failure occurs in the first storage system.

FIG. 44 shows the flow of a recovery process carried out when a failure occurs in the first storage system 125. In FIG. 44, the online update difference data element is the after JNL data element.

Processor 167 of the second storage system 161 (refer to FIG. 1) specifies the S-VOL that configures a pair with the P-VOL of inside the first storage system 125 by referencing the configuration management table stored in the control memory 171 (refer to FIG. 1). Then, the processors 167 selects a VOL that constitutes a duplicate of this S-VOL (for example, a VOL, which is an unused VOL, and which has a storage capacity greater than the S-VOL). The processors 167 treats the S-VOL as the P-VOL, and creates a pair that treats the duplicate of the S-VOL as the S-VOL. The processors 167 copies the data stored in the P-VOL to the S-VOL (Step 43001).

The processors 167 reads out the online update difference data element corresponding to the ON bit in the difference BM (latest) inside the second storage system 161 from the JNL sub-area (latest), and writes the read-out data element to the block corresponding to the ON bit (the block inside the P-VOL) (Step 43002). When all the online update difference data elements have been reflected in the P-VOL, the contents of this P-VOL become the same contents as the P-VOL inside the first storage system 125.

Furthermore, a recovery such as that hereinbelow is also possible.

That is, a fourth storage system not shown in the figure is connected to the second storage system 161. The fourth storage system has the same functions as the first storage system 125.

The processor inside the fourth storage system (hereinafter referred to as "processor A") acquires via the management server 111 information indicating the external connection configuration inside the second storage system 161 (information indicating which target device corresponds to which VDEV) (for example, a configuration management table and/or external connection management information). Processor A maps the S-VOL inside the second storage system to a VOL inside the fourth storage system. Thereafter, processors 167 inside the second storage system 161 executes Steps 43001 and 43002.

Figure 45:
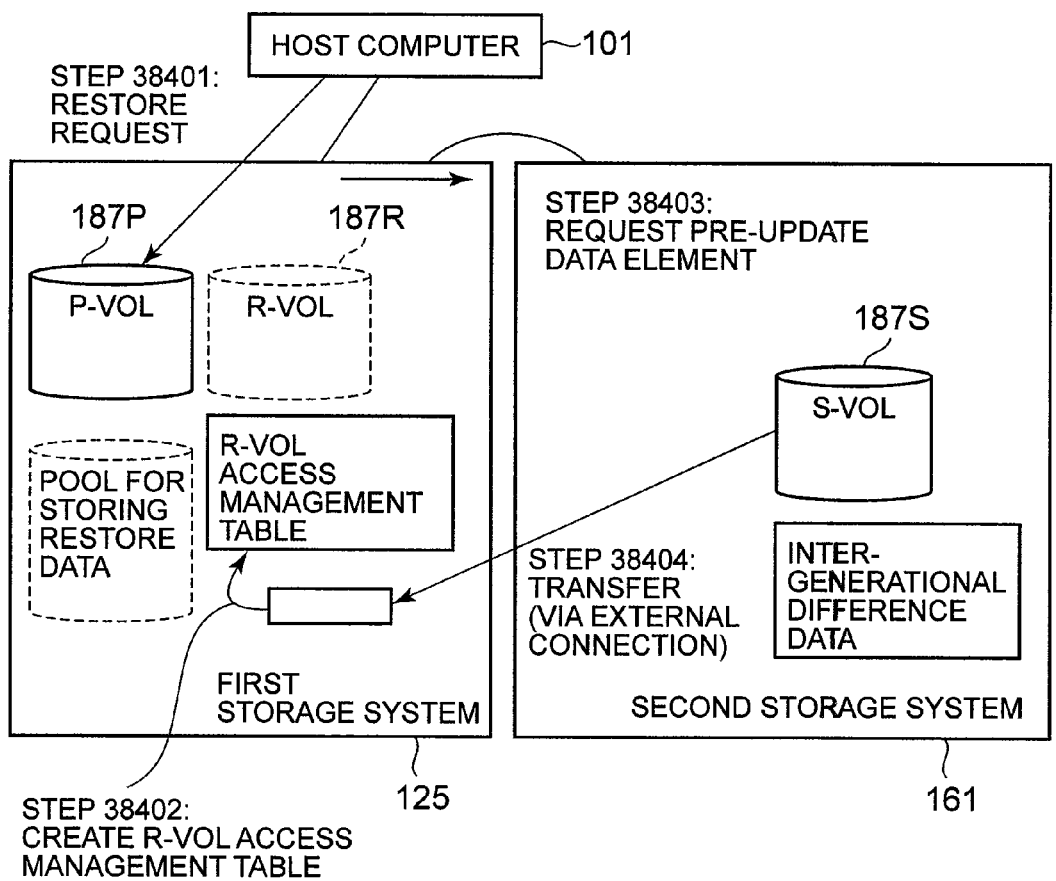
FIG. 45 shows an example of the flow of a restore process of the fifth embodiment.

FIG. 45 shows an example of the flow of a restore process of the fifth embodiment.

The restore program 223, upon receiving a restore request (Step 38401), reads out the JNCB that constitutes the basis of the R-VOL access management table from the second storage system 161, and uses this JNCB to create a R-VOL access management table using the same method as the method explained by referring to FIG. 13 (Step 38402).

If a write data element is written to the S-VOL inside the second storage system 161, the restore program 221 requests the second storage system 161 for the pre-update data element that is in the block of this write-destination (Step 38403). The processors 167 inside the second storage system 161, in response to this request, sends this pre-update data element to the first storage system 125 (Step 38404). The restore program 221, for example, stores this pre-update data element in the pool area corresponding to the R-VOL, and changes the address corresponding to the block in the same location as the above-mentioned write-destination block in the R-VOL access management table to the address of the storage-destination segment of this pool area.

Further, if the data elements configuring the R-VOL and the JNCB that constitutes the basis of the R-VOL access management table are in a storage area (for example, a logical volume) associated to a target device for which mapping has been deleted inside the second storage system 161, either the control processors 143 or the management server 111 map this target device to the VDEV inside the first storage system 125. Thereafter, the control processors 143 reads out the JNCB from this storage area, and creates the R-VOL access management table. Further, the control processors 143 reads out the data elements configuring the R-VOL from the second storage system 161 as needed, and stores these data elements in the pool area corresponding to the R-VOL.

Embodiment 6

In a sixth embodiment, duplicate elimination processing is carried out during a merge process. In duplicate elimination processing a determination is made as to the presence or absence of a duplicate inter-generational difference data element, and if the result of the determination is that a duplicate data element exists, the duplicate inter-generational difference data element is not stored in the JNL sub-area. In duplicate elimination processing, a storage area, which is an area that differs from the logical volume that is accessed from the host computer 101, and which is not accessed from the host computer 101 (a JNL association area or below-described save area) is used the same as in merge processing. Thus, it is possible to carry out duplicate elimination processing without substantially affected the processing of an I/O command from the host computer 101.

This duplicate elimination process will be explained in detail hereinbelow.

Figure 39:
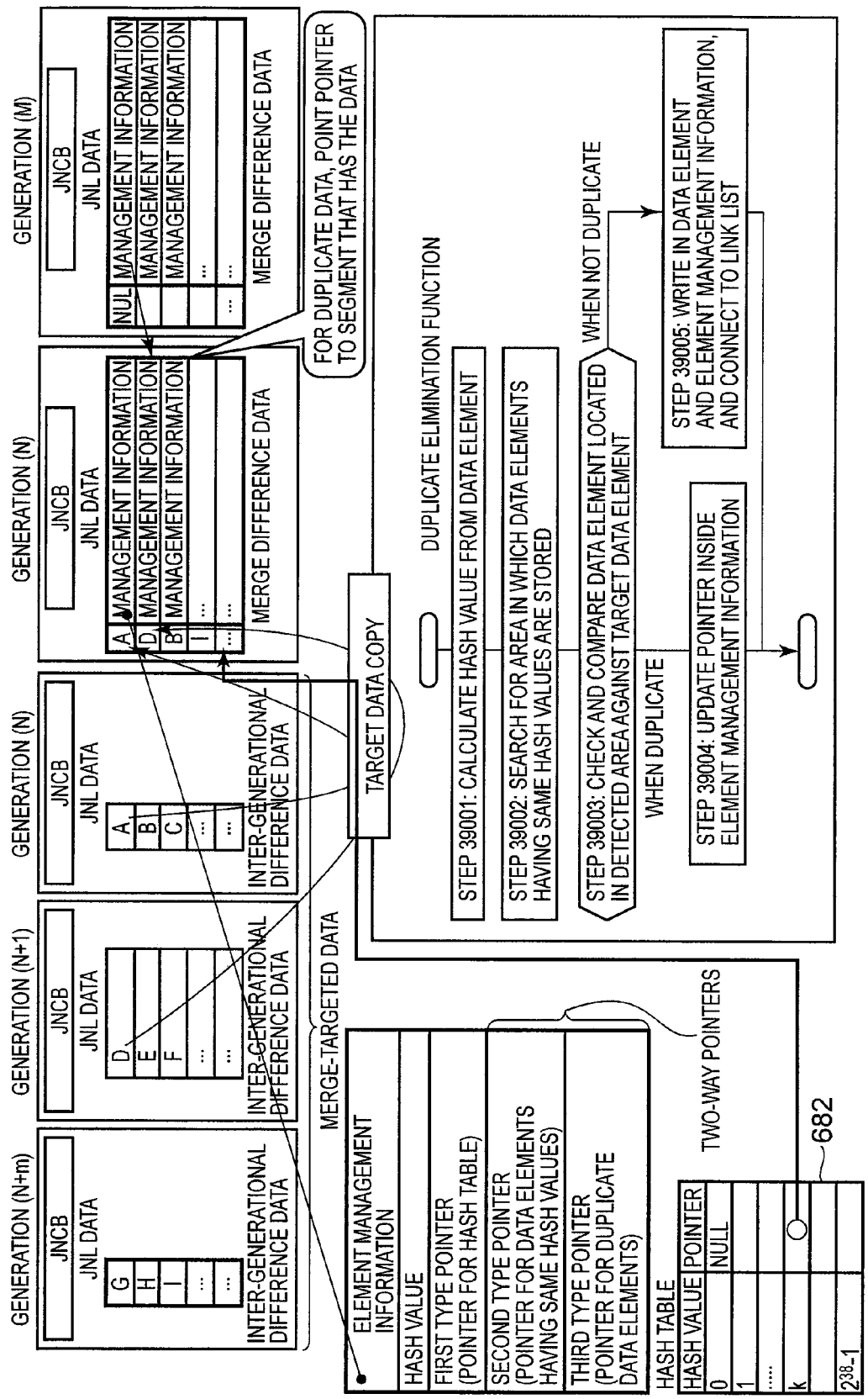
FIG. 39 is a schematic diagram of a duplicate elimination process carried out by a sixth embodiment of the present invention.

FIG. 39 is a schematic diagram of a duplicate elimination process carried out by a sixth embodiment of the present invention.

The JNL merge program 219 has a duplicate elimination function. In accordance with the duplicate elimination function, a hash value for an inter-generational difference data element is produced.

In this embodiment, element management information is appended to each of the merge difference data elements in the merge difference data. Element management information is related to the management of merge difference data elements. Further, when it is detected that a certain inter-generational difference data element duplicates a certain merge difference data element, the certain inter-generational difference data element is not included in the merge difference data, and only the element management information corresponding to this certain inter-generational difference data element is included in the merge difference data. The size of the element management information, for example, is smaller than the size of the JNL data element (that is, it is the host write size).

Element management information, for example, comprises a hash value, a pointer to a hash table 682 (hereinafter, referred to as the "first type pointer"), a pointer to merge difference data elements that have the same hash value (hereinafter referred to as the "second type pointer"), and a pointer to a duplicate merge data element (hereinafter referred to as the "third type pointer"). The "hash value" comprising the element management information is the hash value of a data element corresponding to this element management information. The hash table 682 is configured from a plurality of types of hash values capable of being calculated from the JNL data element, and pointers corresponding to the respective types of hash values. As a pointer, the address of the segment that stores the merge difference data element is recorded ("NULL" signifies that a valid address has not been registered.). The hash table 682, for example, is stored in the control memory 145, but can also be stored in a PDEV or other such storage resource. The second and third type pointers are both two-way pointers. Therefore, not only an association-destination address, but also an association-source address can be registered in the element management information as respective types of pointers. The first through the third types of pointers are respectively registered when these pointers correspond to the following conditions:

First Type Pointer: "NULL" is recorded in the hash table 682 as the pointer corresponding to the calculated hash value;

Second Type Pointer (Association Destination): A valid address is recorded in the hash table 682 as the pointer corresponding to the calculated hash value, but there is no merge difference data element that duplicates the target data element among the merge difference data elements capable of being traced from this address; and Third Type Pointer (Association Destination): A valid address is recorded in the hash table 682 as the pointer corresponding to the calculated hash value, and there is a merge difference data element that duplicates the target data element among the merge difference data elements capable of being traced from this address.

Figure 31A:
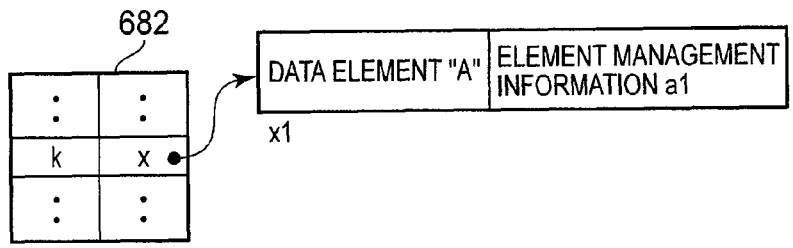
FIG. 31 shows an example of the relationship between element management information and a data element in a sixth embodiment.

More specifically, for example, as shown in FIG. 31A, when the hash table 682 does not have a valid address corresponding to the hash value "k", and a target data element "A" corresponding to the hash value "k" is acquired for the first block, target data element "A" and the element management information a1, which corresponds thereto, are comprised in the merge difference data. Further, the address of area x1 (the area inside the JNL sub-area corresponding to the merge difference data), in which target data element "A" is stored, is recorded in the hash table 682 as the valid address corresponding to hash value "k". Furthermore, the element management information a1 comprises "k" as the hash value, comprises an address indicating the entry ("x1") corresponding to the hash value "k" in the hash table 682 as the first type pointer, but does not comprise valid addresses as the second type and third type pointers (In FIGS. 31A through 31D, ● signifies the association source, and the orientation of the arrow signifies the association destination.).

Figure 31B:
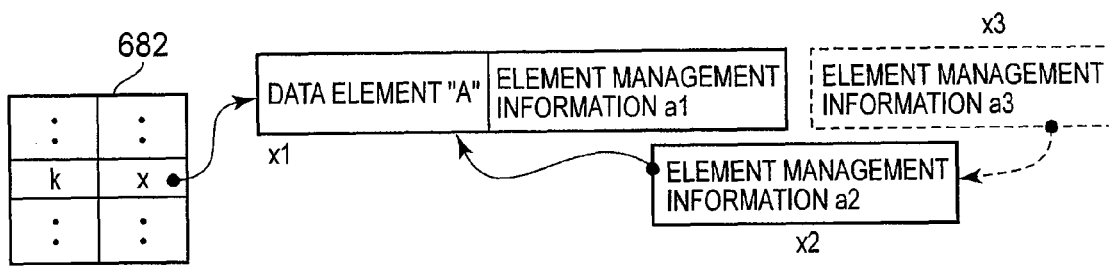

Next, for example, as shown in FIG. 31B, when target data element "A", which corresponds to hash value "k", is acquired for the second block, area x1 is specified from the hash table 682 pointer corresponding to the hash value "k". Not only the hash value, but also a data element "A" with exactly the same contents (that is, a duplicate merge difference data element) exists in area x. Thus, this time, as shown in FIG. 31B, target data element "A" is not comprised in the merge difference data, but element management information a2, which corresponds to this data element "A", is comprised in the merge difference data. Element management information a2 comprises "k" as the hash value, comprises an address indicating area x1 as the third type pointer (association destination), but does not comprise valid addresses as the first type and second type pointers. Further, element management information a1, which corresponds to association-destination data element "A" of element management information a2 comprises an address indicating area x2 in which is stored the element management information a2 as the third type pointer (association source). Consequently, it is possible to reference element management information a2 by way of element management information a1. Furthermore, when target data element "A" is acquired once again thereafter, element management information a3, which corresponds thereto, is associated to element management information a2. Consequently, it becomes possible to reference element management information a3 by way of element management information a1 and a2. Furthermore, in this FIG. 31B, information indicating an address indicating area x2 in which element management information a2 is stored (or an address indicating area x1 in which data element "A" is stored) is used as the data storage address corresponding to the bit (the bit in the difference BM) corresponding to the not-included data element "A".

Figure 31C:
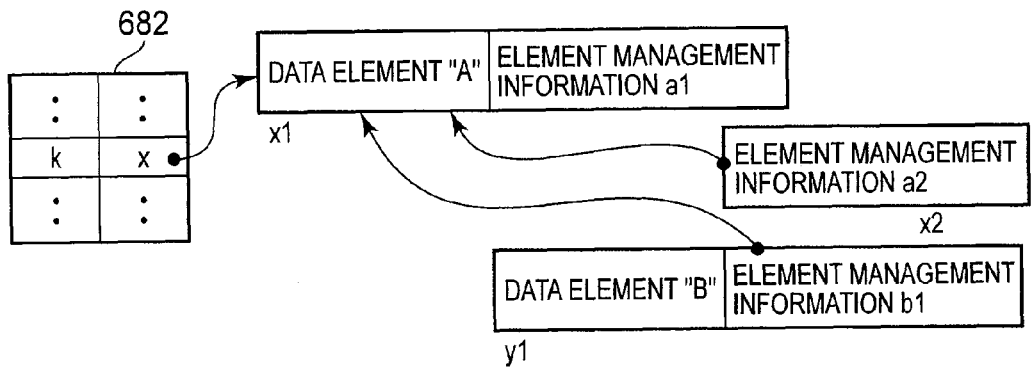

Next, for example, as shown in FIG. 31C, when target data element "B", which corresponds to hash value "k", is acquired for a third block, area x1 is specified from the hash table 682 pointer corresponding to the hash value "k". Data element "A" for which the hash value is the same but the contents differ (that is, a non-duplicate merge difference data element) resides in area x1. That is, there is no duplicate merge difference data element. Thus, as shown in FIG. 31C, target data element "B" and the element management information b1 corresponding thereto are comprised in the merge difference data. Since area x1 is already recorded in the hash table 682 as the valid address corresponding to the hash value "k", the address indicating area y1 in which target data element "B" is stored is not recorded. Element management information b1 comprises "k" as the hash value, comprises an address indicating area x1 as the second type pointer (association destination), but does not comprise a valid address as the first type and third type pointers. An address indicating area y1 is added as the second type pointer (association source) inside element management information a1.

Figure 31D:
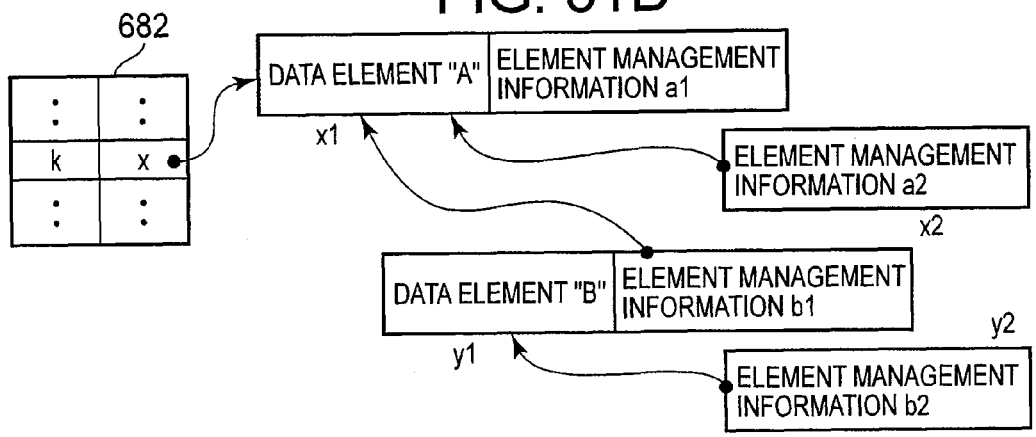

Next, for example, when target data element "B" corresponding to hash value "k" is acquired for the fourth block as shown in FIG. 31D, area x1 is specified from the hash table 682 pointer corresponding to hash value "k". Data element "A", which has the same hash value but different contents, resides in area x1. There is an address indicating area y1 as the second type pointer (association source) inside the element management information a1 corresponding to this data element "A". Thus, data element "B", which is in area y1, can be specified. This data element "B" is a data element that duplicates target data element "B". Thus, this time, as shown in FIG. 31D, the element management information b2 corresponding to this data element "B" is comprised in the merge difference data and the target data element "B" is not comprised in the merge difference data. The element management information b2 comprises "k" as the hash value, comprises an address indicating area y1 as the third type pointer (association destination), but does not comprise valid addresses as the first type and second type pointers. Further, the element management information b1 comprises an address indicating area y2 in which element management information b2 is stored as the third type pointer (association source). Consequently, it is possible to reference element management information b2 by way of element management information a1 and b1.

Figure 40:
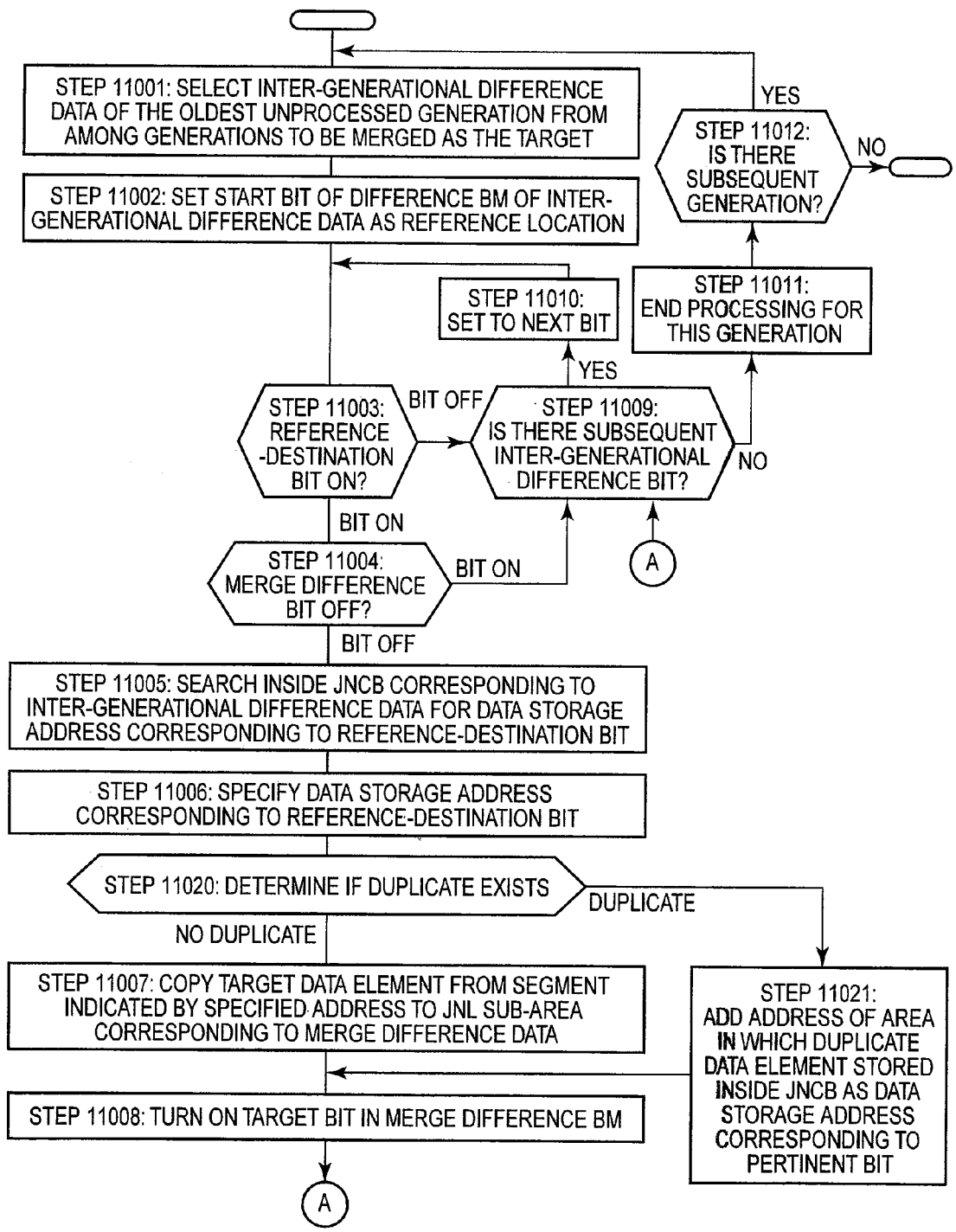
FIG. 40 shows the flow of a merge process having a duplicate elimination process in the sixth embodiment.

The JNL merge program 219, for example, executes duplicate elimination processing as described hereinabove between Step 11006 and Step 11007 (Refer to FIG. 11) as shown in FIG. 40. More specifically, the JNL merge program 219 carries out the determination of Step 11020 (determines the presence or absence of a merge difference data element that duplicates a certain data element). When there is a duplicate merge difference data element, the JNL merge program 219 does not comprise this certain data element in the merge difference data, but rather only comprises the element management information corresponding to this certain data element in the merge difference data. Further, the JNL merge program 219 adds an address showing the segment in which the duplicate merge difference data element is stored as the data storage address (the data storage address comprising the JNCB that corresponds to the merge difference data) corresponding to the block (bit) that corresponds to this certain data element to this JNCB (Step 11021). Step 11021 is the same processing as that of Step 39004 shown in FIG. 39. Duplicate elimination processing will be explained hereinbelow by referring to FIG. 39.

The JNL merge program 219 calculates the hash value of an acquired inter-generational data element (hereinafter referred to as the "target data element" in the explanation of FIG. 39) (Step 39001).

Next, the JNL merge program 219 searches the area in which the data element having the same hash value as the calculated hash value is stored (Step 39002). According to the specific example referred to in FIG. 31, the relevant area is discovered in cases of FIGS. 31B through 31D.

Next, the JNL merge program 219 determines whether or not there is a merge difference data element that duplicates the target data element (Step 39003). If there is a duplicate merge difference data element (as in the cases of FIGS. 31B and 31D), the target data element is not comprised in the merge difference data, but the address of the area in which the duplicate merge difference data element resides is comprised inside the element management information corresponding to this target data element as the third type pointer (association destination) (Step 39004). Conversely, if there is no duplicate merge difference data element (as in the case of FIG. 31C), the target data element and the element management information corresponding thereto are comprised in the merge difference data (Step 39005). At this time, the address of the area in which resides the data element for which the same hash value can be obtained is comprised inside this element management information as the second type pointer (association destination).

The above processing can be carried out independently for each single merge difference data (that is, a hash table 682 can be prepared for each merge difference data), or, as shown in FIG. 39, can be carried out across a plurality of merge difference data (that is, a hash table 682 can be shared by a plurality of merge difference data). According to the example of FIG. 39, since a data element that duplicates a certain target data element for merge difference data (M) does not reside in merge difference data (M), but rather, resides in merge difference data (N), and can be specified by tracing a plurality of element management information using a common hash table 682, an address indicating the area in which resides the duplicate data element inside merge difference data (N) is comprised inside the element management information corresponding to this target data element as the third type pointer (association destination), and this target data element is not comprised in merge difference data (M) ("NULL" signifies that the merge difference data (M) does not comprise the target data element). If there is a common hash table 682 for a plurality of merge difference data like this, there is less likelihood that a JNL data element will be comprised in merge difference data created thereafter.

Figure 41:
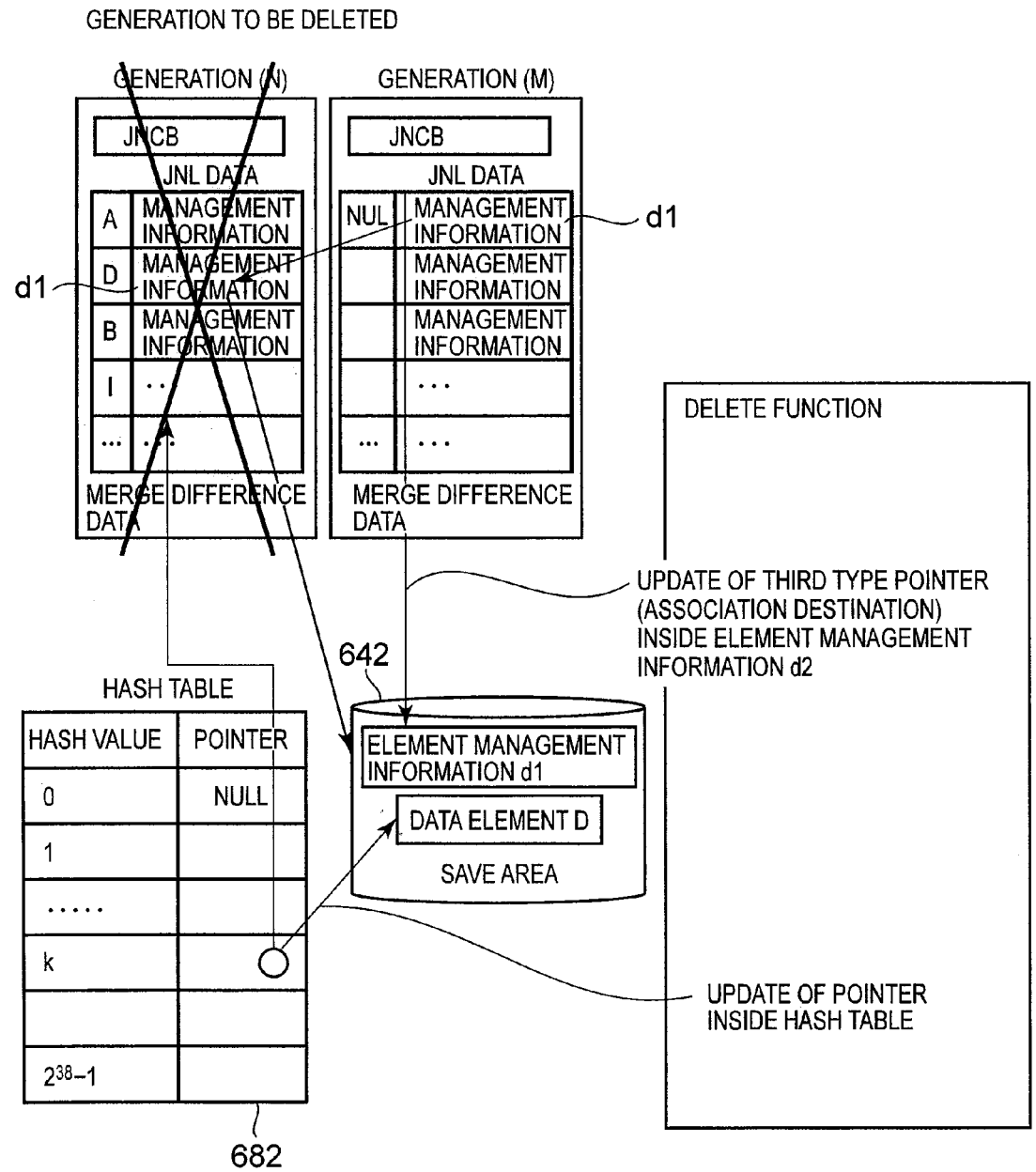
FIG. 41 shows an overview of a merge difference data delete process of the sixth embodiment.

FIG. 41 shows an overview of a delete process for merge difference data in the sixth embodiment.

For example, it is supposed that merge difference data (N) is to be deleted, and that merge difference data (M) was created later than merge difference data (N) (either generation (N) or generation (M) can be the new generation). Thus, for example, it is supposed that data element "D" of merge difference data (N) is linked from element management information d2 of merge difference data (M) (More specifically, it is supposed that element management information d2 comprises as the third type pointer the address of the area in which data element "D" of merge difference data (N) resides.).

In this case, if merge difference data (N) is simply deleted, it becomes impossible to use merge difference data (M) to restore data element "D" that corresponds to element management information d2.

Accordingly, in this embodiment, a determination is made as to whether or not the data element of the delete-targeted merge difference data (N) is linked to the element management information inside other merge difference data. When the result produced by the determination is that the link exists, the following processes (41-1) through (41-4) are carried out by a JNL merge program 219 not shown in the figure.

(41-1) Data element "D" and the element management information d1 corresponding thereto are saved to save area 642;

(41-2) The hash table 682 pointer corresponding to hash value "k" is changed from the address indicating the area in which data element "D" is stored in the JNL sub-area to the address indicating the area in which data element "D" is stored in the save area 642;

(41-3) The third type pointer (association destination) inside the element management information d2 is changed from the address indicating the area in which data element "D" is stored in the JNL sub-area to the address indicating the area in which data element "D" is stored in the save area 642; and (41-4) Merge difference data (N) is deleted. The save area 642 can be a logical volume (for example a pool VOL) created based on PDEV, can be one area in the cache memory 147, or can be an area inside a storage resource that is external to the first storage system 125.

Figure 42:
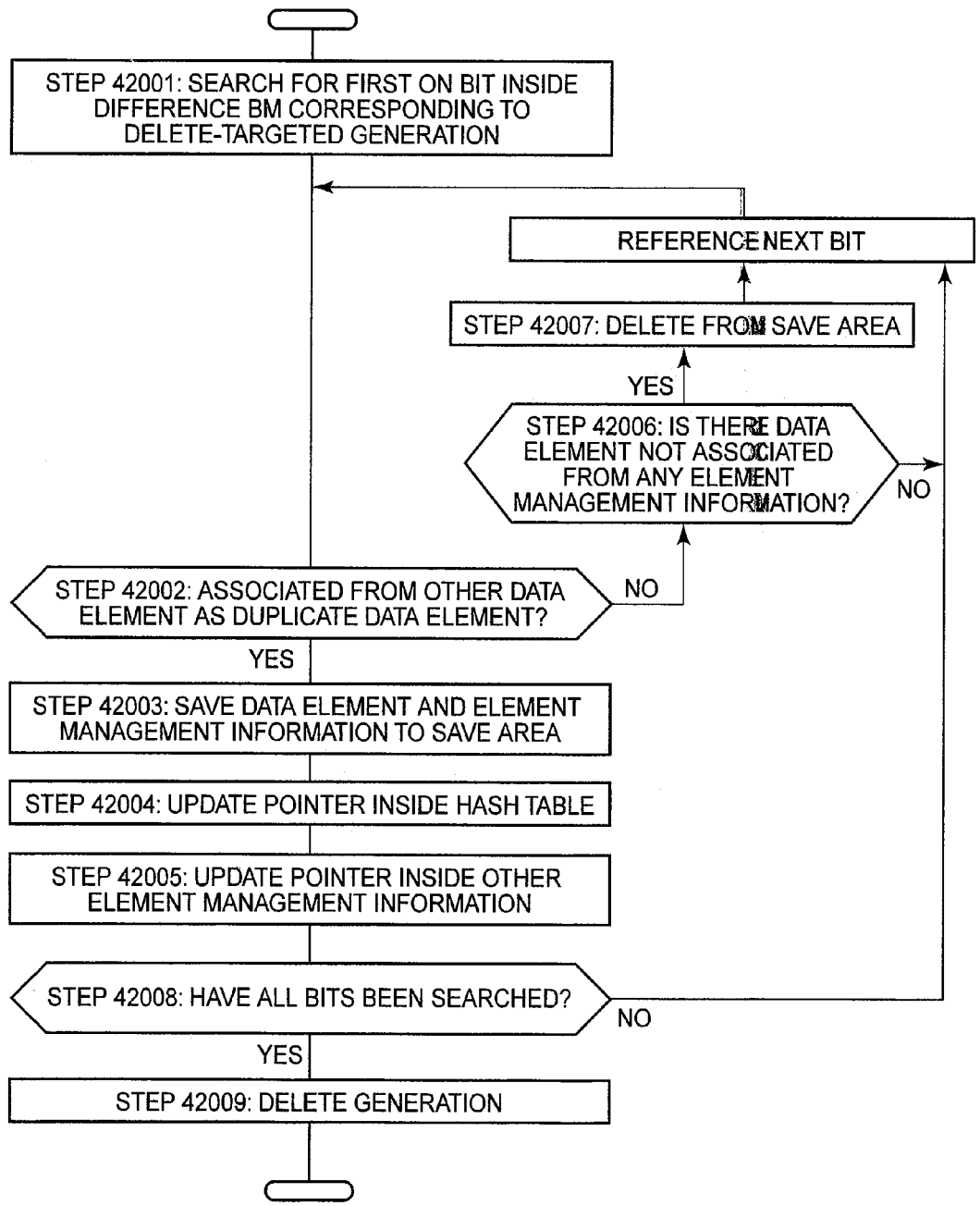
FIG. 42 shows the flow of a merge difference data delete process of the sixth embodiment.

FIG. 42 shows the flow of delete processing for merge difference data.

The JNL merge program 219 searches for the first ON bit in the difference BM corresponding to the delete-targeted merge difference data (Step 42001).

Next, the JNL merge program 219 uses the data storage address corresponding to this ON bit (the data storage address inside the JNCB) to reference the element management information corresponding to this ON bit, thereby determining whether or not the address indicating the area in which the data element corresponding to this ON bit is stored is comprised inside other element management information as either the second type or third type pointer (association destination) (Step 42002). If, for example, there is a valid address inside the element management information corresponding to this ON bit as either the second type or third type pointer (association source) at this point, the determination result is positive, and if there is no valid address as either the second type or third type pointer (association source), the determination result is negative.

When a positive determination result is obtained in Step 42002, the JNL merge program 219 saves this element management information and the data element corresponding thereto to the save area 642 (Step 42003). If there is a valid address inside this element management information as the first type pointer, the JNL merge program 219 changes the hash table 682 pointer corresponding to the hash value of the saved data element to the address indicating the save-destination area of the data element (Step 42004). The JNL merge program 219 changes the either second type or third type pointer (association destination) inside the above-mentioned other element management information to the address indicating the data element save-destination area (Step 42005).

Conversely, when a negative determination result is obtained in Step 42002, the JNL merge program 219 checks whether or not the data element and element management information, which will become unassociated to any element management information by the delete-targeted merge difference data being deleted, are in the save area 642 (Step 42006). If this data element and element management information are in the save area 642, the JNL merge program 219 deleted this data element and element management information from the save area 642 (Step 42007).

The JNL merge program 219 executes the above Steps 42002 through 42007 for the respective ON bits in the difference BM corresponding to the delete-targeted merge difference data. Once these steps have been executed for all the ON bits (Step 42008: Y), the JNL merge program 219 deletes the delete-targeted merge difference data and the JNCB corresponding thereto from the JNL association area 188 (Step 42009). In so doing, the JNL merge program 219 deletes the information related to the generation corresponding to the delete-targeted merge difference data from the JNL area management table 203, the backup generation management table 205 and the first JNL management table 207.

The preceding is an explanation of the sixth embodiment. Furthermore, the duplication elimination process is not limited to when merge difference data is created, but rather can also be carried out when storing an inter-generational difference data element in the JNL area and/or when storing an online update difference data element in the JNL area. Thus, the delete process is not limited to merge difference data, and can also be carried out for inter-generational difference data.

Embodiment 7

Figure 46:
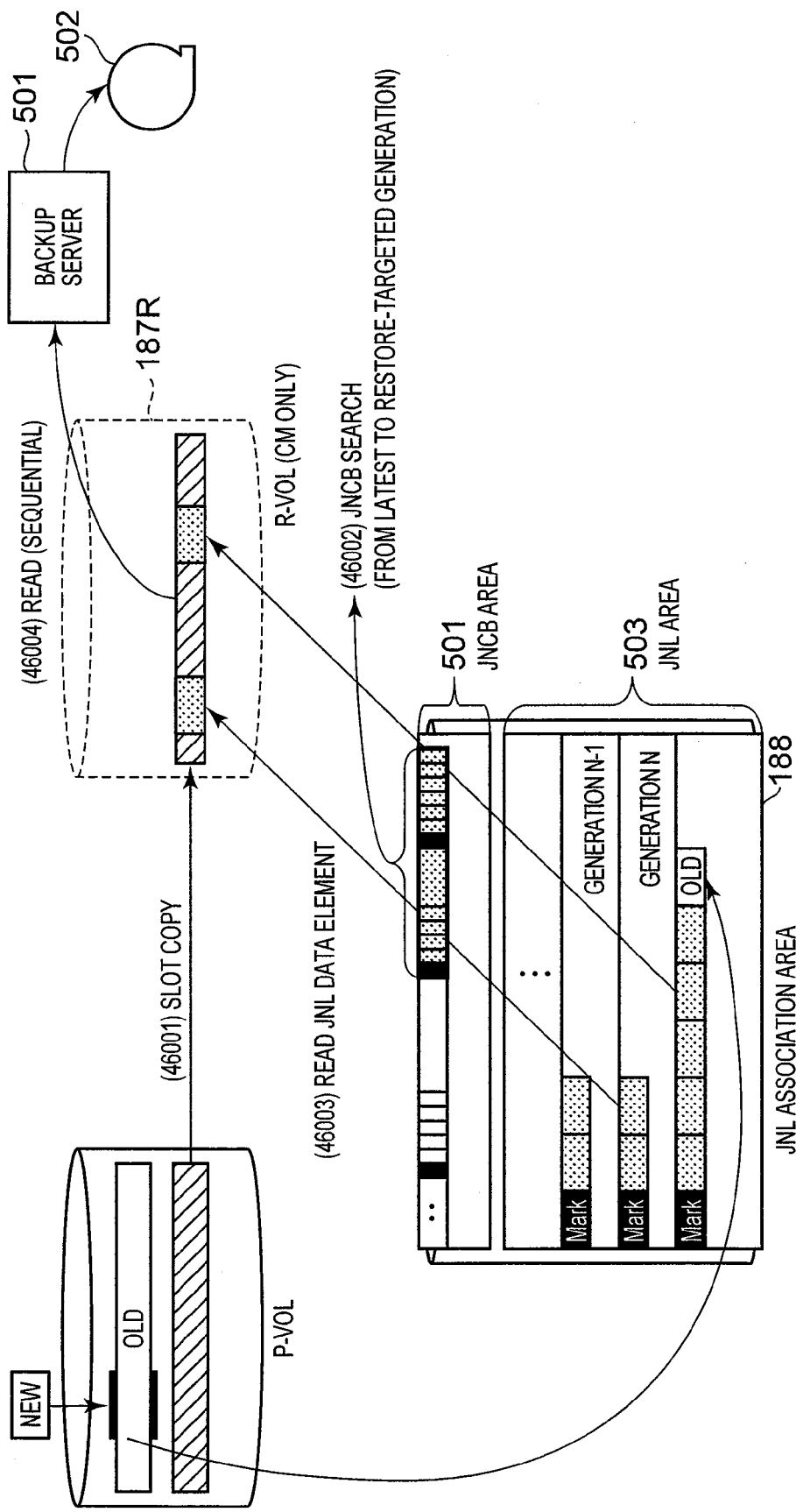
FIG. 46 shows an overview of a restore process of a seventh embodiment of the present invention.
Figure 47:
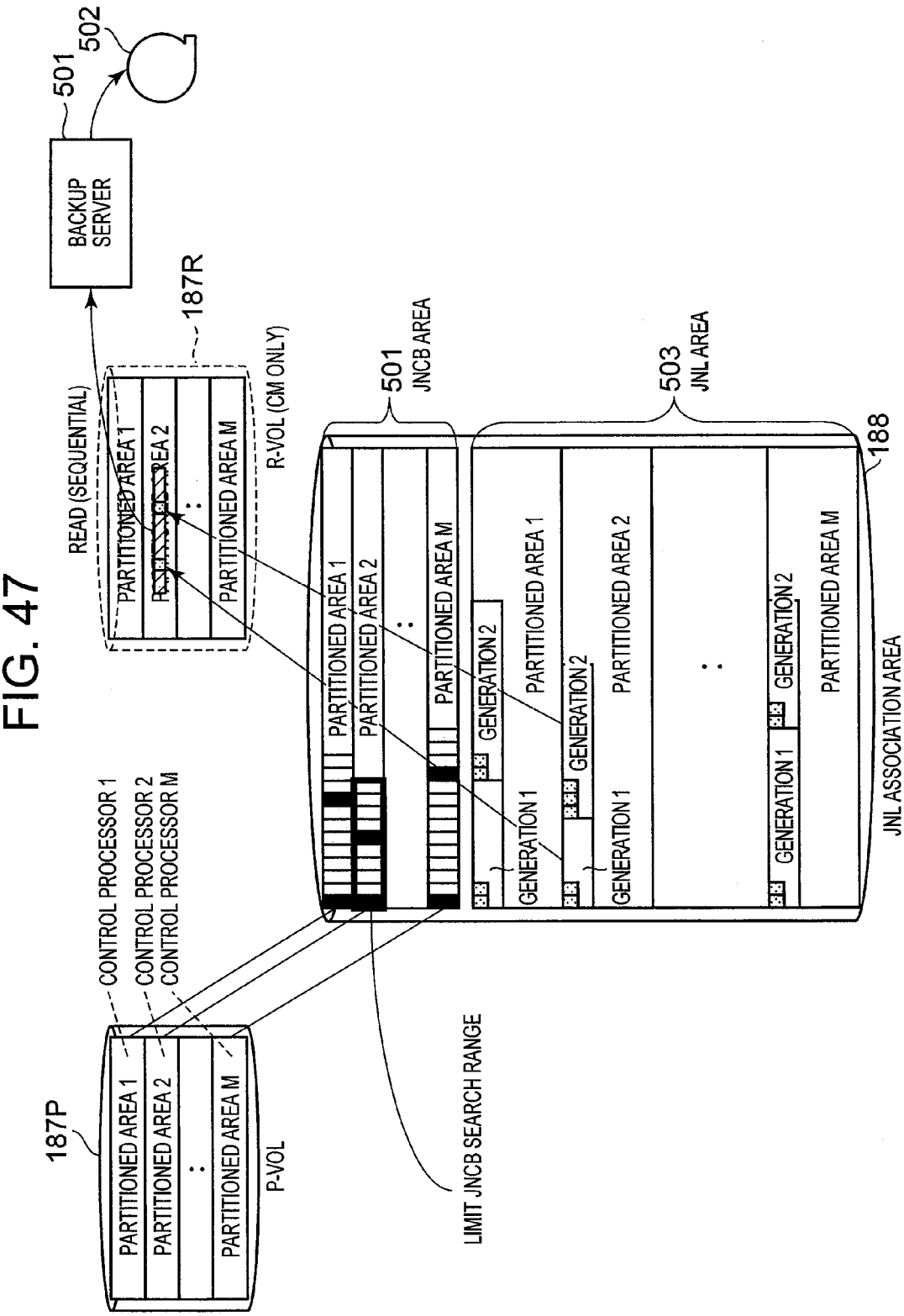
FIG. 47 shows examples of the configurations of a P-VOL, R-VOL, and JNL association area of the seventh embodiment.
Figure 48:
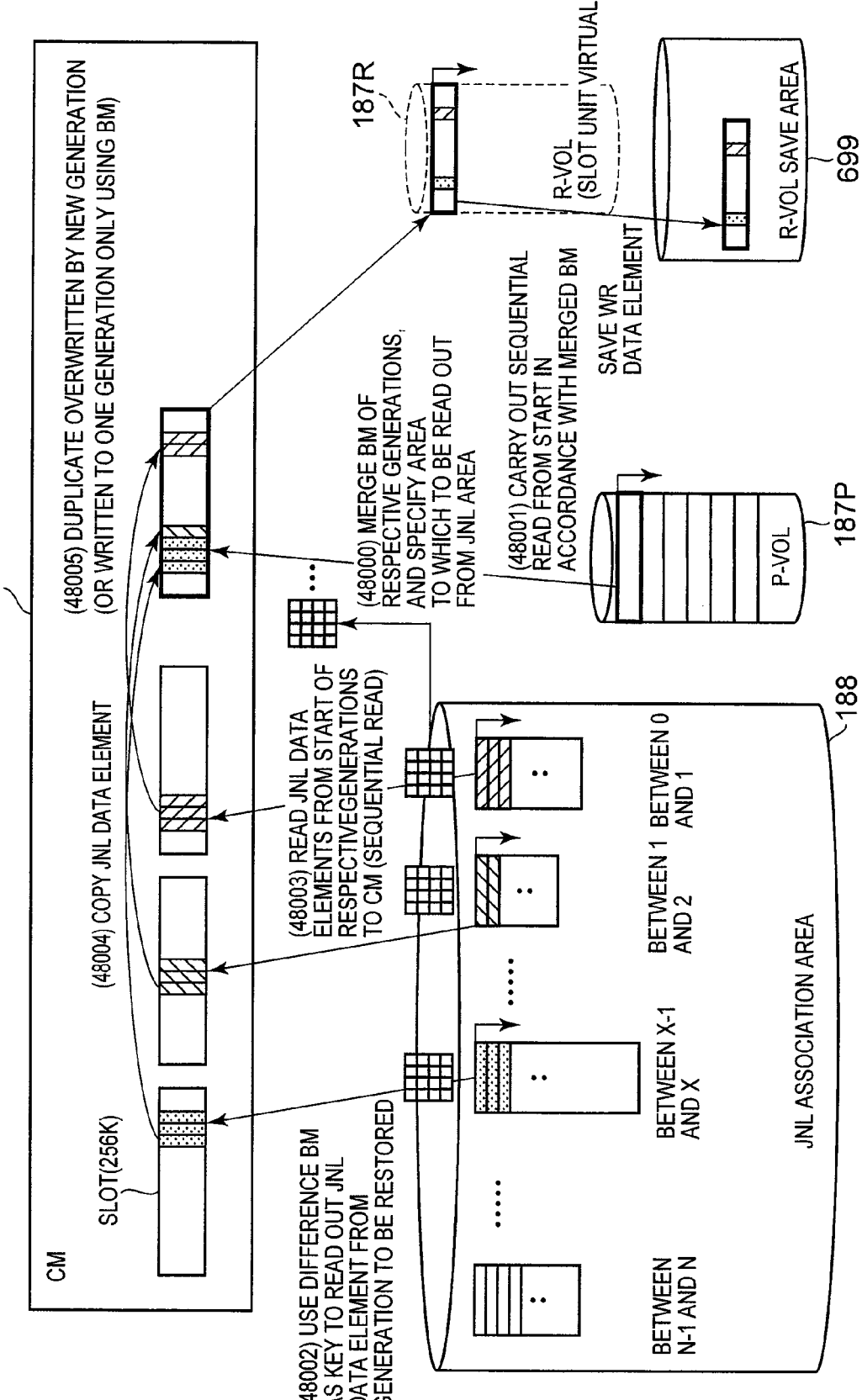
FIG. 48 shows how to use the cache memory in the seventh embodiment.

FIG. 46 shows an overview of a restore process in a seventh embodiment of the present invention. FIG. 47 shows examples of the configurations of the P-VOL, R-VOL and JNL association area in this embodiment. FIG. 48 shows how to use the cache memory 147 in this restore process. Furthermore, the explanation that references FIGS. 46 through 48, the JNL data element is the before JNL data element. Further, generation (N) is the restore-targeted generation.

In this embodiment, as shown in FIGS. 46 and 47, data is read out to the backup server 501 from the R-VOL 187R, and this data is written to a storage apparatus (for example, a tape library) 502 that is connected to the backup server 501. The data, for example, is read out sequentially from the R-VOL start address, and written sequentially to the storage apparatus 502.

As shown in FIG. 46, the restore program 221 reads out data from the respective slot size areas inside the P-VOL (or S-VOL) to the cache memory 147 (Reference Numeral 46001). The slot size, for example, is larger than the host write size. Therefore, the slot size area, for example, is configured from a plurality of blocks.

Next, the restore program 221, based on the JNCB from the restore-targeted generation (N) to the latest generation (Reference Numeral 46002), reads out the inter-generational difference data element that is in the restore-targeted generation (N) of the P-VOL from the JNL area, and overwrites this inter-generational difference data element in the location that accords with the data storage address inside the JNCB of the slot size data inside the cache memory 147 (Reference Numeral 46003). By so doing, subsequent to a certain slot size worth of data that corresponds to generation (N) having been defined inside the cache memory 147, the defined slot size worth of data inside the cache memory 147 is transferred to the backup server 501.

As shown in FIG. 47, in this embodiment, the P-VOL (and/or the S-VOL), the R-VOL (substantially the cache memory), the JNCB area and the JNL area are partitioned into a plurality of sub-areas. Hereinafter, this sub-area will be referred to as the "partitioned area", and will be explained by assigning a serial number p (where p is a natural number) to each partitioned area. The respective partitioned areas p inside the P-VOL, R-VOL, JNCB area and JNL area correspond to one another. Further, for example, the JNCB corresponding to one generation is partitioned and stored in a plurality of partitioned areas 1 through M in the JNCB area, and similarly, the JNL data corresponding to one generation (for example, the inter-generational difference data) is also partitioned and stored in a plurality of partitioned area 1 through M in the JNL area.

In this embodiment, there is a plurality of control processors 143, and individual control processors 143 are allocated to each of either one or two or more partitioned areas. The respective control processors 143 each execute the processing explained by referring to FIG. 46 for the partitioned area under its charge. The plurality of control processors 143 parallelly execute the processing explained by referring to FIG. 46.

For example, the following processing is carried out for a single partitioned area.

That is, as shown in FIG. 48, the control processor 143 in charge of this partitioned area reserves a plurality of slots that correspond to from generation (N) to the latest generation, and reserves a slot that corresponds to the R-VOL for the partitioned area in the cache memory 147.

Next, the control processors 143 merges the difference BM part from generation (N) to the latest generation (the difference BM part corresponding to the partitioned area) (Reference Numeral 48000), and reads out a slot size amount of data comprising the data elements corresponding to the ON bits in the merged difference BM part to the slot corresponding to from the P-VOL 187P (or S-VOL) to the R-VOL (Reference Numeral 48001). In so doing, the respective data elements are stored in locations based on the data storage addresses inside the JNCB.

Next, the control processors 143 reads out the data element (N) corresponding to the ON bit in the difference BM part that corresponds to generation (N) to slot (N) (Reference numeral 48002). The control processors 143 carries out the same processing for the respective generations that are newer than generation (N) (Reference Numeral 48003).

The control processors 143 copies the data elements inside the slots from generation (N) to the latest generation to the slots corresponding to the R-VOL (Reference Numeral 48004). When a data element exists in the copy destination at this time, this data element is overwritten by a data element corresponding to a newer generation (Reference Numeral 48005). When a copy like this from generation (N) to the latest generation has ended, the data of the slot size corresponding to generation (N) is defined.

Furthermore, when a slot cannot be reserved in the cache memory 147, the control processors 143 saves the data of the defined slot size in the cache memory 147 to the save area of the R-VOL (for example, one part of the storage pool (for example, the pool VOL)) 699. Or, for example, upon receipt of a write data element for the R-VOL, the control processors 143 saves this write data element to the R-VOL save area 699.

Figure 49:
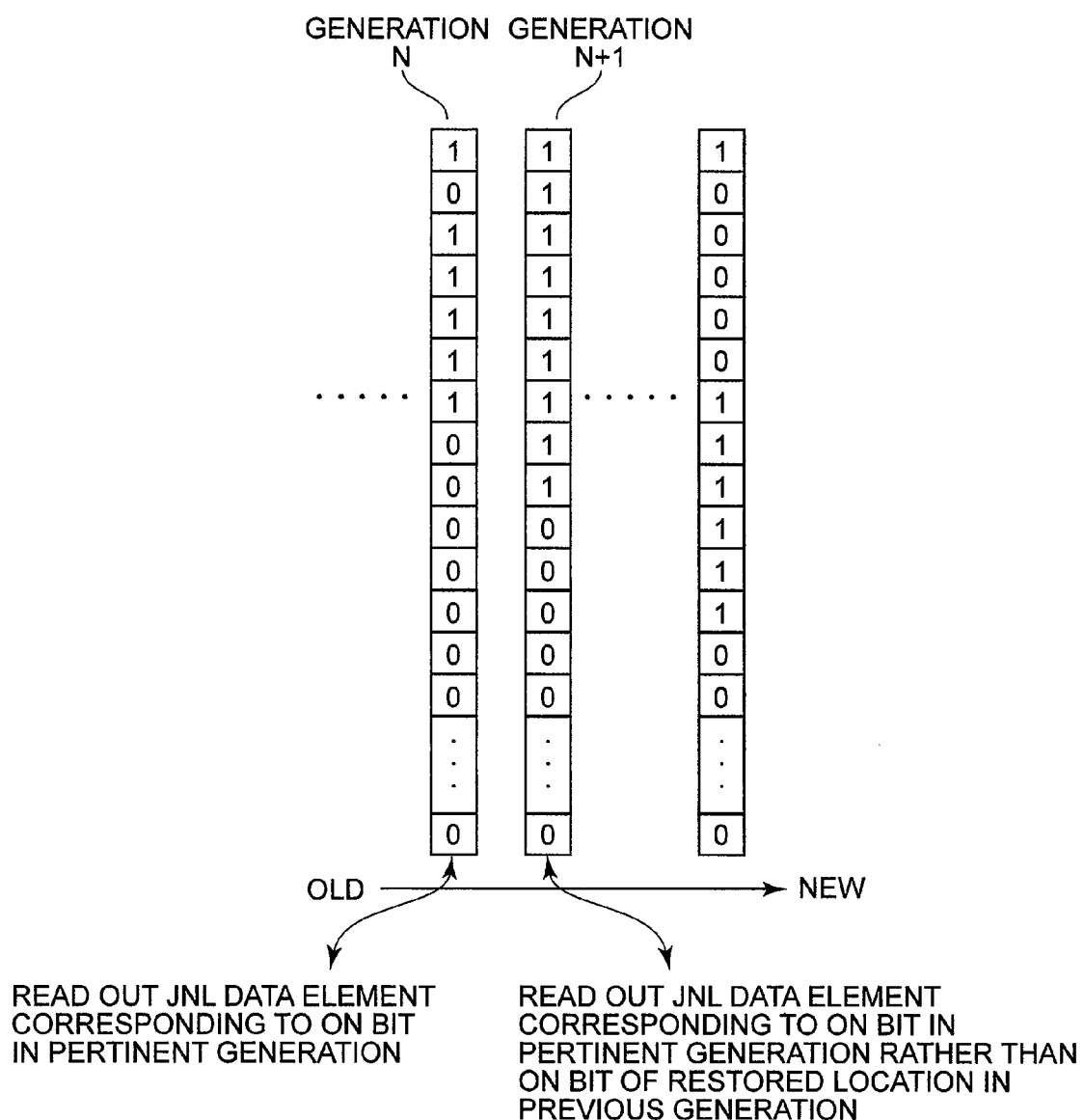
FIG. 49 is a schematic diagram of one variation of the seventh embodiment.

Further, the control processors 143 can define a slot size amount of data corresponding to the R-VOL 187R in the cache memory 147 using a method that will be explained by referring to FIG. 49 instead of the method explained by referring to FIG. 48. That is, as shown in FIG. 49, the control processors 143 reads out the data elements corresponding to the ON bits in the difference BM part (N) to the target slot. Next, the control processors 143 reads out the data elements corresponding to the ON bits in the difference BM part (N+1) to the above-mentioned target slot. If the data elements have already been read out for the prior generation at this time, the data elements corresponding to the ON bits in difference BM part (N+1) are not written to the target slot. The slot size amount of data corresponding to the R-VOL 187R is defined by carrying out processing like this from generation (N) to the latest generation.

Embodiment 8

Figure 50:
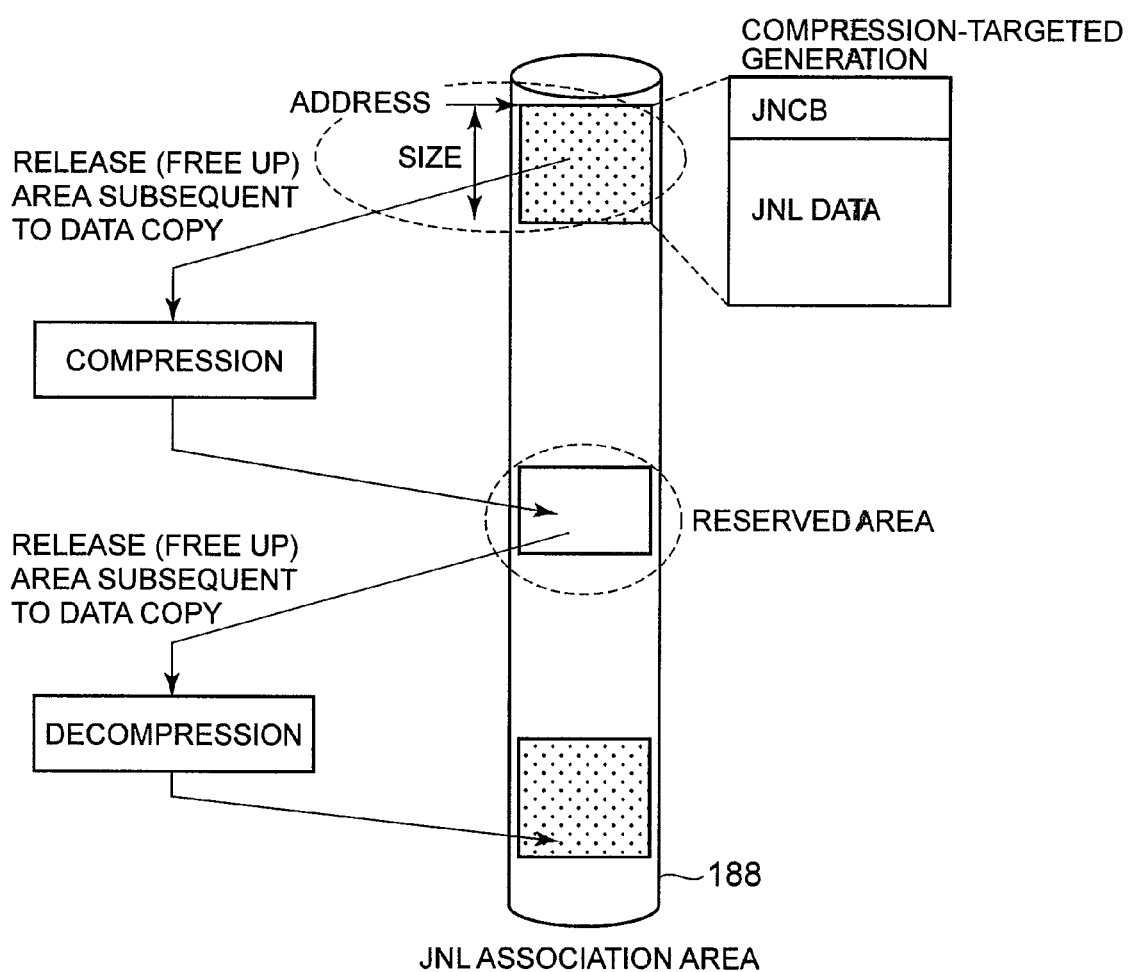
FIG. 50 shows overviews of a compression process and a decompression process carried out in an eighth embodiment of the present invention.

FIG. 50 shows an overview of a compression process and a decompression process carried out by an eighth embodiment of the present invention. These processes, for example, are carried out by a compression/decompression program not shown in the figure being executed by the control processors 143.

The control processors 143 receives a compression-targeted generation specification from either the host computer 101 or the management server 111. The control processors 143, upon receiving the compression-targeted generation specification, specifies the location and data size of the JNL data (either the inter-generational difference data or merge difference data) that corresponds to the compression-targeted generation by referencing the "start address" and "length" (the information elements recorded in the first JNL management table 207) corresponding to the compression-targeted generation. Further, the control processors 143, having the compression method (including, for example, the compression ratio) as a basis, reserves from the JNL association area 188 a free area of a size that is based on the specified data size.

Then, the control processors 143 reads out and compresses the JNCB and JNL data corresponding to the compression-targeted generation from the JNL association area 188, and stores the post-compression JNCB and JNL data in the reserved free area. Thereafter, the control processors 143 releases the read-source areas (the storage areas in which the JNCB and JNL data are stored). Consequently, this area is managed as a free area.

The control processors 143 manages for each generation the presence or absence of compression, information showing the location of the post-compression JNCB and JNL data, and the size of the pre-compression and post-compression JNCB and JNL data (pre-compression size and post-compression size) using a prescribed storage resource (for example, the control memory 145).

The control processors 143, upon receiving a decompression-targeted generation specification, reserves from the JNL association area 188 a pre-compression size free area corresponding to the decompression-targeted generation. The control processors 143 specifies the locations of the post-compression JNCB and JNL data corresponding to the decompression-targeted generation by referencing information managed by the above-mentioned prescribed storage resource, and reads out the post-compression JNCB and JNL data that is in the specified locations. Then, the control processors 143 expands this post-compression JNCB and JNL data, and stores the post-decompression JNCB and JNL data in the above-mentioned reserved free area. Thereafter, the control processors 143 releases the read-source area (the storage area in which the post-compression JNCB and JNL data are stored). Consequently, this area is managed as a free area.

The preceding is an explanation of the eighth embodiment. Furthermore, compression and/or decompression can be carried out using hardware circuits instead of or in addition to the control processors 143.

A number of embodiments of the present invention have been explained hereinabove, but these embodiments are examples for explaining the present invention, and do not purport to limit the scope of the present invention solely to these embodiments. The present invention can be put into practice in a variety of other modes.

For example, the computer system in any of the first through the eighth embodiments can be an open system or a mainframe system.

Further, for example, the storage systems 125, 161 and/or 601 can be NAS (Network Attached Storage).

Further, the S-VOL can be done away with. In that case, the reference destination when the R-VOL is accessed will be either a block inside the P-VOL or a segment in which an online update difference data element is stored instead of a block inside the S-VOL. Further, when a marker is received in this case, online update difference data will become inter-generational difference data. At this time, as a sort process, online update difference data elements can be read out in address order from the JNL sub-area and written in address order to a different JNL sub-area. If there is a S-VOL, the sort process is easy to carry out, and if there is no S-VOL, the consumption of storage capacity can be reduced by the size of the S-VOL.

What is claimed is:

1. A storage system group, comprising:
a first storage system; and
a second storage system coupled to the first storage system, wherein the first storage system comprises:
    a plurality of first physical storage devices,
    a front interface including a memory,
    a cache memory, and
    a controller configured to provide a storage pool by at least one of the plurality of first storage devices and to allocate a storage area from the storage pool to a virtual volume dynamically,
wherein the controller is configured to:
manage a plurality of second physical storage devices in the second storage system as external devices;
provide a primary volume by the at least one of the first physical storage devices, in which the primary volume stores data sent from a host computer;
provide a secondary volume by the at least one of the second physical storage devices in the second storage system, in which the secondary volume stores a copy of data stored in the primary volume;
manage a third volume which is the virtual volume provided by the storage pool, in which the third volume is a designated generation of the primary volume;
manage a journal association area provided by the storage pool, in which the journal association area stores online update difference data which is a set of journal data elements stored after a last defined generation (N), where N is the most recent generation, and inter-generational difference data which is a set of journal data elements stored between the generation (N) and a generation (N−1) of the primary volume, and
manage the primary volume divided into a plurality of data blocks,
wherein when the front interface receives a write command and a write data element from the host computer, in which a size of the write data element is one data block, the front interface being configured to write the write data element to the memory and transfer the write command to the controller,
wherein the controller is further configured to:
reserve a first slot and a second slot from the cache memory in response to reception of the write command from the front interface;
write the write data element stored in the memory, to the first slot and the second slot; and
copy the write data element from the first slot to the primary volume, and from the second slot to the association journal area.

2. The storage system group according to claim 1, wherein the journal association area is not provided to the host computer.

3. The storage system group according to claim 2, wherein the journal association area is configured to further include a difference bitmap and to manage a set of the difference bitmap and the inter-generational difference data on a generation basis, a generation being a certain point of time of the primary volume.

4. The storage system group according to claim 3, wherein if two or more of the journal data elements of the plurality of inter-generational difference data are detected in a process of merging a plurality of generations of inter-generational difference data, the controller is configured to store one of the duplicated journal data elements.

* * * * *